US010111373B2

(12) United States Patent
Blackwell et al.

(10) Patent No.: US 10,111,373 B2
(45) Date of Patent: Oct. 30, 2018

(54) AUTONOMOUS SYSTEMS, METHODS, AND APPARATUS FOR AG BASED OPERATIONS

(71) Applicant: Kinze Manufacturing, Inc., Williamsburg, IA (US)

(72) Inventors: Robert Blackwell, Coralville, IA (US); Rhett Schildroth, North Liberty, IA (US); Michael J. Myers, Williamsburg, IA (US); Merlan J. Rolffs, Pella, IA (US); Derrick Becker, Williamsburg, IA (US)

(73) Assignee: Kinze Manufacturing, Inc., Williamsburg, IA (US)

(*) Notice: Subject to any disclaimer, the term of this patent is extended or adjusted under 35 U.S.C. 154(b) by 0 days.

(21) Appl. No.: 14/513,427

(22) Filed: Oct. 14, 2014

(65) Prior Publication Data

US 2015/0105963 A1    Apr. 16, 2015

Related U.S. Application Data

(60) Provisional application No. 61/890,653, filed on Oct. 14, 2013.

(51) Int. Cl.
*G05D 1/02* (2006.01)
*A01B 59/00* (2006.01)
(Continued)

(52) U.S. Cl.
CPC .......... *A01B 59/002* (2013.01); *A01B 69/004* (2013.01); *A01B 69/008* (2013.01);
(Continued)

(58) Field of Classification Search
None
See application file for complete search history.

(56) References Cited

U.S. PATENT DOCUMENTS 5,234,564 A * 8/1993 Smith ................ B07B 1/005
                                                209/241
5,924,754 A * 7/1999 Kuhns ................ B62D 21/14
                                                296/184.1
(Continued)

FOREIGN PATENT DOCUMENTS

EP      2520447 A1    7/2012
GB      2386969 A     10/2003
JP      2002358122 A  12/2002

OTHER PUBLICATIONS

Kinze Manufacturing, Inc., PCT/US2014/060385 filed Oct. 14, 2014, "The International Search Report and the Written Opinion of the International Searching Authority, or the Declaration", dated Jan. 21, 2015.

*Primary Examiner* — Nicholas K Wiltey
(74) *Attorney, Agent, or Firm* — McKee, Voorhes & Sease, PLC

(57) ABSTRACT

The use of self-powered, autonomous vehicles in agricultural and other domestic applications is provided. The vehicles include a self-propelled drive system, tracks or wheels operatively connected to the drive system, a power supply operatively connected to the drive system, an attachment mechanism for attaching equipment to the vehicle, and an intelligent control operatively connected to the drive system, power supply, and attachment mechanism. The vehicle is configured to connect to the equipment to perform agricultural operations based upon the equipment. Multiple vehicles can be used in a field at the same time. Furthermore, the invention includes the ability to move one or more of the autonomous vehicles from field to field, home to field, or from generally any first location to a second location.

20 Claims, 60 Drawing Sheets

(51) Int. Cl.
*B60P 3/22* (2006.01)
*B60P 3/00* (2006.01)
*A01B 79/00* (2006.01)
*A01B 69/00* (2006.01)
*A01B 69/04* (2006.01)
*A01D 41/127* (2006.01)

(52) U.S. Cl.
CPC .......... *A01B 79/00* (2013.01); *A01D 41/1278* (2013.01); *B60P 3/00* (2013.01); *B60P 3/22* (2013.01); *G05D 1/0246* (2013.01); *G05D 1/0295* (2013.01); *G05D 2201/0201* (2013.01)

(56) References Cited

U.S. PATENT DOCUMENTS

| | | |
|---|---|---|
| 6,205,381 B1 | 3/2001 | Motz et al. |
| 9,880,560 B2 | 1/2018 | Han et al. |
| 2005/0071078 A1* | 3/2005 | Yamada ............. G01C 21/3484 701/410 |
| 2007/0233348 A1 | 10/2007 | Diekhans et al. |
| 2010/0224427 A1* | 9/2010 | Nuchter ................... B25J 5/007 180/7.1 |
| 2010/0256852 A1* | 10/2010 | Mudalige ................ G08G 1/22 701/24 |
| 2011/0073026 A1 | 3/2011 | Martin et al. |
| 2011/0231061 A1* | 9/2011 | Reeve .................. A01B 69/008 701/41 |
| 2011/0257850 A1* | 10/2011 | Reeve .................... G06Q 10/04 701/50 |
| 2012/0193154 A1* | 8/2012 | Wellborn ............... B62D 59/04 180/14.2 |
| 2013/0268138 A1 | 10/2013 | Moughler et al. |
| 2014/0262591 A1 | 9/2014 | Turner et al. |
| 2014/0277905 A1 | 9/2014 | Anderson |
| 2014/0278696 A1 | 9/2014 | Anderson |
| 2015/0052866 A1* | 2/2015 | Walch .................. A01D 43/105 56/10.7 |
| 2016/0071418 A1* | 3/2016 | Oshida ..................... G08G 1/22 701/23 |

* cited by examiner

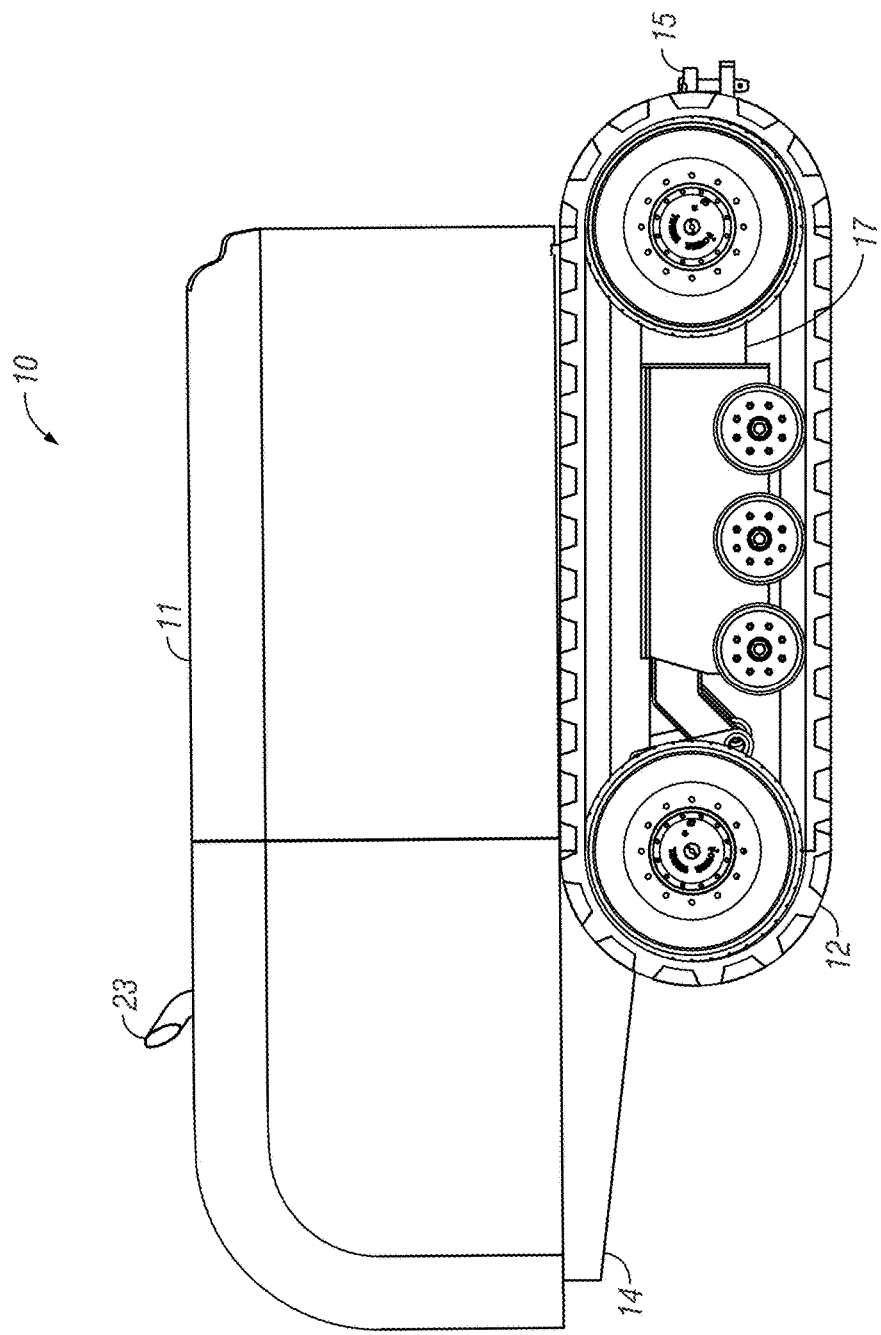

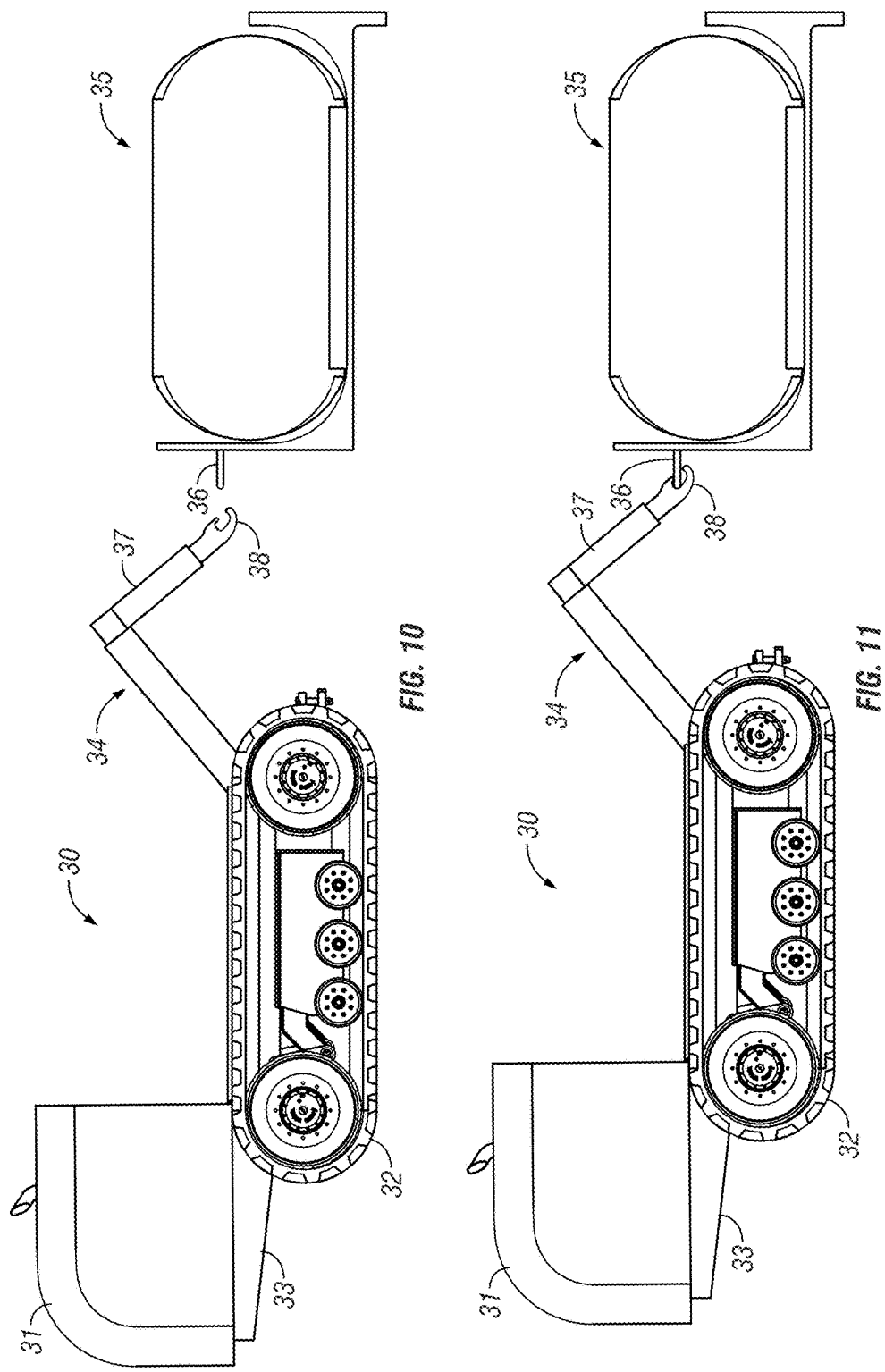

AUTONOMOUS SYSTEMS, METHODS, AND APPARATUS FOR AG BASED OPERATIONS

CROSS REFERENCE TO RELATED APPLICATIONS

This application claims priority under 35 U.S.C. § 119 to provisional application U.S. Ser. No. 61/890,653, filed Oct. 14, 2013, which is herein incorporated by reference in its entirety.

FIELD OF THE INVENTION

The invention relates generally to autonomous systems, methods, and apparatuses for use with agricultural based operations. More particularly, but not exclusively, the invention relates to the use of autonomous, self-propelled and self-controlled machines for use with agricultural implements, autonomous implements, and the control thereof.

BACKGROUND OF THE INVENTION

The increasing size of farms has created new situations for farmers. With limited lengths of seasons for agricultural operations, e.g., tilling, planting, harvesting, baling, and the like, it has become difficult for some farmers to complete certain tasks within the limited timeframe. For example, an ideal planting window for certain crops may only last a couple weeks. Many issues can affect whether a farmer is able to get all of the seed in the ground within the timeframe.

Some implements are becoming larger, such as the introduction of planters with a large number of row units. The more row units allow for fewer passages through a field. The costs associated with such equipment can be high, limiting the number of planters that a farmer can afford. In addition, if one or more of the planters breaks down or otherwise has issues, the delay in fixing the planter may cost the farmer planting time, in addition to the cost of repair. Even when farmers are able to afford multiple implements, including tractors and other equipment, there may be a problem of being able to hire enough workers to operate everything. Furthermore, as weather conditions tend to change and be otherwise unpredictable, this creates an additional hurdle. Operators can be limited to performing certain operations in limited weather conditions, such that the weather can create multiple delays in the completion of an operation.

Other operations may include additional issues. For example, harvesting crop includes many of the same issues as planting, with the additional issue that combines and other equipment associated with harvesting can be more expensive. Furthermore, with planting, spraying, harvesting, and other operations, the time for completing each operation can be increased by the constant need to replenish materials, empty materials, replenish fuel, replace individual components, and any other task that may involve the stopping of the operation, for even a limited time.

Therefore, there is a need in the art for a method, system, and/or apparatus that can aid farmers and others in completing various operations. The method, system, and/or apparatus can be used to reduce the time for completing operations, reduce the amount of manpower needed, increase the conditions in which an operation can be completed, or otherwise reduce the number of issues associated with farming and other operations.

SUMMARY OF THE INVENTION

Thus, it is a principle object, feature, and/or advantage of the invention to overcome deficiencies in the art.

It is another object, feature, and/or advantage of the invention to provide a system including an autonomous vehicle for performing agricultural operations.

It is yet another object, feature, and/or advantage of the invention to provide an autonomous vehicle that is self-propelled and capable of attaching to various agricultural equipment.

It is still another object, feature, and/or advantage of the invention to provide a system that includes a plurality of autonomous vehicles for performing agricultural operations in a field at the same time.

It is a further object, feature, and/or advantage of the invention to provide an autonomous vehicle that can self-attach to one of a plurality of equipment or implements.

It is yet a further object, feature, and/or advantage of the invention to provide a system that reduces the amount of time needed to perform one or more agricultural operations.

It is still a further object, feature, and/or advantage of the invention to provide a vehicle that includes permanent or modular outputs for providing a supply to tools, equipment, or other machines.

These and/or other objects, features, and advantages of the invention will be apparent to those skilled in the art. The invention is not to be limited to or by these objects, features and advantages. No single embodiment need provide each and every object, feature, or advantage.

Accordingly, the invention includes systems, methods, and apparatuses for providing autonomous agricultural operations. According to some aspects, the invention includes the use of one or more autonomous vehicles, which vehicles may be known as a tug unit. The tug unit is a self-propelled vehicle that includes a power source, drive system, wheels or tracks, and attachment mechanisms or surfaces. The autonomous vehicle can be programmed to perform operations in a pre-programmed manner, or in an on-the-fly manner, where a master module continually updates the vehicle with new instructions. The on-the-fly operation can also be continuously updated by the use of modules placed on and around the tug unit. The modules can include various sensors, radar, LIDAR, cameras, radio, antennas, GPS, and the like to provide updated information that will aid in operating the tug unit. The tug unit may also include an intelligent control, including a communication system. The communication system may include wire or wireless communication methods, such as Wi-Fi, Bluetooth, sensors, or the like. Furthermore, while some embodiments include the use of tracks, it is also contemplated that the tug unit may include wheels in the place of tracks.

The tug unit is configured, according to some aspects of the invention, to connect or be equipped with an implement or equipment. For example, the implement or equipment may be agricultural based equipment such as, but not limited to, planting equipment, harvesting equipment, spraying equipment, tilling equipment, bailing equipment, mowing equipment, grain storage equipment, or the like. Furthermore, it is to be appreciated that the invention is not limited to strictly agriculture based operations, and the methods, systems, and apparatuses disclosed herein may also be used in other industries, such as mining, construction, or other domestic operations.

To connect to the various implements and/or equipment, the tug unit may include attachment mechanisms, such as quick attached mechanisms. Examples of quick attached mechanisms include, but are not limited to, arms, three point hitches, power take-off connections, jacks on lifts, cable lifts/roll boxes, or the like. In addition, the invention contemplates that the tug units may include automatically connecting components, such as but not limited to electrical connections, hydraulic connections, pneumatic connections, power take off connections, sensors, and the like. In such situations, it is contemplated that when the unit and implement are close enough to connect to one another, the self-connecting mechanisms will automatically connect between the unit and the implement such that the tug unit can provide the necessary output to the unit in order to power and/or operate the implement.

According to other aspects of the invention, it is contemplated that one or more of the tug units may be connected to one another in order to provide additional power to larger implement or equipment. In addition, the tug units may be connected to one another in order to move the one or more units from one location to the next. In such situations, the tug units can be connected via cables, wireless, GPS, or the like, in order to move the units in a train like manner from one location to the next without the need for an operator to be operating each individual unit. However, the invention also contemplates that at least one of the tug units may be equipped with a pop-up or add on cab such that an operator, i.e. farmer, can manually operate the one or more tug units. In such situations, the additional tug units attach to the manually operated tug unit may mimic or otherwise be controlled by said master or master tug unit.

Other aspects of the invention include that the tug unit may include module components. For example, the power system of the one or more tug units may include modular components such as outlets that may be moved to different locations on the tug unit to provide power for additional equipment and/or implements. The module components may include electrical outputs for powering a generator. Other examples may include modular motors that can be removed from the tug unit and positioned on the implement or equipment in order to operate different aspects of the implement. Additionally, the tug unit may include repair components. For example, a tug unit may include additional row units for use in planting in which a repair tug unit can quickly and easily replace and remove a damaged row unit with a new, modular row unit from the tug unit in order continue planting without delay.

It will be appreciated from the description that many other variations, options, and alternatives may be included as part of the invention. The invention is not to be limited to the specific embodiment enclosed herein.

BRIEF DESCRIPTION OF THE DRAWINGS

FIG. 2 is a side elevation view of the tug unit of FIG. 1A.
FIGS. 9-14 are progressive figures of a tug unit attaching to an implement according to an aspect of the invention.

DETAILED DESCRIPTION OF THE PREFERRED EMBODIMENTS

Figure 1A:
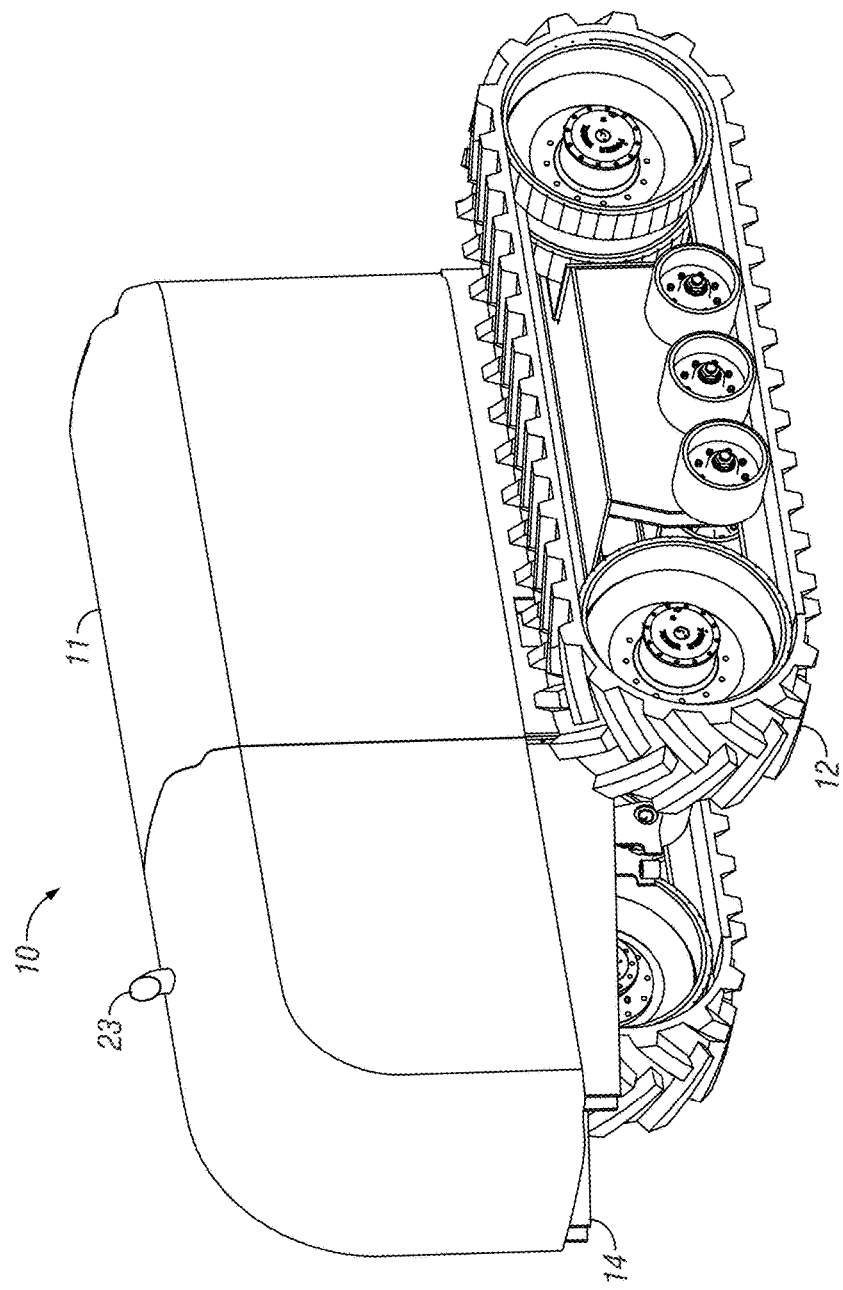
FIG. 1A is a perspective view of a tug unit according to an aspect of the invention.
Figure 1B:
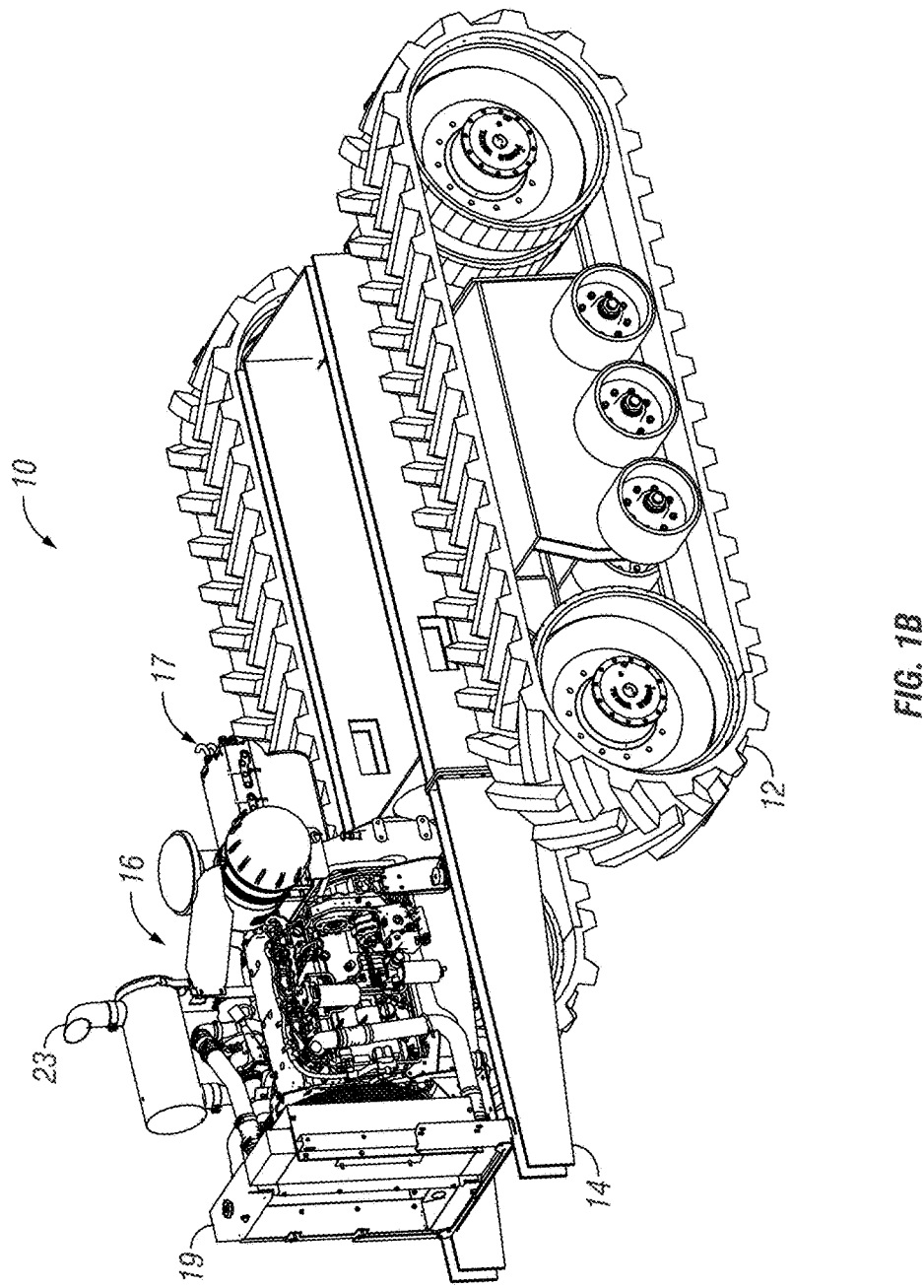
FIG. 1B is a view of the tug unit of FIG. 1A without a cover on the unit.

FIGS. 1A-5 disclose an autonomous vehicle, which may also be known as a tug unit 10, according to aspects of the invention. The tug unit 10 is a self-propelled vehicle that can be used for agricultural and other industry operations. As shown through the figures, the tug unit 10 includes a housing or cover 11. The housing 11 may comprise plastic, metal, composites, or other materials. The housing or cover 11 is removed in FIG. 1B to show some aspects of components housed generally or at least partially within the housing of the tug unit 10. For example, according to some aspects of the invention, the tug unit 10 may include a self-propelled drive system 17. The self-propelled drive system 17 may include an electrical drive system, mechanical drive system, hydrostatic drive system, infinitely variable transmission, and/or a continuously variable transmission. The examples of such drive systems are to be considered exemplary in nature, and are not to be exclusive to the embodiments and/or aspects of the invention. Furthermore, the tug unit 10 includes a power supply or source 16. For example, when the tug unit 10 includes an electric drive system, the power supply may be a diesel electric generator, which includes an exhaust 23. A diesel electric generator will operate to supply power to an electric motor, which controls the drive system and operates the tug unit 10. In addition, other types or sources of generators may also be used instead of the diesel generator, and the invention is considered to include substantially all types of generators for providing power to the various drive sources. The electric motor and/or generator can also provide additional power output to other components, such as plugins or other detachable power sources. However, as mentioned, when other drive systems are to be used, the invention provides that other types of power sources may be included.

In addition to the main power source for providing power to the drive system for the self-propelled tug unit 10, it is contemplated that the tug unit include additional modular power units. For example, it is contemplated that additional electrical motors that can connect to the power supply be included with the tug unit 10. The motors are charged when not in use. When an electric or other power supply is needed, for example at a location where a fan, blower, power tool, or other device is needed, the modular electric motor can be positioned on or near the tug unit 10 to provide said electric power at the specific location. Thus, the modular power supply can be used to provide electric output for different equipment or tools that may be needed at remote locations. Generators, pumps, and/or irrigation systems may need to be operated at remote locations wherein a power source is not located. The modular power supplies of the tug unit 10 can be positioned on, near, or even away from the tug unit 10, in either a wired or wireless manner, such that the tools needing the power can receive power from the modular motors. In addition, as will be understood, the modular motors and/or power supplies 20 (see, e.g., FIG. 5) can be used to operate different components of the attached implement or equipment that are connected to the tug unit 10. For example, when the tug unit is used with a planting implement, the modular motors or power supplies can be positioned on the planter to aid in providing power to actuators for providing weight distribution, down force, and/or folding aspects of the planter. They could also be used to provide power to other components of the implements, such as fans, motors, air seed delivery systems, locations devices, sensors, and the like. This is but one example of the way in which the motors and/or other power outputs could be used.

The tug unit 10 can also include an intelligent control 19. The intelligent control 19 is operatively or otherwise electrically connected to the components of the tug unit 10 and can be used to regulate and operate the tug unit 10. For example, the intelligent control 19 may include operations to operate the drive system. The intelligent control 19 may also include a location determining system, such as GPS, radar, LIDAR, or the like, in order to control the location of the tug unit 10. Further aspects of the intelligent control 19 may include communication devices, such as Wi-Fi, radio frequency, radar, sensors, Bluetooth, or the like. The communication devices of the intelligent control 19 may be used to further indicate the location of the tug unit 10 relative to additional units or objects/obstructions, the status of the tug unit and/or implement attached thereto, areas where the tug should not navigate, as well as other information. The communication portion of the intelligent control can be utilized to emit the information from the individual tug unit to additional tug units, to a master module, to a master vehicle, or otherwise to basically anywhere designated to receive the information. This information can be used to determine the status of the tug unit and/or equipment attached thereto, estimate time to finish an operation, send alerts, warnings, or other messages, or the like.

Furthermore, it is contemplated that the tug unit 10 includes sensors and/or modules. Modules can be placed on and around the tug units 10 and include various sensors to provide information to the intelligent control 19. The sensors may include vision sensors, radar sensors, LIDAR sensors, heat sensors, moisture content sensors, radio frequency sensors, short-range radio, long-range radio, antennas, and the like. These sensors can be grouped in any manner and can be used to determine many aspects. For example, the sensors can be used to determine the location of a nearby object or obstruction. The sensors may be used to determine soil characteristics, such as moisture content, compaction, temperature, and the like. The sensors can also be location sensors such that the tug unit 10 can know when it is on level ground, on a side hill, going up or down hill, etc. The location sensors can also determine areas in which the tug unit and/or implement are not to travel, based upon predetermined and/or programmed data. The sensors can then indicate to actuators or other mechanisms on the tug unit 10 and further to provide a tug unit does not roll over, become stuck, run into an object, or otherwise put itself in an undesirable situation. The sensors could also be used with location determining systems, such as GPS. The combination of the sensors and location determination systems would allow a tug unit 10 to travel to a location without running into obstructions, without running into other tug units or vehicles, without damaging planted or existing crops, as well as with obeying other rules, such as traffic regulations. The sensors and/or location determining systems would allow a tug unit to travel from one location to another, to locations within a field, or otherwise in combination with additional vehicles safely and precisely.

As shown throughout FIGS. 1A-5, other components of the tug unit 10 are included. For example, it has been disclosed that the tug unit 10 includes wheels or tracks 12. It should be appreciated that the invention contemplates that the term wheels and tracks can be used interchangeably for purposes of the tug unit 10. Thus, the tug unit 10 of the invention is not to be limited to the use of either wheels and/or tracks, and contemplates that either and/or both can be used on a same or different unit. In addition, it is contemplated that the wheels or tracks 12 can be interchangeable such that weather conditions, field conditions, and other conditions can be determinative as to whether wheels, tracks, or some combination are utilized together. Furthermore, it is to be provided that the invention contemplates the use of skis positioned on or near the tug unit 10. The skis can be operatively attached to the tug unit 10 to allow for the use of the tug unit in adverse conditions such as snow, sleet, and/or ice. Furthermore, it is to be appreciated that the tug unit is operable in any direction. As shown in FIG. 2, it is generally assumed that the left side of the figure is the forward or front position, while the right side of the figure is the rear or backside of the tug unit 10. However, due to the configuration use of the tug unit 10, it is to be appreciated that the tug unit has no true rear or front end. Thus, it is to be appreciated that the tug unit can go in either direction, i.e. forward or backward, and not be affected in any manner. This is due to the tug unit being programmable to operate and without the need for constant input. The sensors and other input or location receiving components of the tug unit will simply direct the tug unit to where it needs to go, regardless of the direction in which is it going. Therefore, another aspect of the invention provides that when tracks or wheels are used, the tracks or wheels 12 may include a bi-directional treads. The bi-directional treads of the wheels or tracks 12 will allow the tug unit to maintain grip while traveling in either direction with minimal slippage. The bi-directional travel of the tug units 10 also allows the units to be combined with one another or multiple tug units in order to perform certain functions or operations.

It is also contemplated that, when wheels are used, the tug unit 10 provides for full turning rotation of the wheels. This would provide numerous advantages. For example, the full rotation of the wheels would allow for a full 360° turning radius of the unit 10. This would aid in the positioning of the unit. The rotation of all of the wheels would also allow a unit 10 to travel is a substantially sideways manner. As mentioned, the unit 10 can travel in any direction, due to the sensors, drive system, and other components. This is also true for any direction beyond straight forward and reverse. The maneuverability of the units allows them to be used in tighter spaces, and also allows them to escape adverse conditions where previous vehicles may be become stuck.

The tug unit 10 also can include one or more attachment mechanisms 15 for attaching to additional tug units, equipment, implements, or other vehicles or items. It is contemplated that the attachment mechanisms 15 can be quick attach, self-attach, manual attach, or some combination thereof. Furthermore, it is contemplated that the attachment mechanism 15 may be universal such that a tug unit can be used with existing equipment without change to the existing equipment. For example, for equipment that utilize a three-point hitch, the tug unit 10 can be equipped with a three-point hitch receiver such that the tug unit can quickly and automatically connect to the existing equipment. In addition, the tug unit can be provided with multiple attachment mechanisms 15 in order to attach to a different type or styles of equipment or implements. It is to be appreciated that the tug unit of the invention is not to be limited to the types of attaching mechanisms shown and described herein, and can include generally any type of attaching mechanism that is needed for any operation in which the tug unit may be used.

According to some aspects of the invention, the attachment mechanism(s) 15 of the tug unit 10 may include an arm attachment, three-point hitch, power take off connection, flatbed, cable lift, roll box, or some combination thereof. It is also to be appreciated that one or more of the attachment mechanisms may be included on a single tug unit 10. For example, it is to be appreciated that the tug unit 10 may include a three-point hitch on both ends of the unit for attaching to multiple implements. In addition, it is contemplated that a three-point hitch be positioned on one end of the tug unit 10, while a different type of attachment mechanism is positioned on the opposite end thereof. Furthermore, it should be appreciated that two or more of the attachment mechanisms may be positioned on one end, and two or more positioned on the opposite end as well. There is generally no limit to the type and/or number of attaching mechanisms 15 for providing with the tug unit 10, as the attachment mechanisms are also contemplated to be positioned on one or more sides of the tug units. It should also be appreciated that when additional or different types of attaching mechanisms 15 be used with the tug unit 10 of the invention, modifications may be made to said tug unit 10. For example, the cover 11 may be modified to provide for additional space on or near the tug unit 10. Thus, the interior components of the housing 11 of the tug unit 10 may also be moved accordingly in order to provide for the additional attaching mechanisms.

Figure 3:
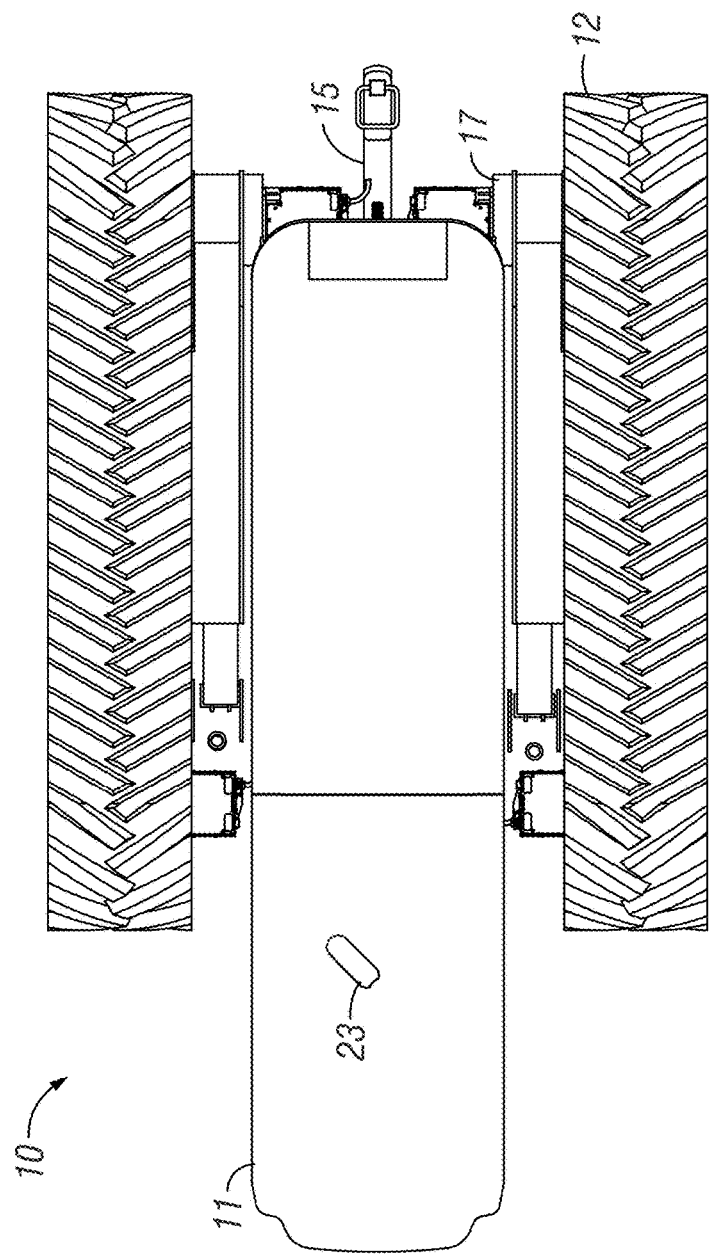
FIG. 3 is a top plan view of the tug unit of FIG. 1A.
Figure 4:
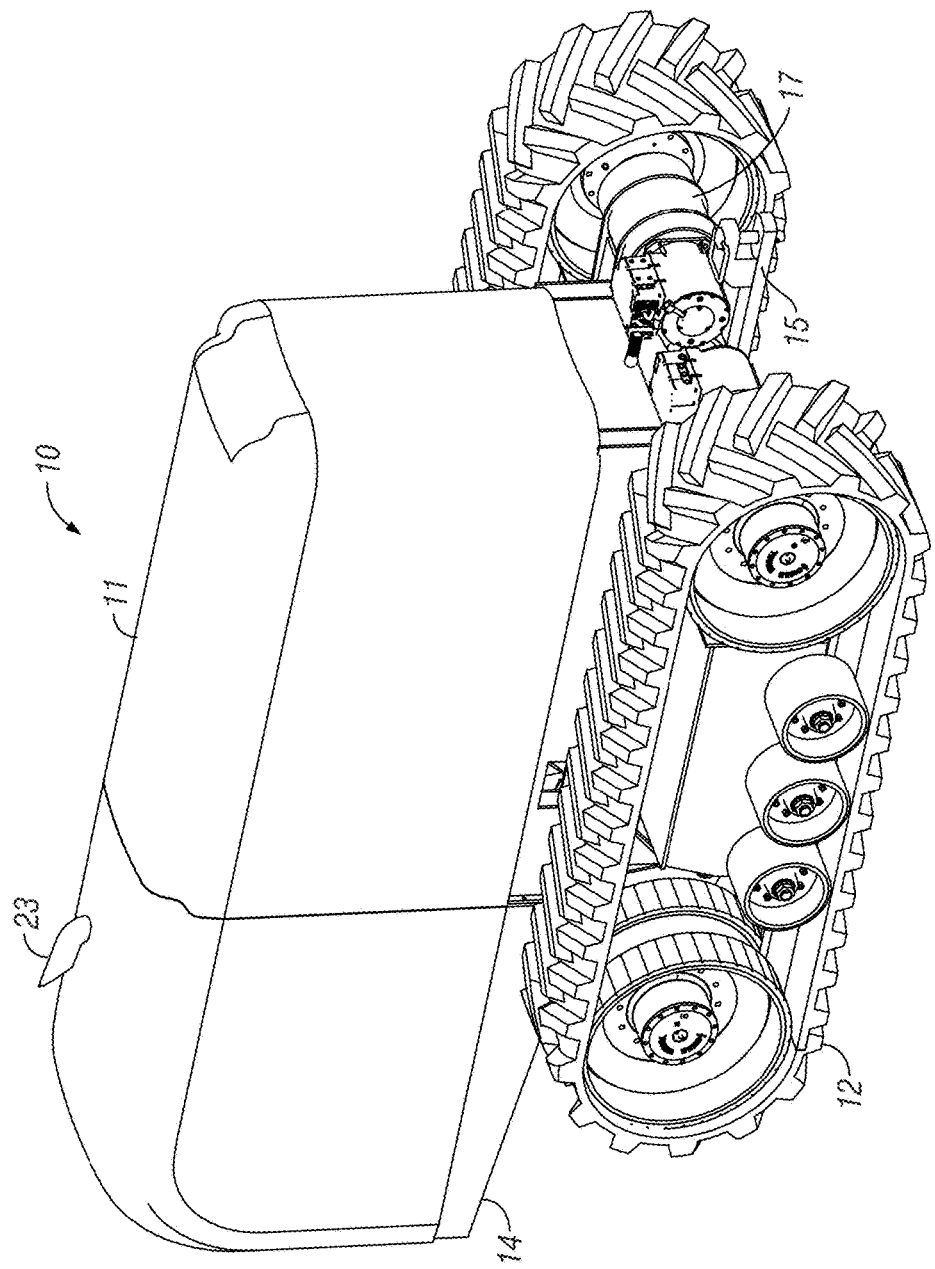
FIG. 4 is a rear perspective view of the tug unit of FIG. 1A.
Figure 5:
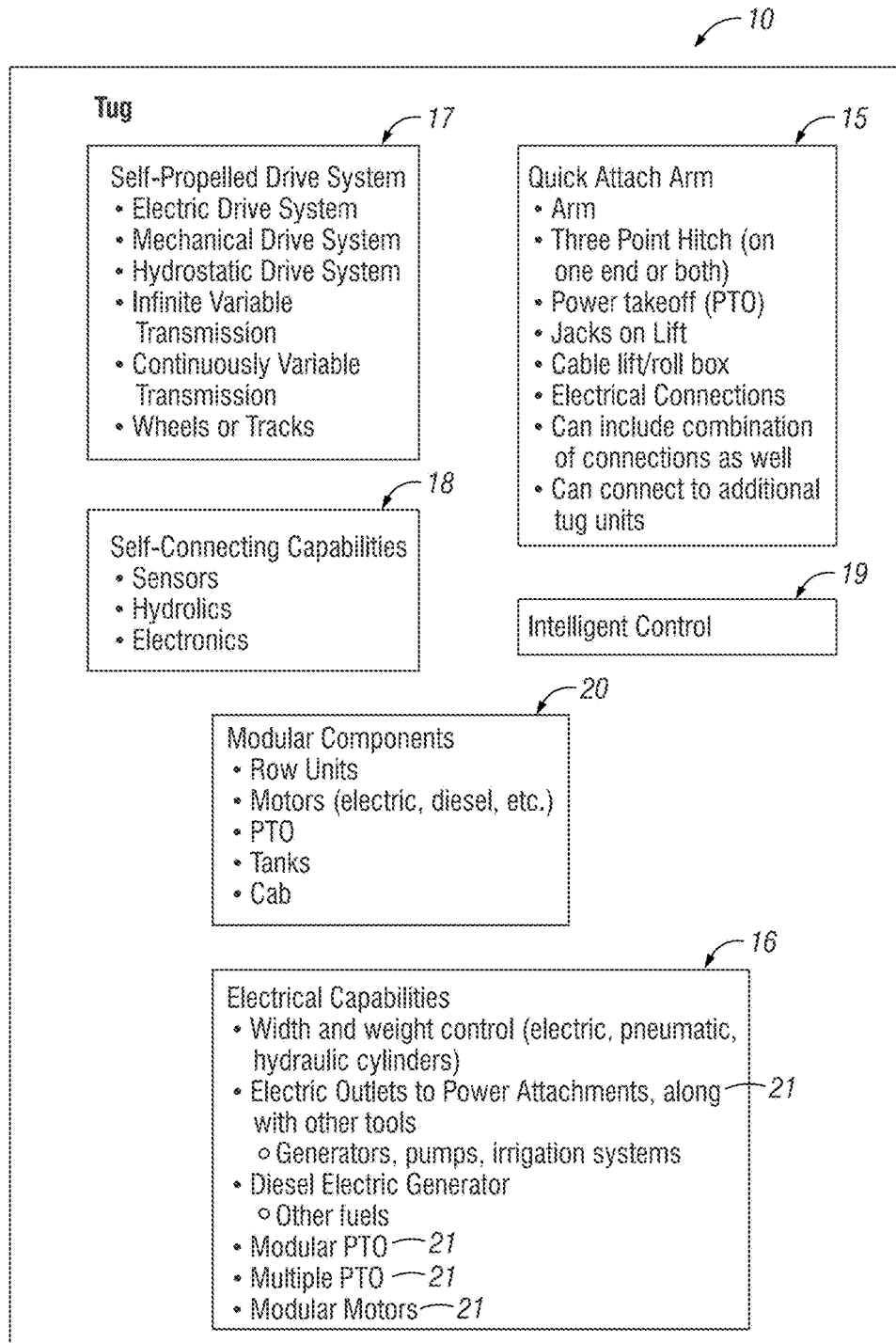
FIG. 5 is a block diagram showing various components and aspects of tug units of the invention.

An example of the ability to provide attaching mechanisms on both sides of the tug unit may be illustrated as follows. It is contemplated that a planting implement may be positioned on one end of the tug unit 10. For example, a planting implement may be positioned at the right side (e.g., the rear end) of the tug unit 10 as shown in FIGS. 2, 3, and 4. In addition, a tilling, thrashing, or other implement may be positioned on the opposite end thereof (e.g., the front end). Therefore, as the implement travels through a field, the tilling implement on the front side of the tug unit 10 may be used to break up compacted soil, trash, stover, weeds, or other obstructions that may be located within or near the field. The implement on the front side of the tug unit 10 may also be accumulating data prior to the planting of the seed by the planting implement. For example, the data collected may include soil hardness or compaction, moisture content of the soil, temperature of the soil, expected depth of the opening wheels of the planter, or the like. This information can then be transmitted to the planting implement or other tug units. The information can be used to adjust the planter such that an ideal depth and spacing is provided for the seeds at each row. When the implement at the front side of the tug unit 10 indicates a more compact soil, the information may be transmitted to the planter such that additional down force is provided at one, multiple, or each of the row units of the planter in order to provide the opening wheels at a depth in order to plant the seed at an ideal depth within the compacted soil. Once the soil becomes less compact, as indicated by the front implement, the down force can be again adjusted to provide less down force such that the seed is not planted at too great of a depth. Other advantages of having an implement on the front and rear side of the tug unit will be apparent to those skilled in the art. Furthermore, as there is no need for a person operating the self-propelled, autonomous tug unit 10, it should be appreciated that the implement on the front side in the direction of the travel of the tug unit can be generally any size without the worry of providing a blind spot for an operator. As the tug unit will be operating based upon input data or location data, such as GPS and sensors, there will be no need for line of sight from the tug unit 10 to the location in front of the unit.

Figure 6:
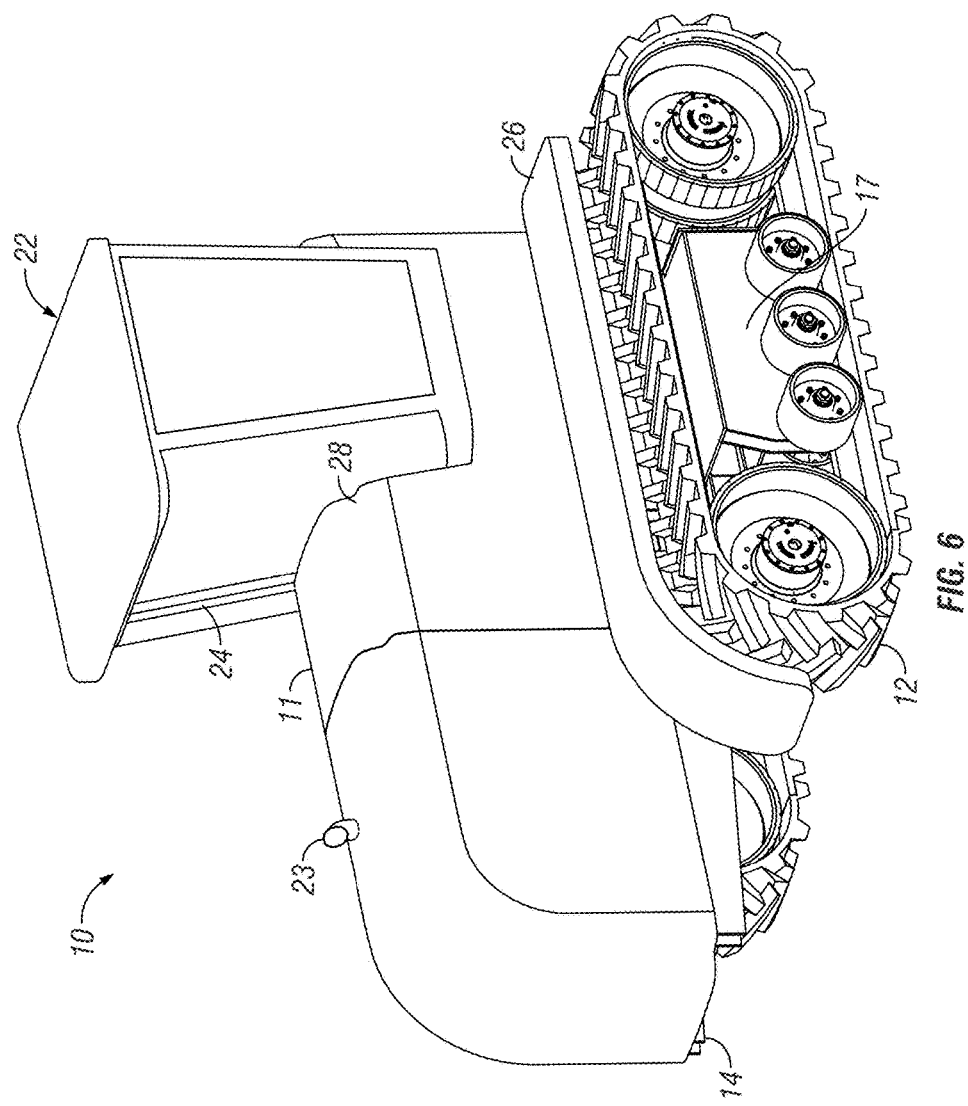
FIG. 6 is a perspective view of another aspect of a tug unit according to the invention.
Figure 7:
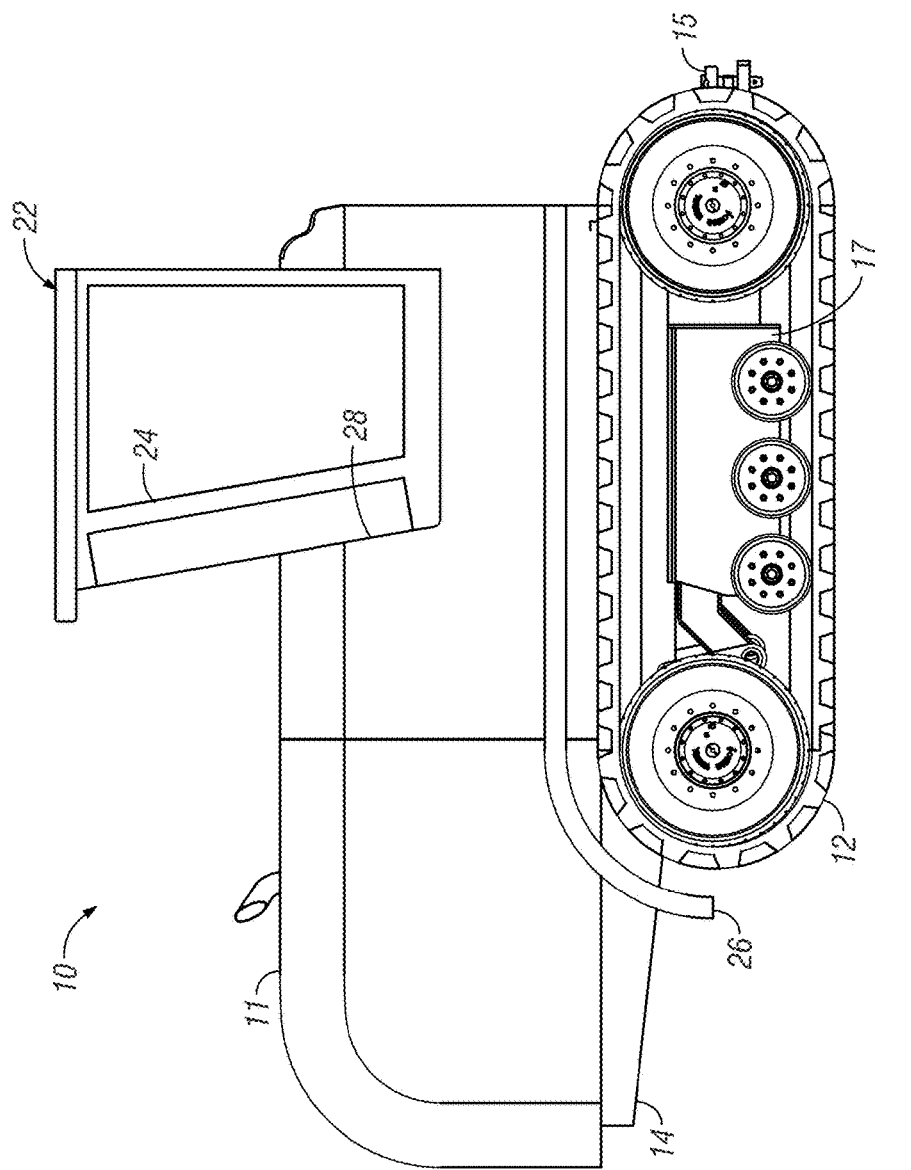
FIG. 7 is a side elevation view of the tug unit of FIG. 6.
Figure 8:
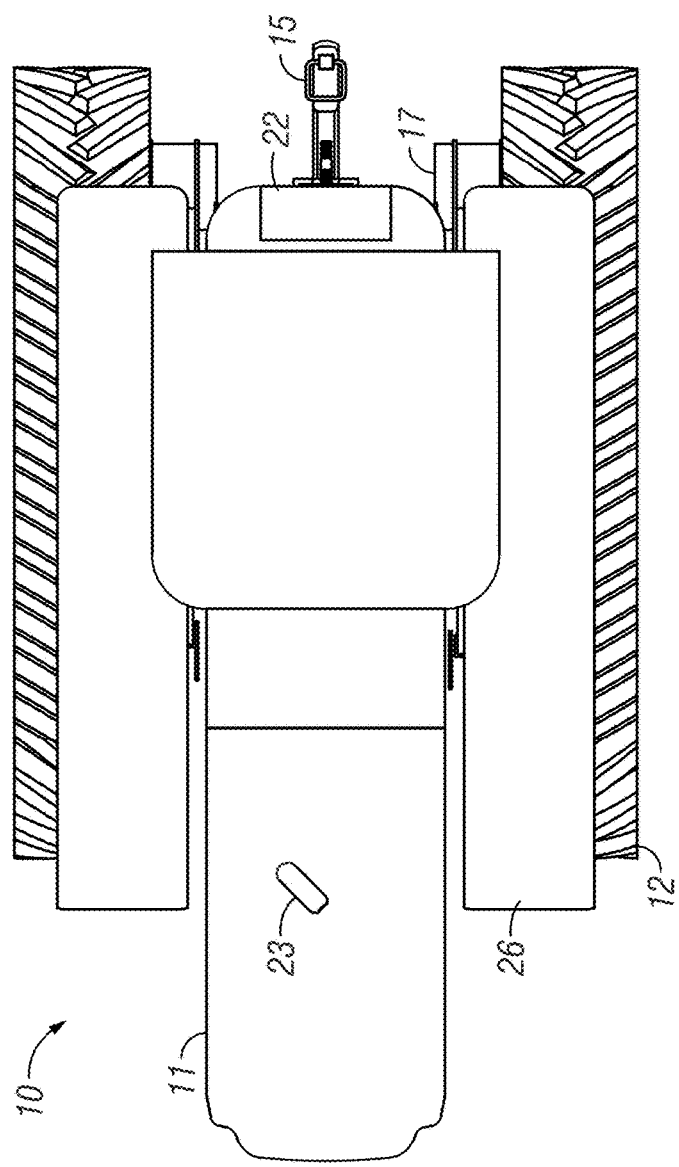
FIG. 8 is a top plan view of the tug unit of FIG. 6.

FIGS. 6-8 show another embodiment of an aspect of the tug unit 10 according to the invention. As mentioned, while the tug unit 10 may be self-propelled and autonomous while in a field, there are situations when the one or more tug units need to be moved using public roads, or in another controlled situation. During such times, it may be desirable to manually operate and control the tug unit 10 to comply with laws and regulations, or to otherwise manually operate the unit(s). Therefore, an aspect of the invention contemplates the addition of a cab 22 for a tug unit 10, such that an operator can manually operate the unit 10 within or near the cab 22. The cab 22 may be an attachable and separate member or may be a pop-up style cab. For example, when a pop-up styled cab 22 is used, the components of the cab may be housed within the housing 11 or other portions of the tug unit 10. An operator can manipulate the tug unit 10 in order to access the cab 22 such that the tug unit transforms to a manually operable vehicle. When an attached cab 22 is used, the components of the cab 22 can be selectably attached to the tug unit 10 to provide a manually operable vehicle.

Components of the cab 22 may include roll over protection devices 24. The roll over protection 24 may include roll bars or other structures to aid in protecting and providing safety for an individual within the cab 22. This may include vertical structures and/or a roof structure. The addition of fenders 26 covering the wheels or tracks 12 may also be provided. The fenders 26 provide additional safety for the operator, and may also include means for accessing the cab 22. Finally, a steering mechanism 28 can be included with the cab 22. The steering mechanism can be a steering wheel, joystick, pedal system, or other operable device to operate the speed and direction of travel of the tug unit 10.

The addition of the cab 22 can be utilized to move the one or more tug units 10 from one location to the next utilizing public roads or access. As will be understood, when multiple tug units are provided, only one tug unit 10 may need to be transformed or otherwise be a manually operable unit. The remaining tug or tugs can be attached to the manually operable tug unit 10, i.e., the master tug unit, and the master tug unit can communicate to the additional tug units as to the type of travel, direction of travel, speed, alerts, path conditions, or the like.

Figure 55:
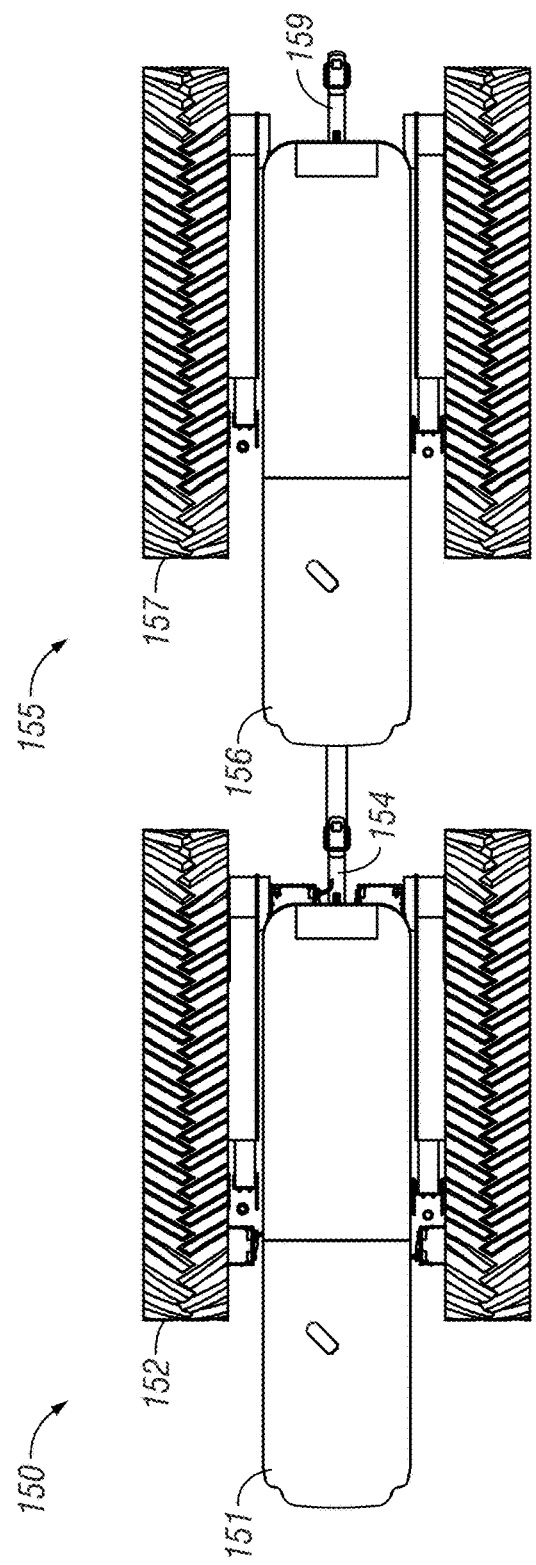
FIG. 55 is a top plan view showing multiple tug units connected to one another.

The tug or a fleet of tugs (a plurality of tug units) could be attached to another vehicle (tractors, combines, trucks, etc.), other than a master tug, to control them down the road. For example, a cord, which may be known as an umbilical cord, can be attached to each of the additional tug units. The cord can transmit information from the master tug unit, or other lead unit such as a tractor or other work vehicle, to the one or more child tug units, which can indicate information such as speed, turning, stopping, external information, or the like. One example of a cord or other attachment between tug units is shown in FIG. 55.

The master tug unit can also communicate to the child tug units wirelessly. For example, when a change occurs manually to the master tug unit, this information can be transmitted wirelessly to the children tug units such that they will also change in a similar manner. This wireless communication can include change in speed, change in direction, or the like. When such non-connection is used, the GPS coordinates, sensors between units, Bluetooth, Wi-Fi, light beams, and/or some combination thereof may also be utilized to provide additional safety. For example, the sensors may include light, vision, radio frequency, or other sensors on or around the units to indicate the presence of items, including obstructions, signs, other vehicles, curves, etc. A vision sensor may be included such that the unit can "read" the shape of road traffic signs to indicate to the unit an instruction. For example, the vision sensor may read the shape of a stop sign such that the sensor indicates for the tug unit to stop. At such a location, additional sensors can emit data collection around in a 360° manner from the tug unit to indicate the presence of any other objects. When no object or objects are detected, the tug unit 10 receives further instruction to proceed travel once again. The vision sensors will be continuously updated in order to provide the change in any additional item, such as another vehicle, person, object, or anything else that may obstruct the travel of the tug unit 10.

The master unit will travel in a leading path, such as in a path determined to be the shortest distance on roads between a first field and a second field. The master will communicate this leading path, as well as updated information related to the path, to the following vehicles. Such information can include that information previously disclosed. The following vehicles, upon receipt of the updated information communicated thereto, will determine a following path of the master unit such that the following vehicles will travel similarly to the master unit towards the intended destination, which may be the second field. The communication of information between the vehicles will allow a convoy-like travelling of the vehicles to maximize the safety of moving the plurality of vehicles without having to load and unload the vehicles on a trailer or other transport device. The communication, as mentioned, can be wired through and umbilical cord-like mechanism, or can be wireless, such as via wireless connections between the plurality of units.

Furthermore, the tug unit may include additional aspects to comply with the regulations and laws, while also providing greater use in a field or other environment. For example, the wheels or tracks 12 may be attached to a mechanism such as actuators that can control the width of the tug unit 10. Thus, width and height of the wheels of the tug unit 10 can be selectively or automatically varied. This will provide greater stability when going through fields and hilly environments. For example, when traveling on a side hill, the tracks may be widened and the height of one or more of the tracks may be manipulated to provide stability such that the tug unit does not roll over. This will also move the weight or center of gravity or mass of the tug unit to a different location. In addition, many laws and regulations have standard width requirements for vehicles. Thus, when transporting the tug unit(s) to a different location on a public road, the actuators and sensors can be manipulated to reduce the width of the tracks and/or wheels 12 to comply with said laws and/or regulations.

The vehicles, including the master and/or any follower or children vehicles, will utilize the sensors to continue to obtain information as the vehicles travel from one field to another or to another end destination. The obtained information will be continuously or randomly communicated to the other vehicles. This information can be used to adjust the transport of the vehicles. The information can affect one or more of the vehicles to change an aspect such as the speed of one or more of the vehicles, the path of one or more of the vehicles, the distance between one or more of the vehicles, the distance between one of the vehicles and a non-transporting vehicle (such as a standard operating vehicle with driver traveling the road), the width of one or more of the vehicles, the height of one or more of the vehicles, or some combination. For example, the master unit could sense a stop sign, which would then communicate to the others to stop as well. If connected wireless, each additional following vehicle would know that it needed to stop. Furthermore, if one of the vehicles indicated an obstruction or other problem with the first determined path, it could determine a secondary path and communicate the same to the other vehicles such that the secondary path would then become the path taken by the vehicles. It should also be noted that only one or some other subset of the vehicles need an adjustment. For example, the vehicles will not always be the same. The vehicles may include various implements, such as a combine, grain cart, planter, or otherwise, all traveling together. One of the units could determine a height, width, or weight restriction on the path of travel that could affect one or more of the transporting vehicles. In such a situation, this could be communicated to one or all of the vehicles, at which point the affected vehicle(s) could adjust as aspect of their travel, such as changing their following path to avoid the restriction. Other information that would suggest a change in the travel of the vehicles can be obtained and communicated to one or more of the vehicles as needed.

FIGS. 9-14 are progressive figures of a tug unit 30 attaching to an implement 35 according to an aspect of an attachment mechanism 34 of the invention. As shown in the figures, the tug unit 30 includes a shortened housing or cover 31, for covering the internal components of the tug unit 30, which were described with regard to the tug unit 10 previously. In addition, the unit 30 includes wheels or tracks 32 and a frame 33. The frame 33 supports the components with the housing 31, attaches to the wheels or tracks 32 and also provides a portion for the attaching attachment mechanism 34. The FIGS. 9-14 indicate one aspect of attaching the tug unit 30 to an implement 35. The implement 35 is shown to be a tank on a frame. The frame may include an existing attaching member 36 or may have a portion for attaching a member 36 thereto. The attachment member 34 of the tug unit 30 shown in the figures is an arm 37 with a hook 38. The arm 37 is connected to the frame 33 of the tug unit 30 at a pivot point 39. Actuators, such as pneumatic, hydraulic, electric, or some combination thereof may also be included to operate the arm 37.

Figure 9:
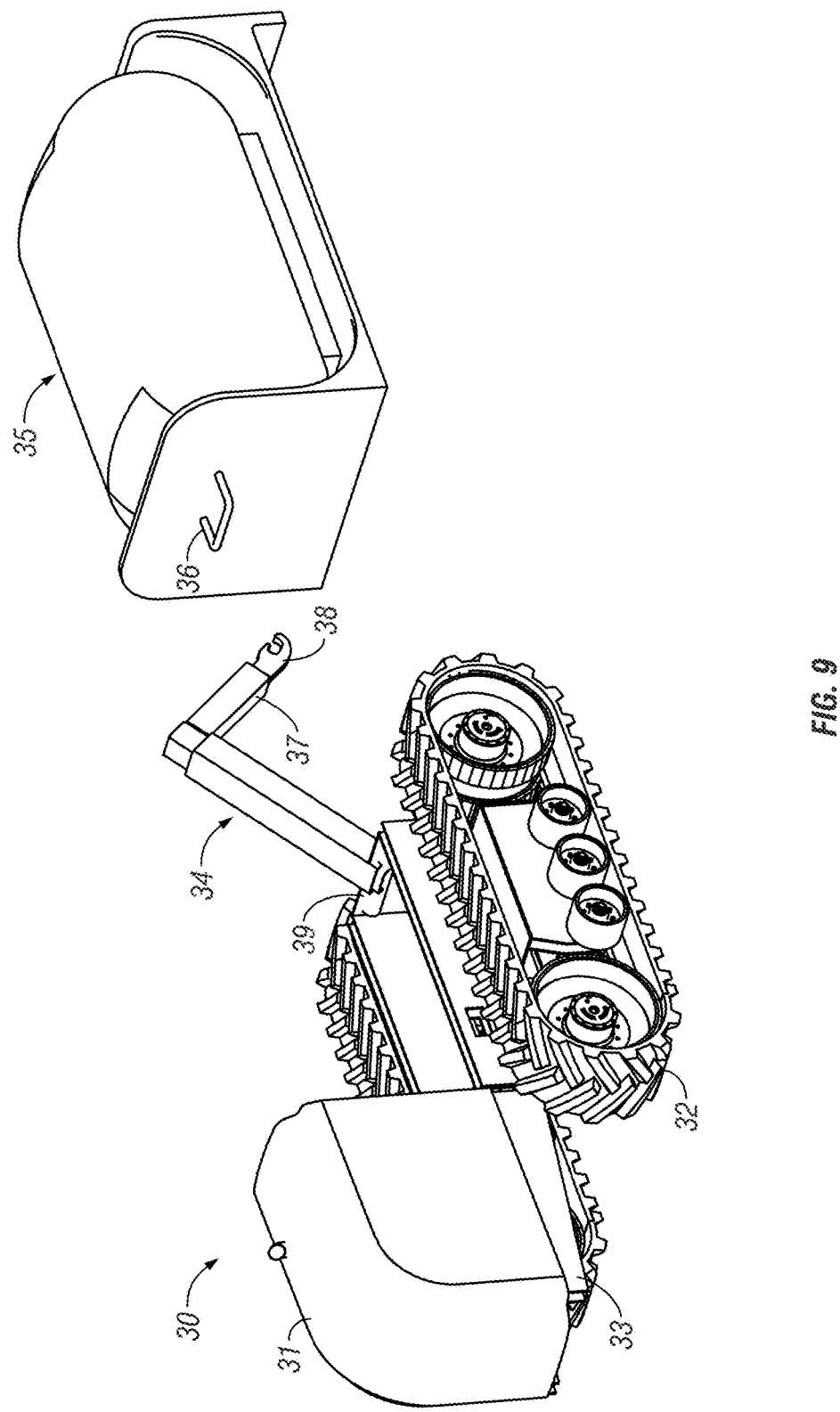

As shown in FIGS. 9 and 10, the tug unit 30 travels towards the implement 35 with the arm in a generally outstretched position from the unit 30. At the end of the arm 37 is a hook member 38. The hook member 38 may be any attachment means. For example, the hook can be a simple hook, it can be a pin or clasp, or it can be any other member for securely attaching to an attaching member 36 of the implement 35. As shown in FIG. 11, the tug unit 30 moves until the hook 38 is in an attachment location near the attachment member 36 of the implement 35. At this point, the tug unit 30 is ready to manipulate the attachment mechanism 34 to attach the implement 35 to the tug unit 30.

Figure 12:
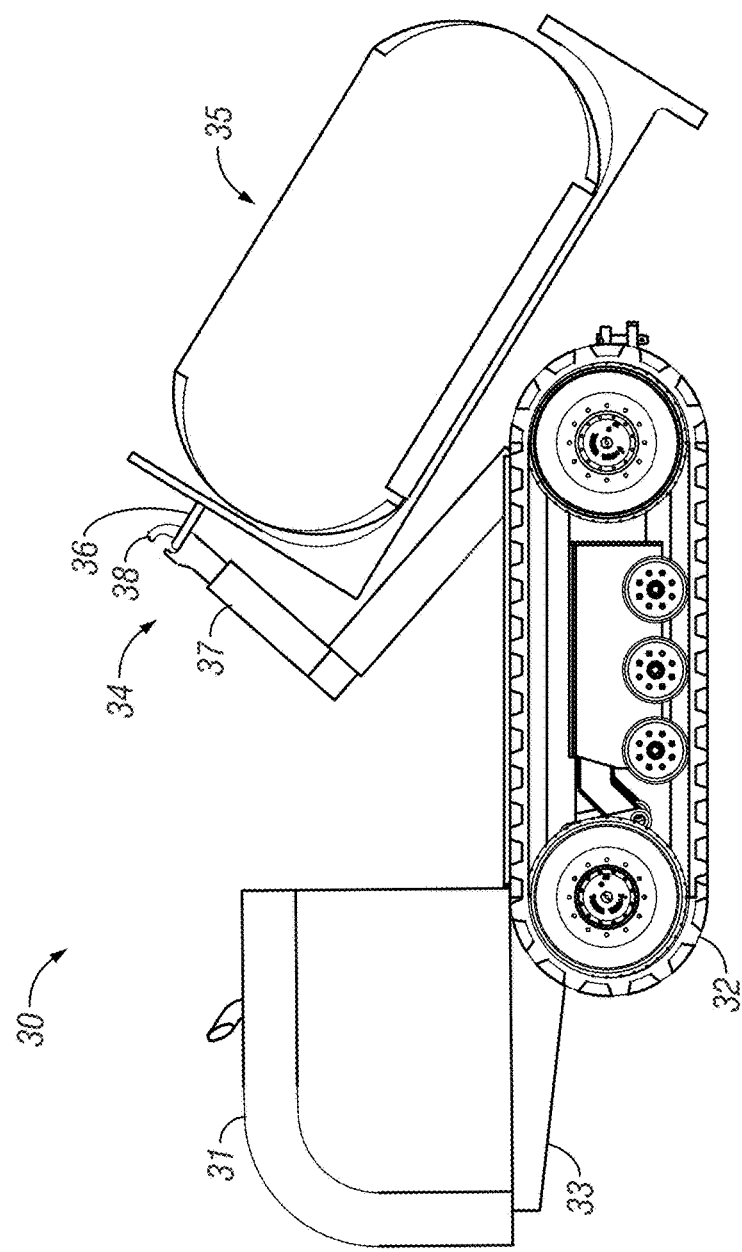
Figure 13:
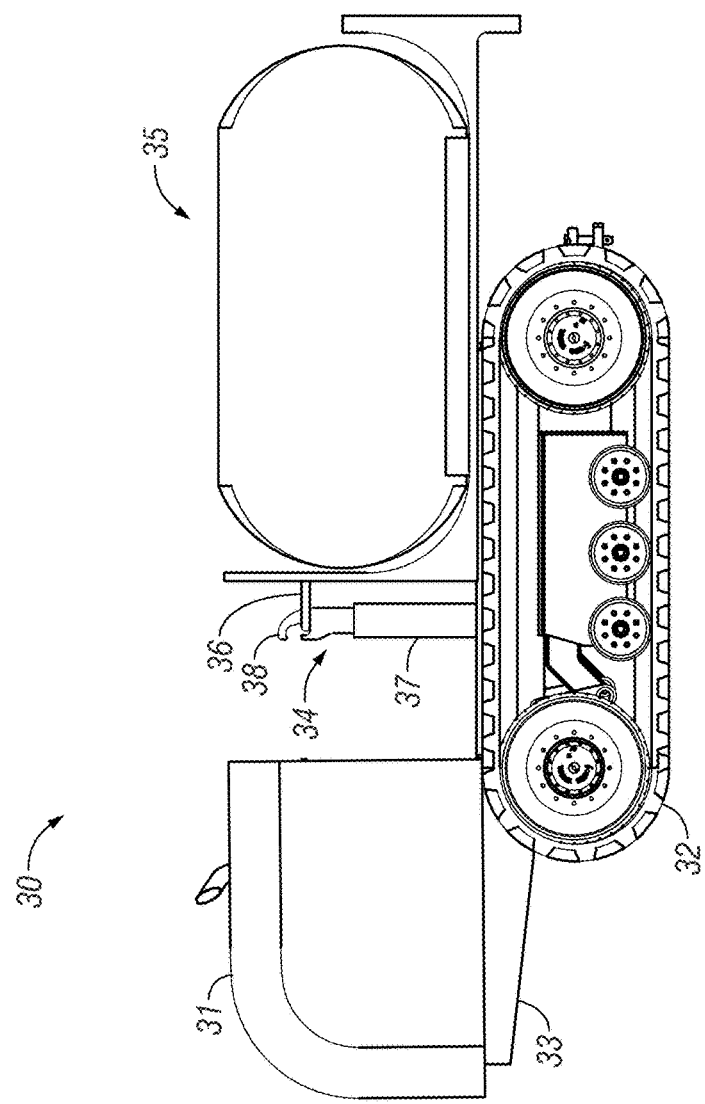
Figure 14:
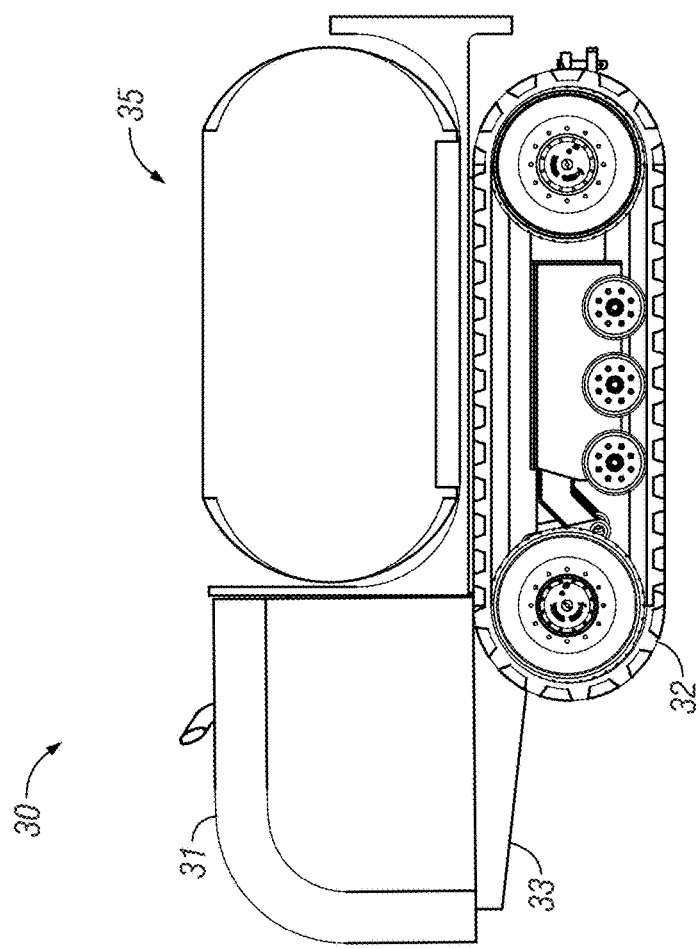

As shown in FIG. 12, the arm 37 will begin to rotate about the pivot point 39 at the end of the frame 33 of the tug unit 30. The rotation of the arm 37 will begin to lift the implement 35 onto a portion of the frame 33 of the tug unit 30. The rotation of the arm 37 will continue until the position shown in FIG. 13, wherein the portion of the arm 37 is generally vertical. At this position, the implement 35 is raised completely off the ground and is positioned on a frame portion of the tug unit 30. At this point, the arm 37 is moved in a direction towards the housing 31 of the implement. Therefore, additional cables, actuators, gears, or the like may be utilized to transport the pivot point 39 and arm 37 from the right of the frame 33 towards the housing 31 of the tug unit 30. This continues until the position shown in FIG. 14, wherein the arm 37 may be retracted into the housing 31, and the frame of the implement 35 is positioned generally adjacent the housing. The arm 37 will still be connected to the attachment member 36 of the housing to ensure that the implement 35 remains in place on the tug unit 30 during use of the tug unit 30 and implement 35 combination. Additionally, other connections may be made between the tug unit 30 and the implement 35 for operating the implement 35. For example, electrical connections, hydraulic connections, power take-off connections, pneumatic connections, or the like may be utilized in order to provide power or other operations from the tug unit 30 to the implement 35. Other securing members, such as hooks, locks, or the like can be included to further secure the implement to the unit 30. Once the tug unit 30 has finished use of the implement 35, the process can be reversed to replace the implement 35 at a location such that the tug unit 30 can be used in another manner. For example, the tug unit 30 may utilize all of the material within the tank such that a replacement tank must be attached to the tug unit for additional use. The tug unit may then be connected to a different implement for a different operation.

Furthermore, as will be understood, while the tug unit and tank combination is used, the tank may run low on supply. As mentioned, the tug unit can be receiving information from the implement as the operation is being completed. Thus, when the tank begins to near empty, the tug unit will update this information and can transmit this information. An additional unit, such as an additional tug unit, can be alerted to travel to the location of the tug unit 30 to refill the tank. Thus, the invention contemplates the use of maintenance or tender tug unit that can refill materials, such as tank material, fuel, or the like, during operation of the tug unit/implement so that there is little to no delay in the operation.

FIGS. 15-19 disclose additional progressive figures of a tug unit 40 attaching to an implement 45 according to another aspect of the invention. The tug unit 40 is similar to that disclosed previously, and includes a housing cover 41, tracks or wheels 42, and a frame 43. Furthermore, the tug unit 40 includes an attachment mechanism 44, which is shown to be a three-point hitch 47. The three-point hitch 47 is attached to the tug unit 40 via a four bar linkage 48. The tug unit 40 shown in the figures can be utilized to attach to any implement or equipment that is configured to be attached to a three-point hitch. The three-point hitch 47 and four bar linkage 48 can be connected to the tug unit 40 and can also be connected to an actuator, such as a linear actuator, hydraulic actuator, pneumatic actuator, or the like. The actuator can provide vertical movement of the three-point hitch 47 via the four bar linkage 48.

Figure 15:
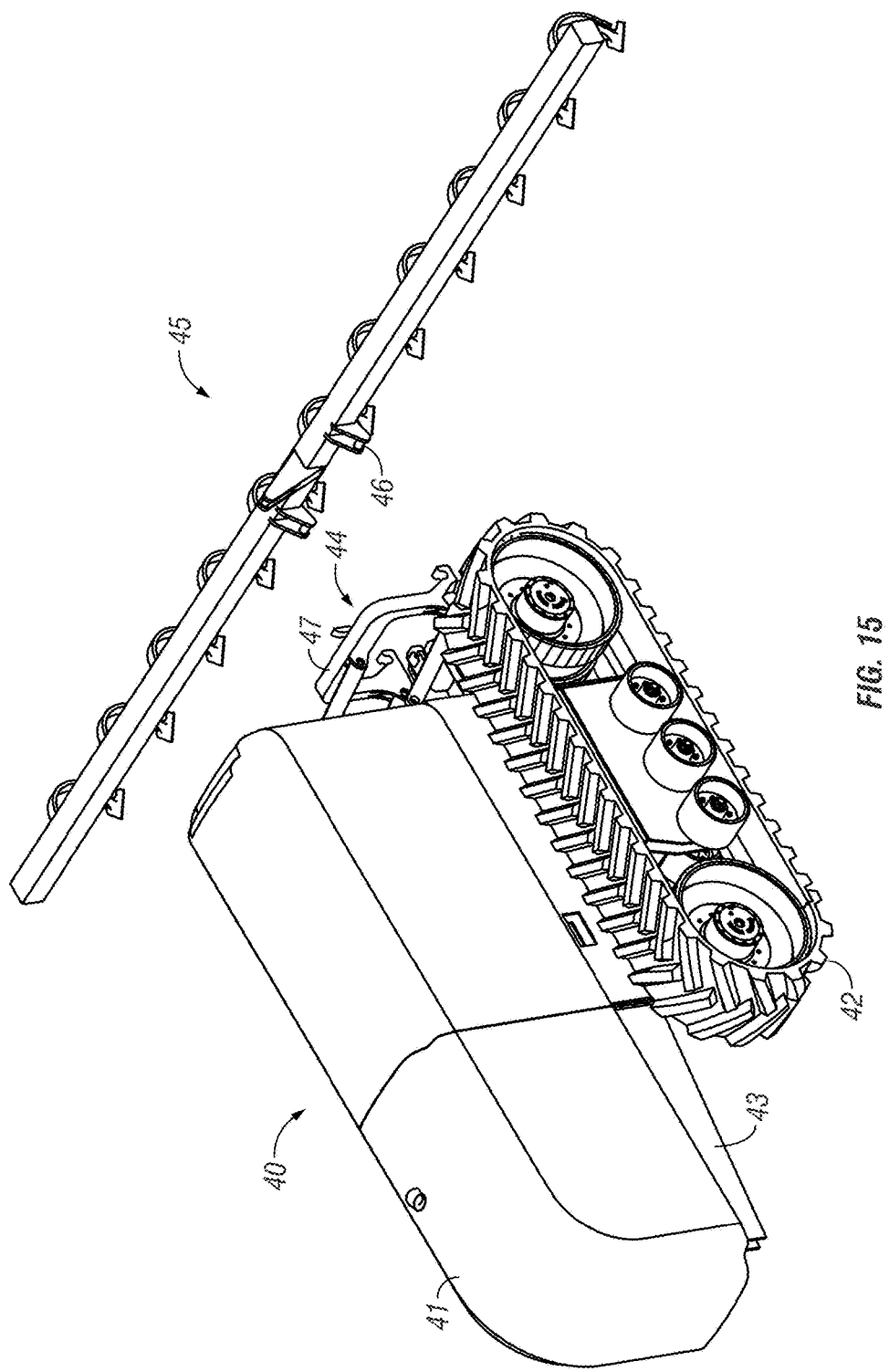
FIGS. 15-19 are progressive figures of a tug unit attaching to an implement according to an aspect of the invention.
Figure 16:
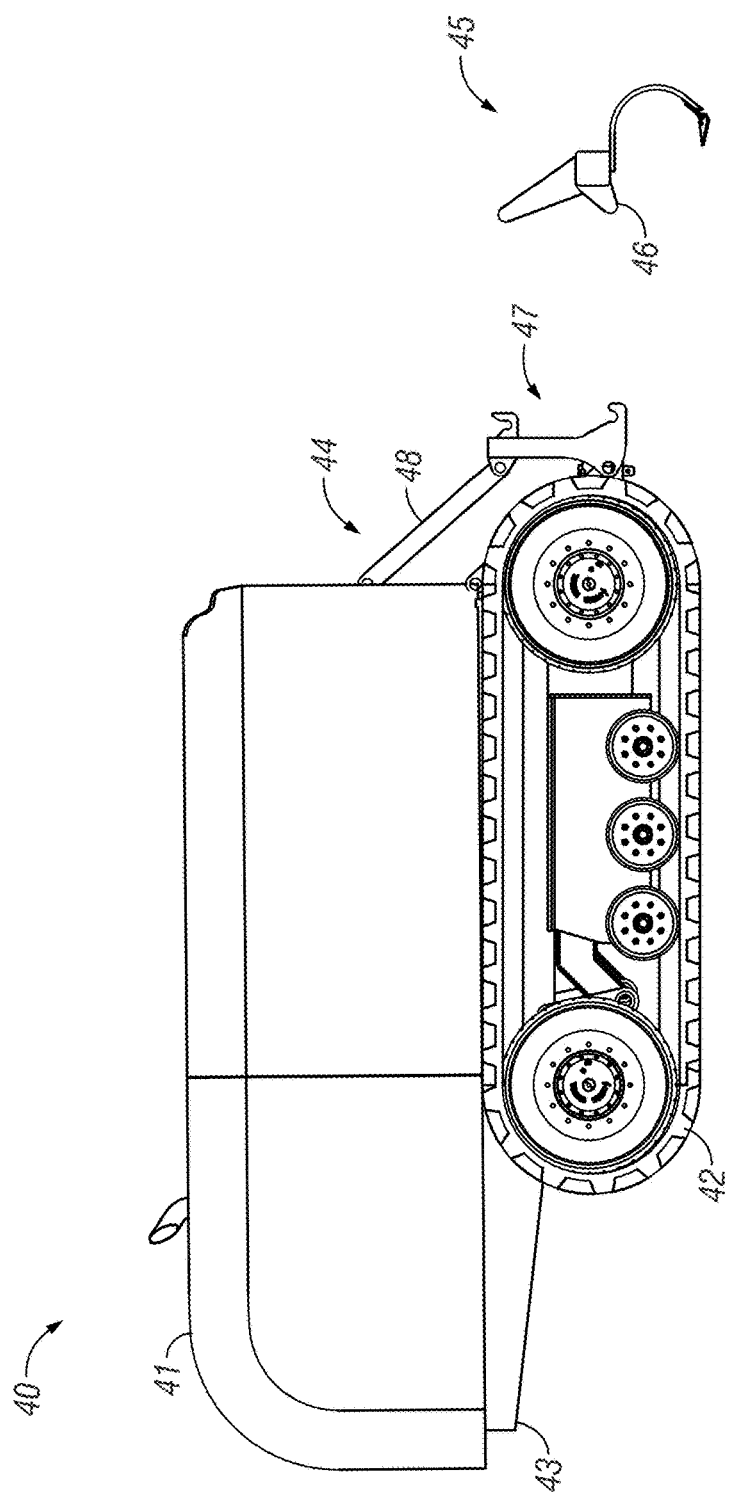
Figure 17:
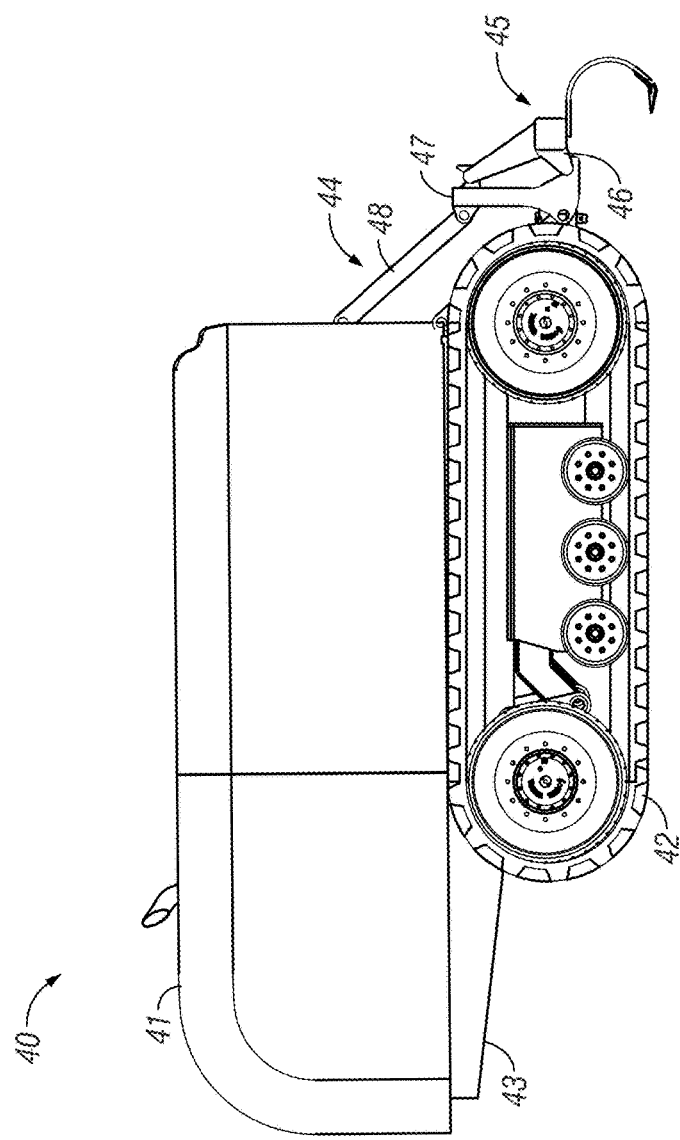

FIGS. 15 and 16 show the tug unit traveling toward the implement 45, which is shown to be a tilling implement. The tilling implement 45 includes a three-point hitch receiver 46. Therefore, as the unit 40 moves towards the implement 45, the four bar linkage 48 is lowered such that the three-point hitch 47 can be received by the attachment member 46 of the tilling unit, as shown in FIG. 17.

Figure 18:
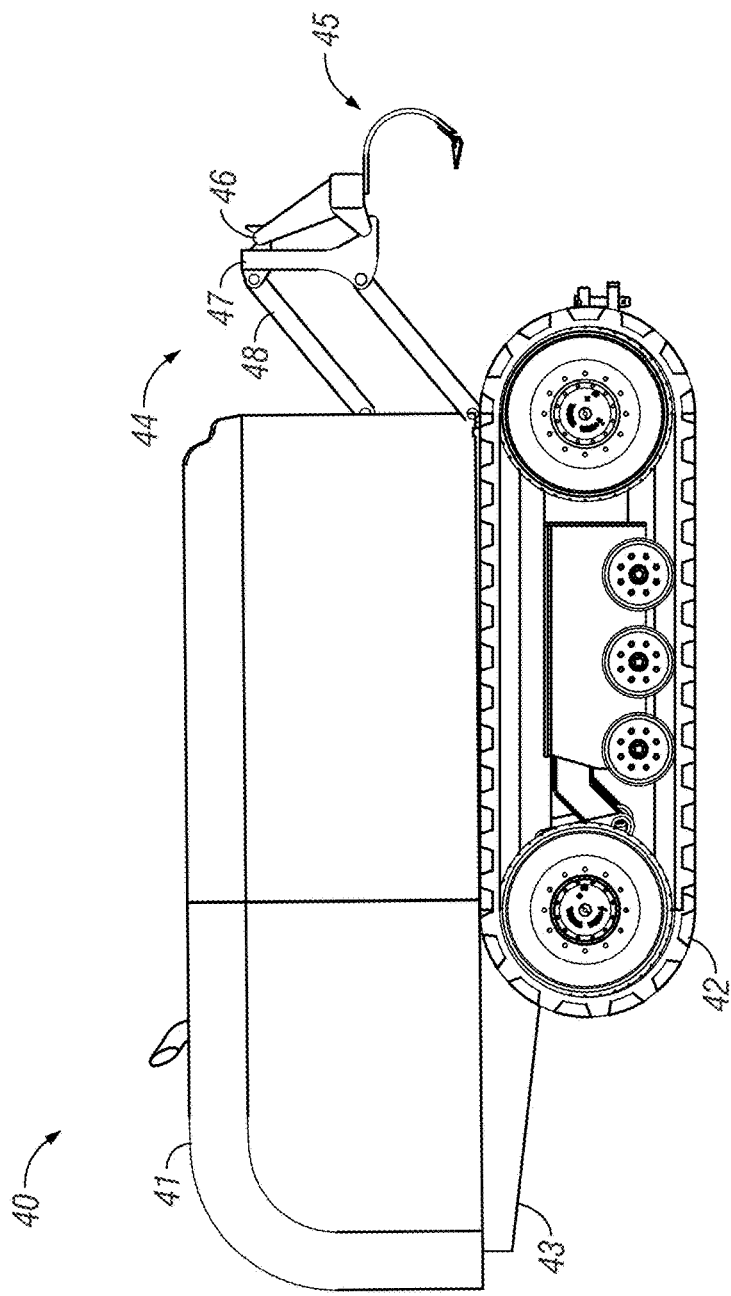
Figure 19:
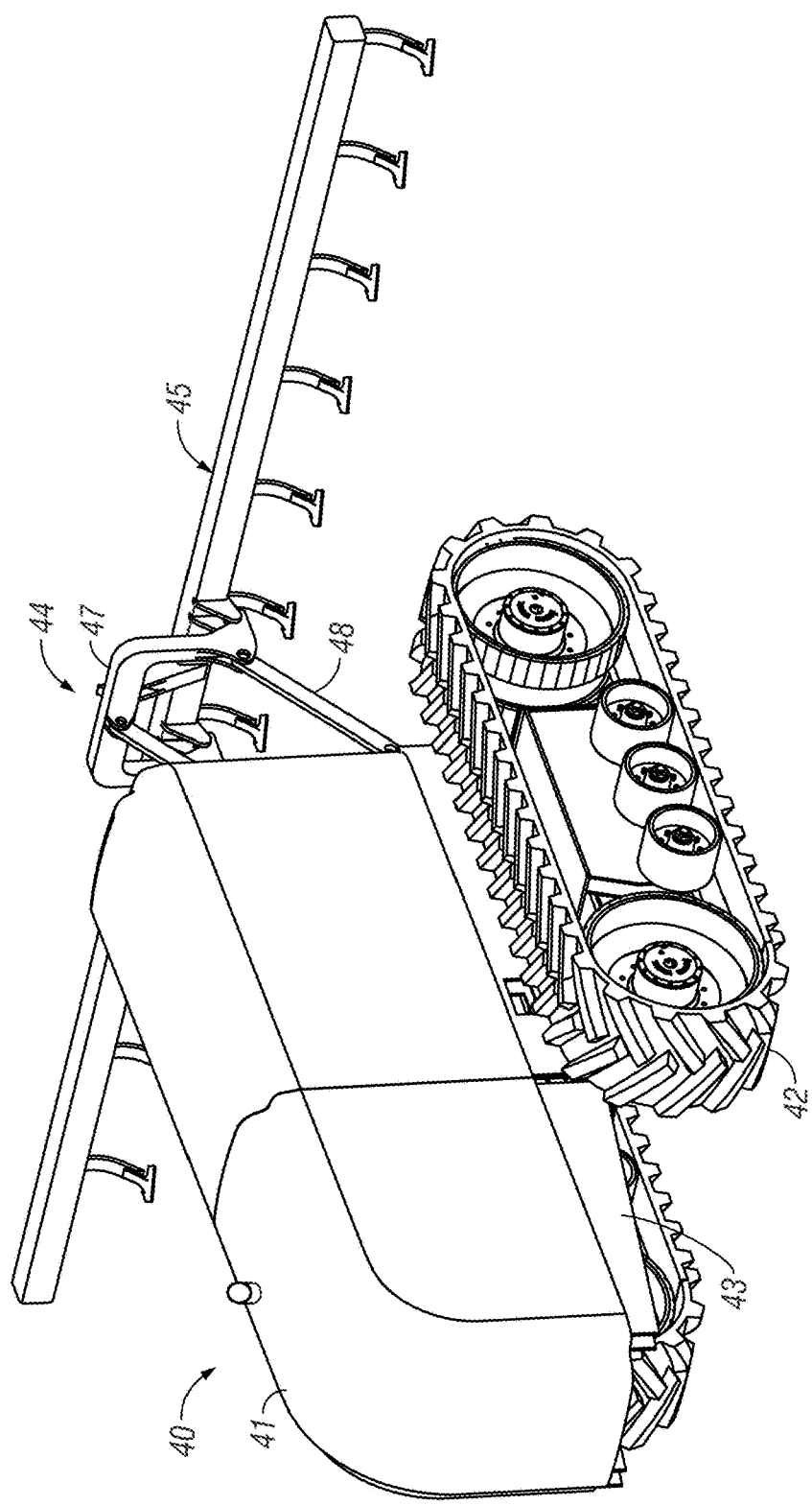
Figure 20:
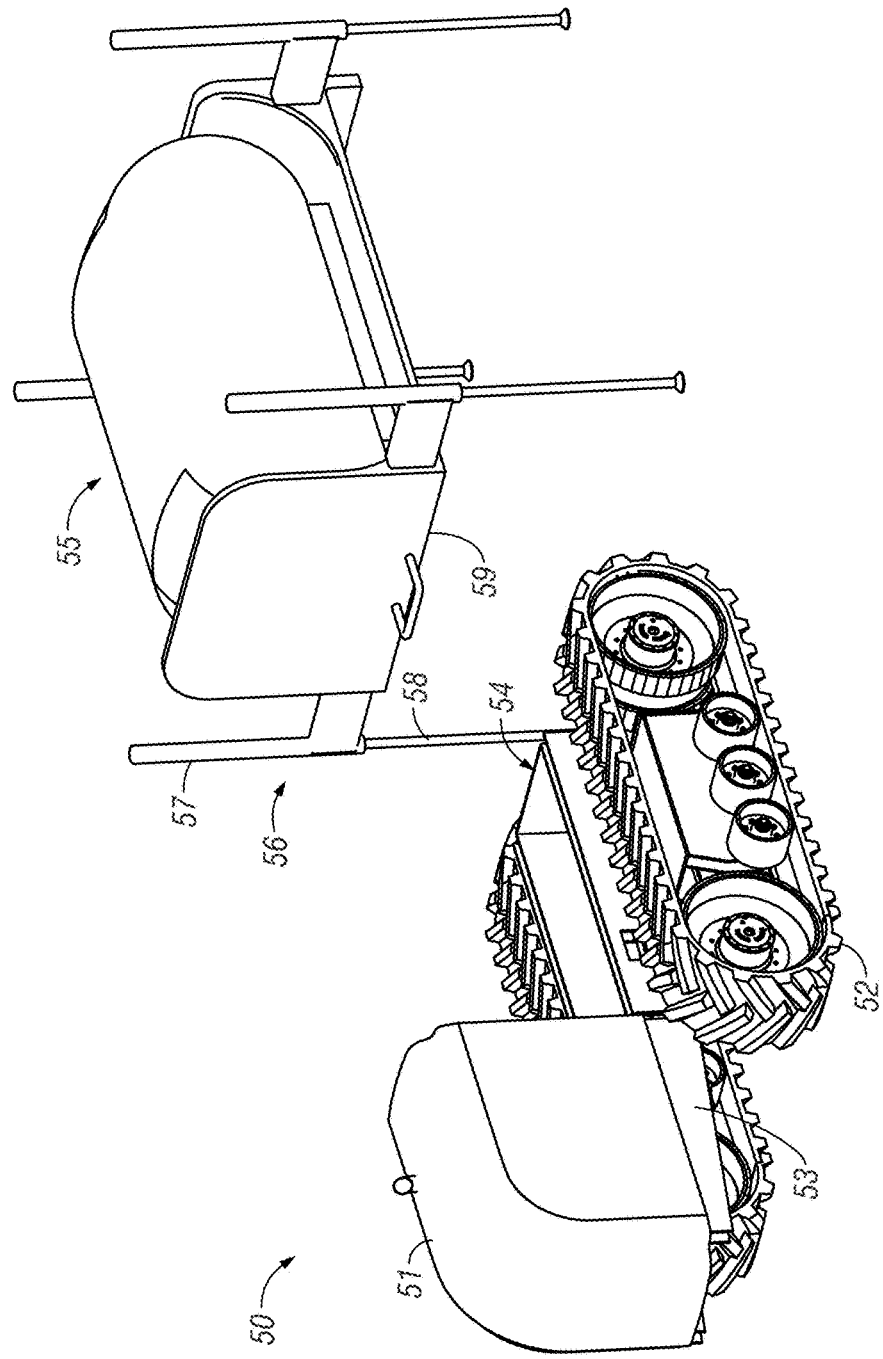
FIGS. 20-27 are progressive figures of a tug unit attaching to an implement according to an aspect of the invention.
Figure 21:
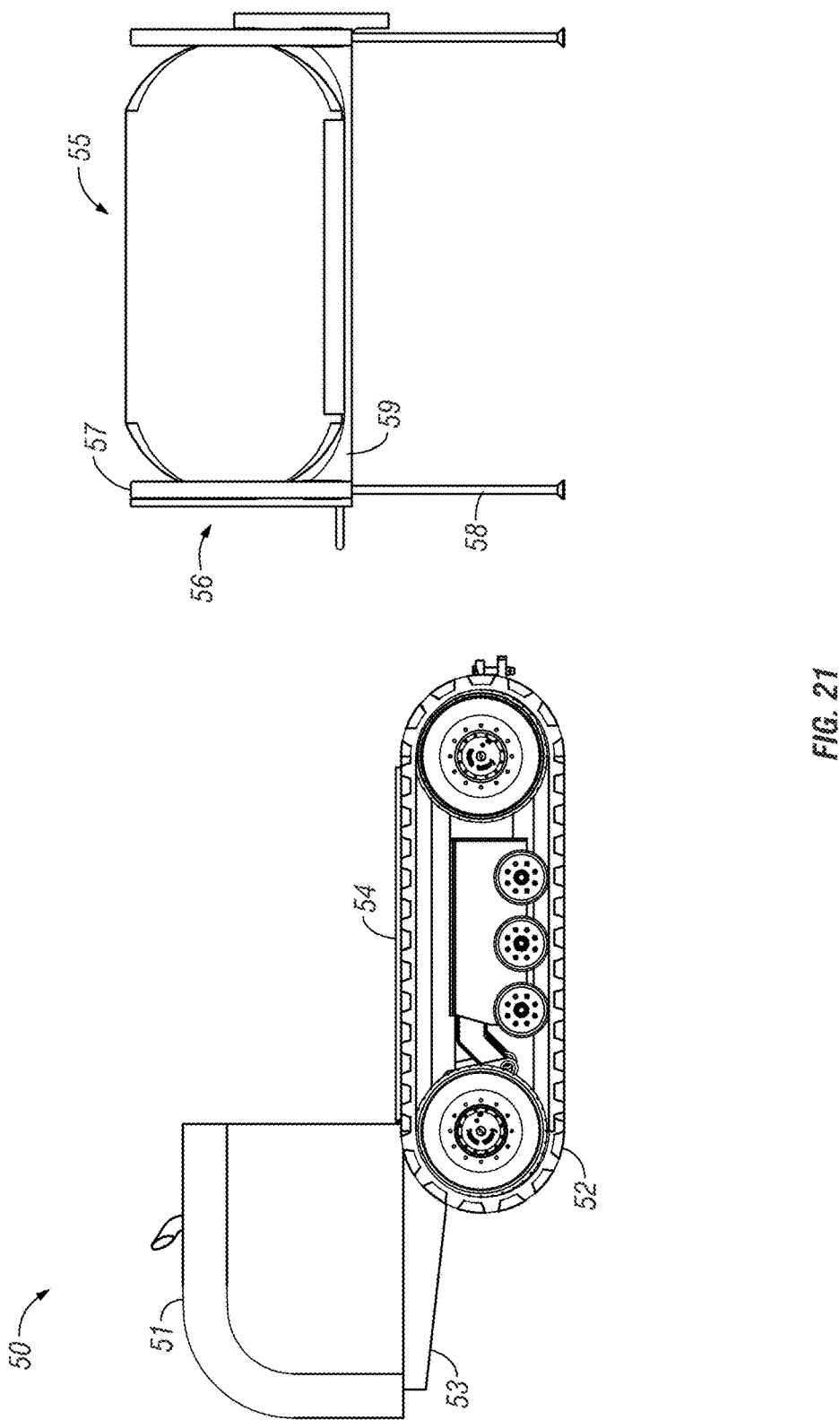
Figure 22:
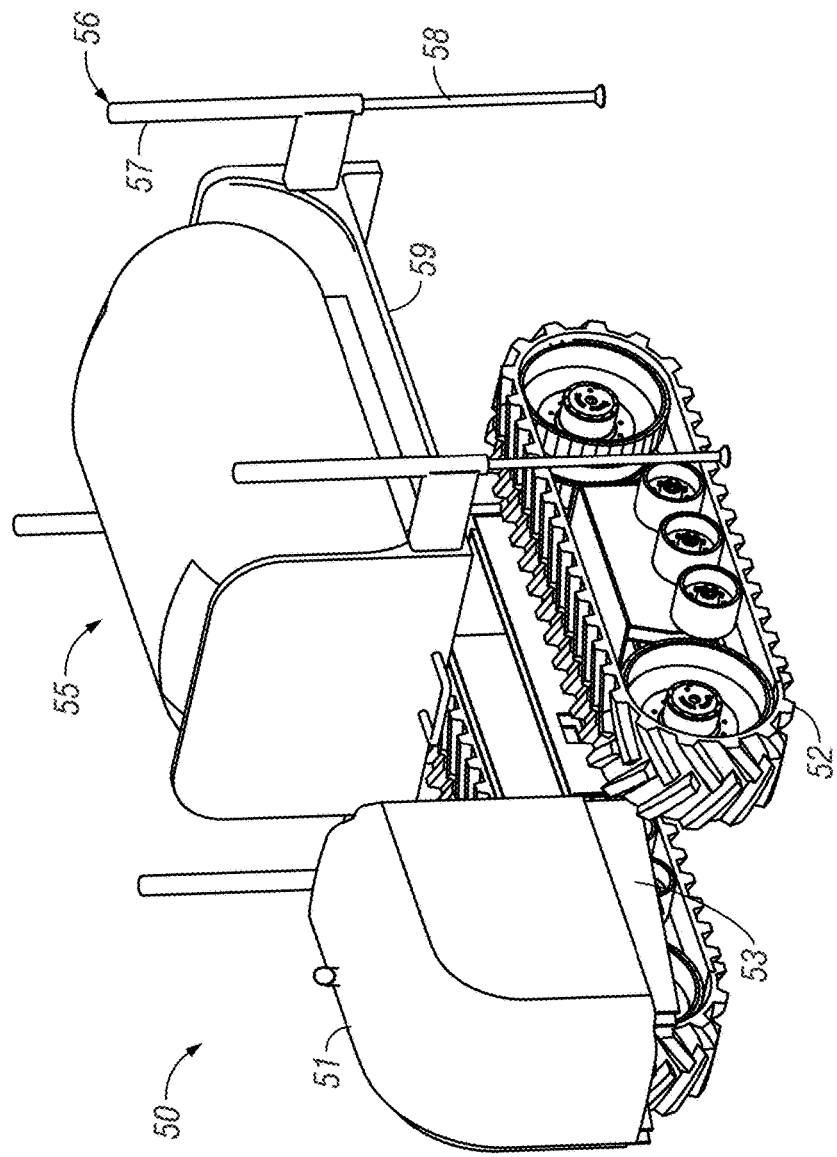
Figure 23:
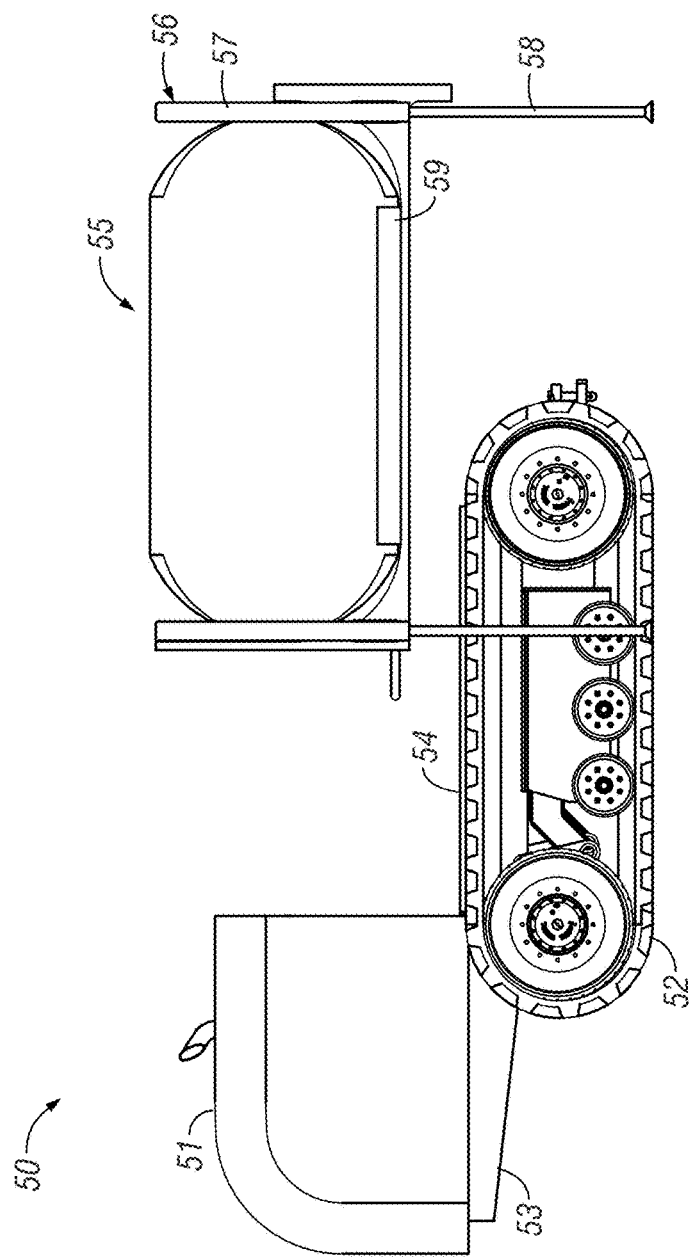
Figure 24:
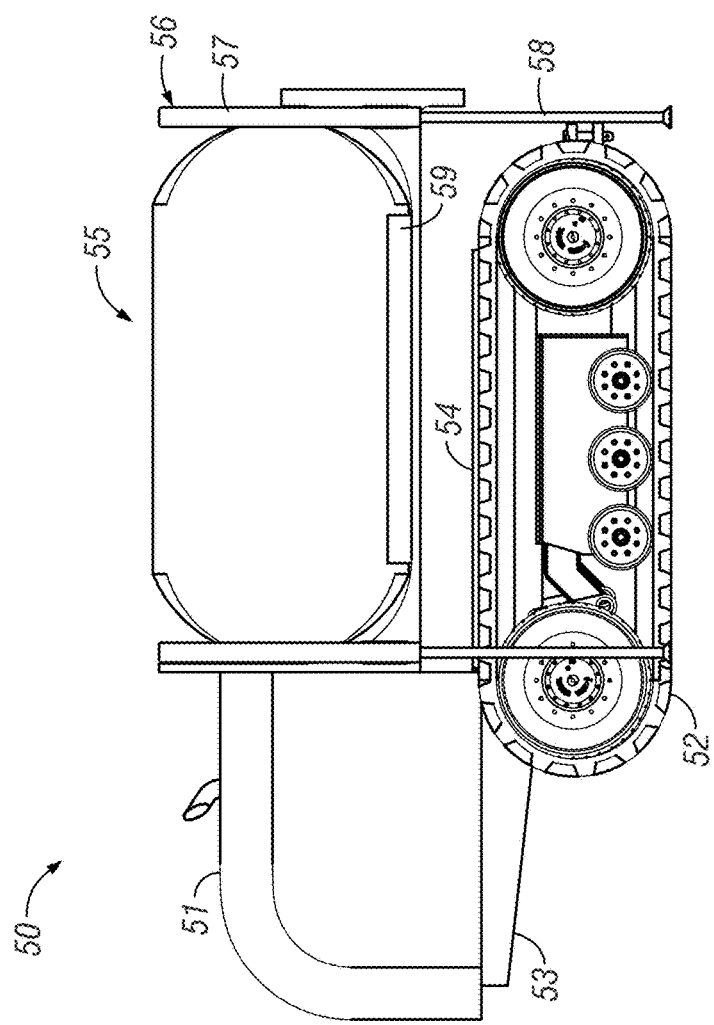

At this point, the four bar linkage 48 can be lifted, as shown in FIG. 18, to further connect the three-point hitch 47 to the implement 45. The lifting of the implement 45, as shown in FIGS. 18 and 19, allows the tug unit and implement combination to travel to the location of tilling in a field without tilling in an unwanted area. However, at the location where the tilling is to begin, the four bar linkage 48 can be lowered to position the implement 45 in the ground so as to begin tilling through the field. Once completed, the tug unit 40 can travel to position the implement 45 at its original or other desired position, and can be disconnected from the implement 45 by lowering the four bar linkage to a point where the three-point hitch 47 becomes disconnected from the implement 45.

The three-point hitch, as shown in FIGS. 15-19, will allow a tug unit to become attached to generally any implement, equipment, or tool that is already equipped with a three-point hitch receiver. Thus, there will need to be no modifications to existing equipment in order to use the tug unit with said existing equipment. In addition, the three-point hitch is a standard in the industry such that there will be little to no variation between models, manufacturers, and the like, of the various implements and equipment.

Furthermore, as discussed, it is contemplated that the unit 40 includes a three-point hitch on both ends of the unit in order to attach additional implements for use at the same time or without having to waste time switching out the implement connected to the unit.

FIGS. 20-27 are yet another progressive set of figures of a tug unit 50 attaching to an implement 55 according to an aspect of the invention. The embodiment shown in FIGS. 20-27 includes the use of a tug unit 50 including a housing 51, wheels or tracks 52, and a frame 53. The frame 53 includes a flatbed or other bare portion that is used as part of the attachment mechanism 54, as will be understood. The implement 55 for connecting to the tug unit includes jacks 56 for raising and lowering the implement 55. The implement 55 shown in the figures is a tank on a frame.

Figure 54:
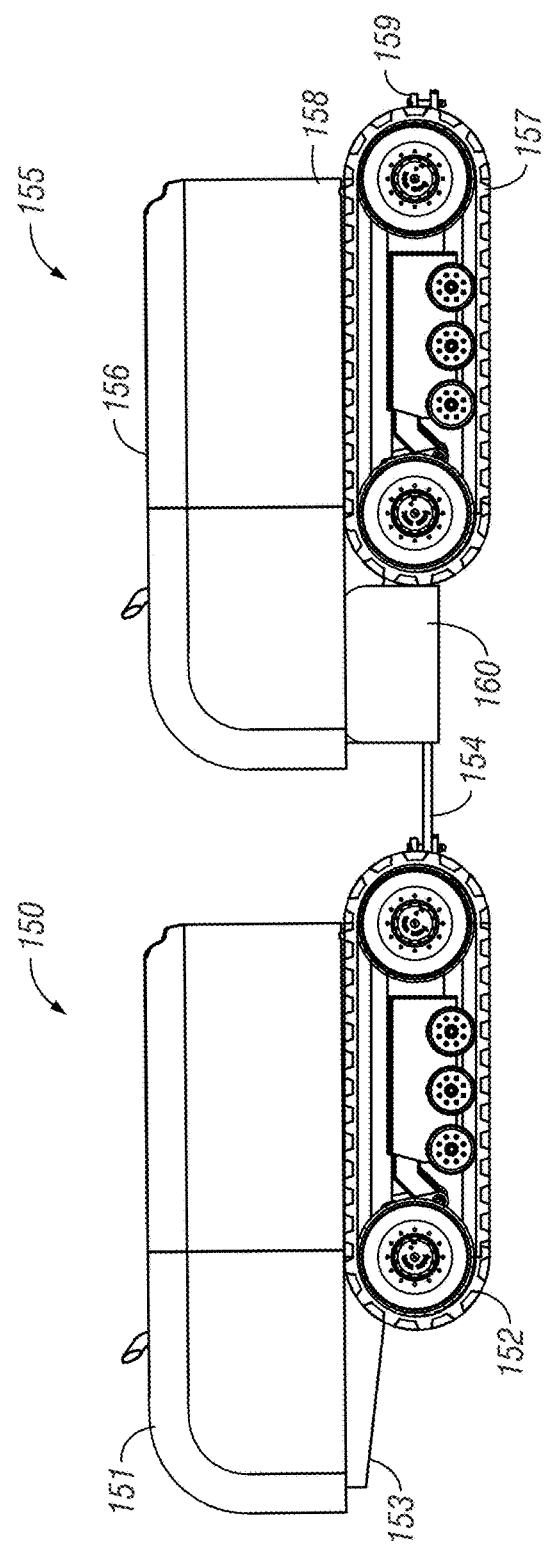
FIG. 54 is a side elevation view showing multiple tug units connected to one another.

In the embodiment shown in FIGS. 20-27, the implement 55 will include a communication or other connection for receiving information from the tug unit to operate the jacks 56 of the implement 55. For example, the tug unit 50 can utilize sensors, location devices, and the like, to position the flatbed portion of the frame 54 generally underneath the implement 55, between a first set of jacks 56. This is shown in FIGS. 20-24. The sensors, which may include vision sensors and other sensors, will direct the tug unit 50 to a location generally under the implement 55 with the implement being positioned with its center of mass generally at the center of the attachment portion 54 of the tug unit 50. In other words, the implement 55 will be centered relative to the attachment portion 54 of the tug unit 50. The tug unit 50 will position itself until it is in the position shown in FIG. 54, generally underneath the implement 55 with a portion of the frame of the implement generally adjacent a portion of the housing 51 of the tug unit 50.

At this position, there will be communication between the tug unit 50 and the implement 55. The communication may be from wireless communication between sensors in both the tug unit and implement, wireless communication between intelligent controls of the implement and tug unit, or wired controls via automatic wired connections between the tug unit and the implement. For example, when the tug unit gets in the position shown in FIG. 24, cables may automatically attach between the tug unit 50 and the implement 55. The length of the cables and other sensors may indicate that the tug unit is in the proper position. However, as mentioned, the sensors and an intelligent control may also be utilized to indicate between the tug unit 50 and implement 55 that the two are in proper location relative to one another. However the information is transmitted, the next steps can occur as follows.

Figure 25:
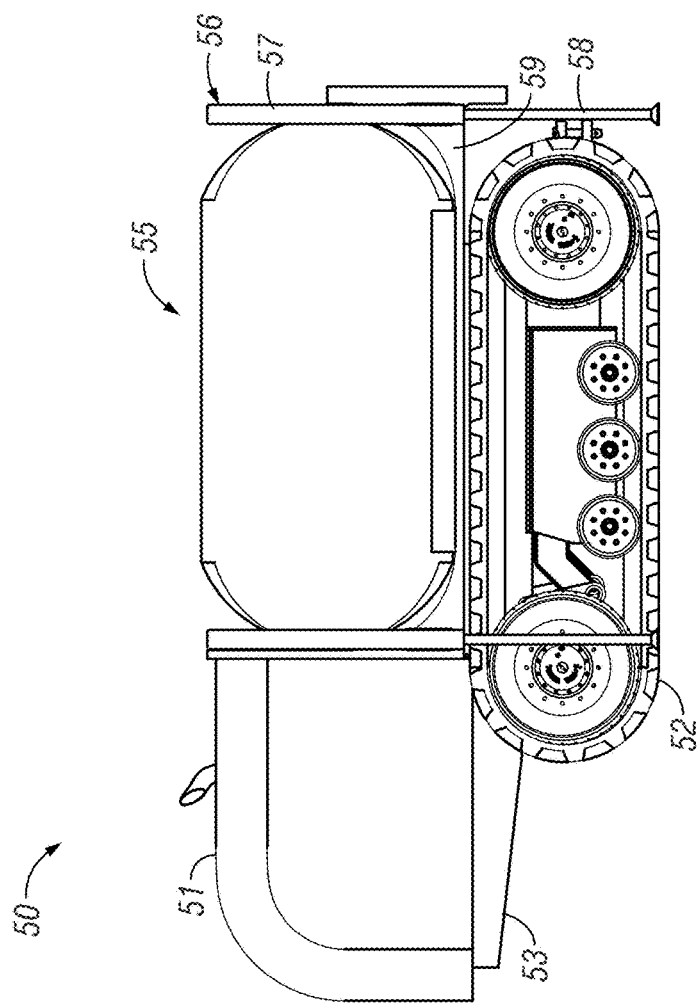
Figure 26:
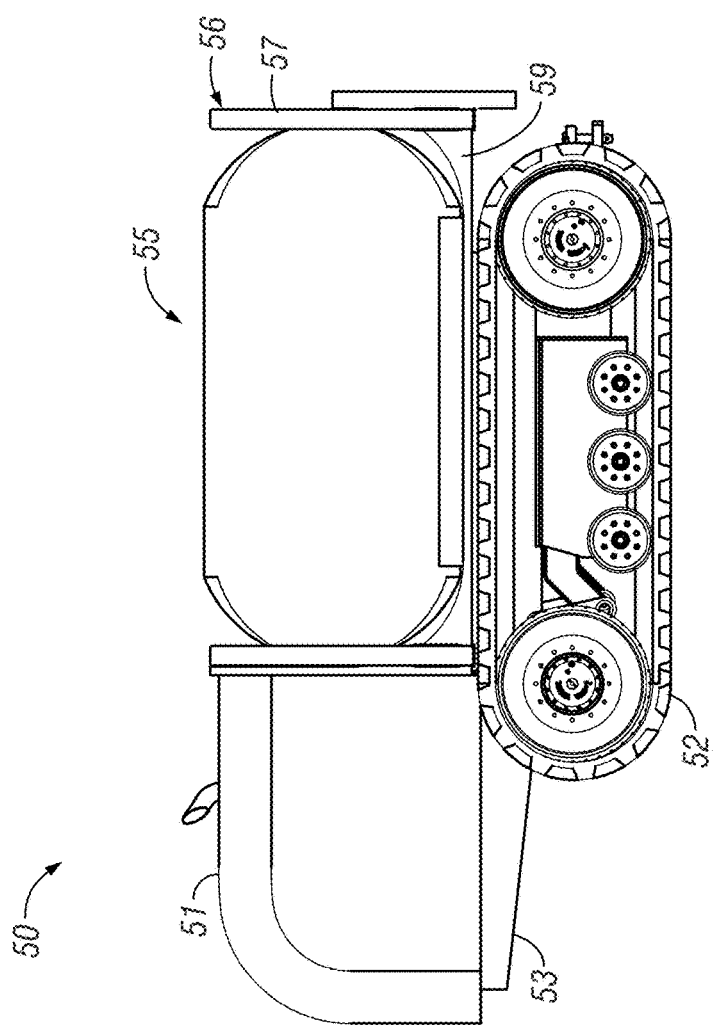
Figure 27:
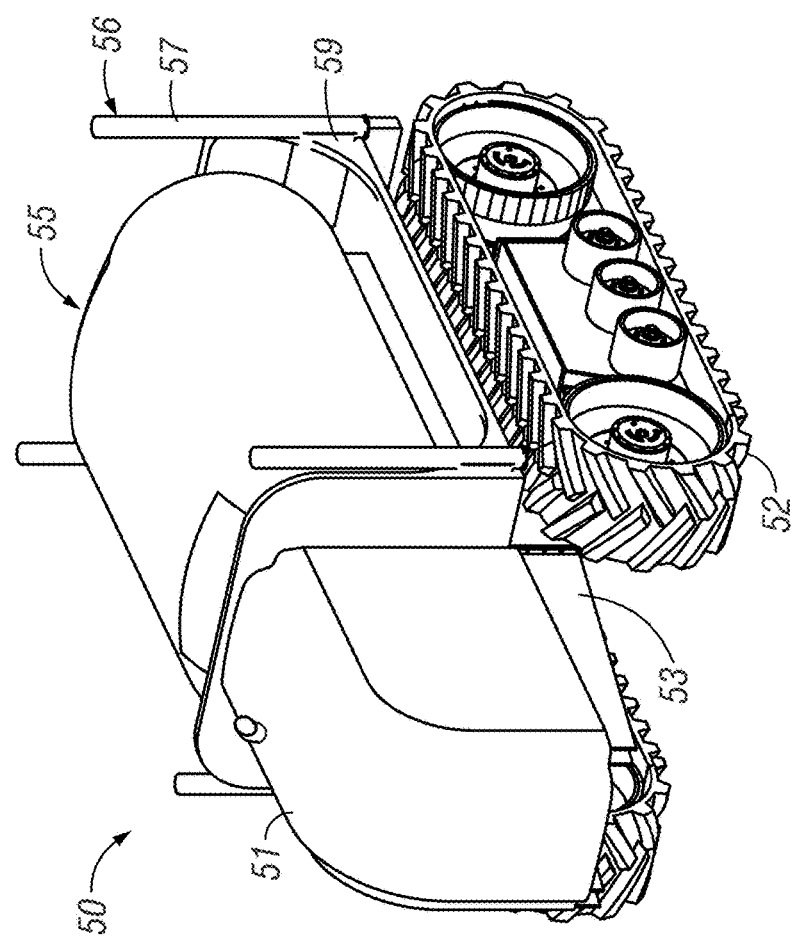
Figure 28:
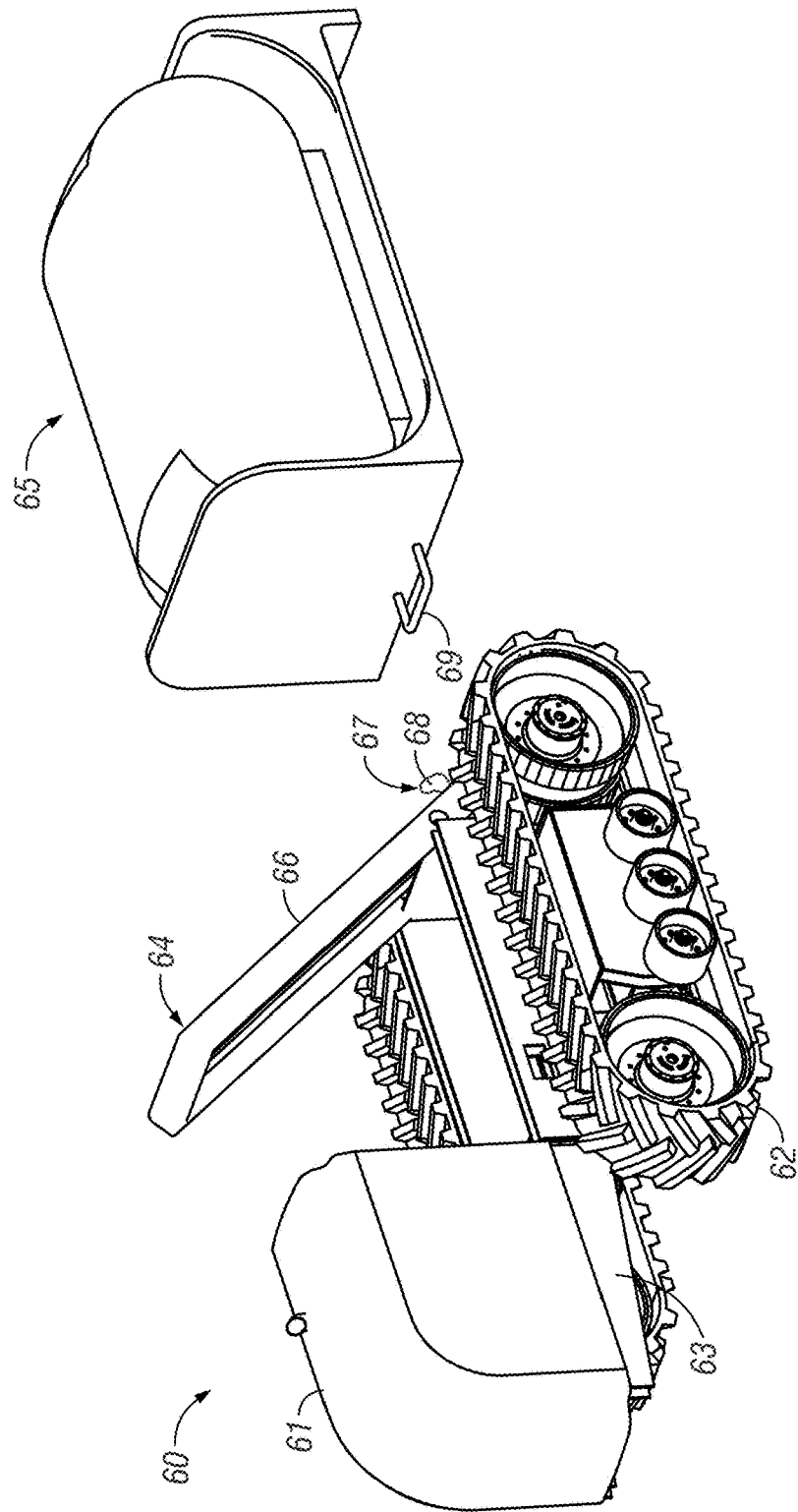
FIGS. 28-33 are progressive figures of a tug unit attaching to an implement according to an aspect of the invention.
Figure 29:
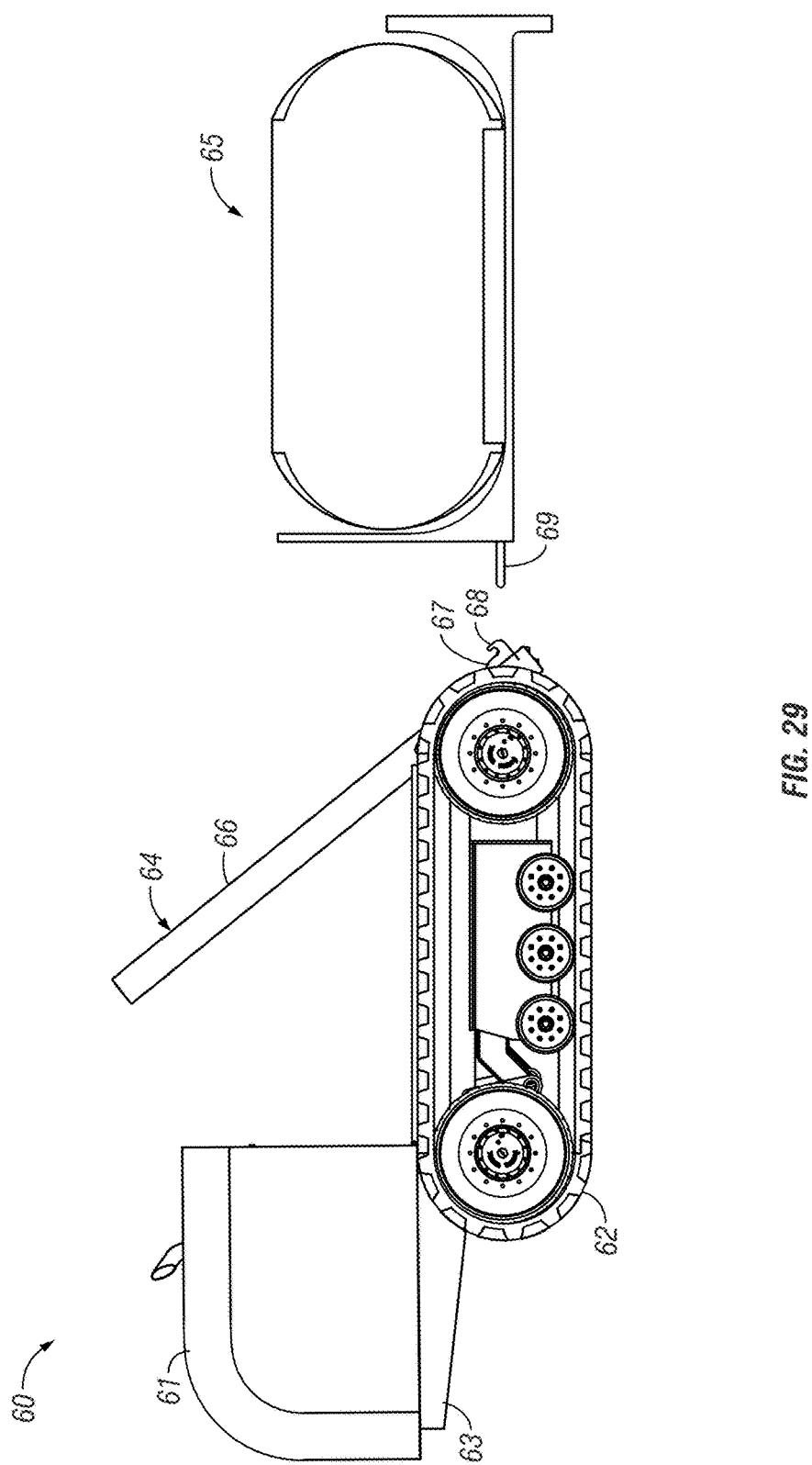
Figure 30:
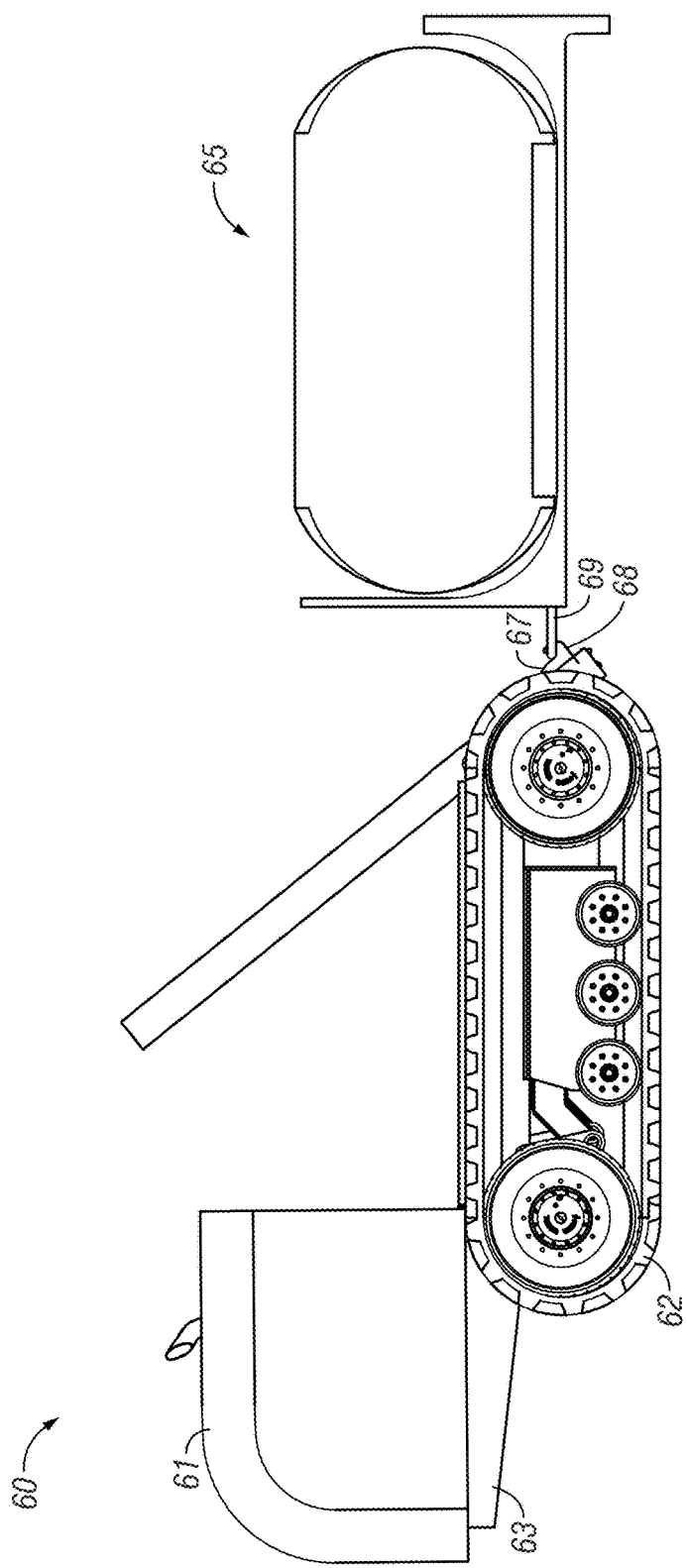

As shown in FIG. 25, the jacks 56 will operate a lift 57 and cylinders 58 positioned in the frame 59 of the implement 55. The lift 57 will operate the cylinders to retract within the frame 59 to lower the implement 55 onto the attachment portion 54 of the frame 53 of the tug unit 50. This will continue until the implement frame 59 contacts the attachment portion 54 of the frame 53 of the tug unit 50, which is shown in FIG. 25. The retraction of the cylinders 58 into the lift 57 will continue, as is shown in FIG. 26. In FIG. 26, the cylinders have fully retracted into the lifts 57. Thus, at this position, the full weight of the implement 55 is on the attachment portion 54 of the frame 53 of the tug unit 50. Additional attachments or locks may be connected at this point to secure the implement 55 to the tug unit 50. Therefore, as shown in FIG. 27, the tug unit 50 and implement 55 are in position to be utilized.

Once the use of the implement 55 has been completed, the tug unit and implement combination can be positioned at its original or otherwise desired location. The cylinders 58 of the jack 56 will extend from the lift 57 to lift the implement 55 off of the tug unit 50 to a position in which the implement 55 is no longer on the tug unit. After the tug unit and implement have communicated to one another that they have been fully separated, the tug unit 50 is able to drive away from the implement to its next use.

FIGS. 28-33 are yet another aspect showing progressive figures of a tug unit 60 attaching to an implement 65. Similar to above, the tug unit 60 includes a housing cover 61, tracks or wheels 62, and frame 63. The tug unit 60 also includes an attachment mechanism 64, which is shown to be a roll cable type attachment mechanism. The roll cable includes a cable 67 and a hook 68 positioned on or adjacent to a flatbed portion 66 of the frame 63. As shown in the figures, the flatbed portion 66 of the frame 63 may be rotatable in relation to the frame 63. This may be accomplished via actuators, such as linear actuators, hydraulic actuators, pneumatic actuators, or the like. For example, linear actuators may be used and may be powered by the power supply or generator of the tug unit 60, when the power supply and drive system for the tug unit 60 is an electrical drive system. However, the additional types of actuators may also be used and powered by the power supply of the tug unit 60.

The implement 65 is shown to be a tank on a frame and including an attachment member of the frame 69. The tug unit 60, with the flatbed 66 portion in an upright position, travels towards the implement 65. The hook portion 68 of the cable 67 is at a lower edge so as to be able to interact and connect to the frame 69 of the implement 65. Sensors may be utilized at the hook and otherwise rear of the tug unit 60 in order to align the hook 68 with a portion of the frame 69 of the implement 65. The sensors may include vision sensors, infrared sensors, radio frequency sensors, RFID sensors, or the like. The tug unit 60 is moved until the hook 68 can connect to the frame 69 of the implement 65. At this position, the hook and cable are connected to the frame and can begin to move the implement 65 towards and onto the tug unit 60.

Figure 31:
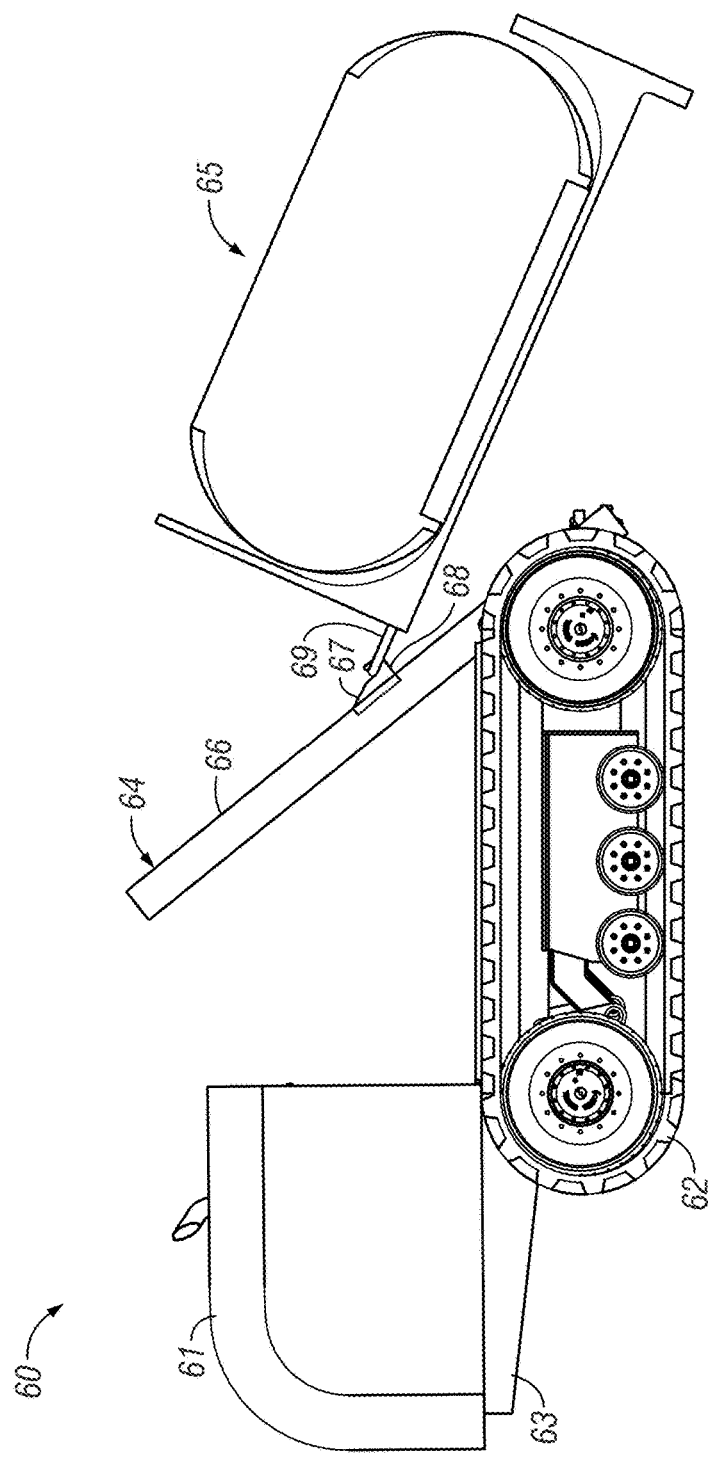
Figure 32:
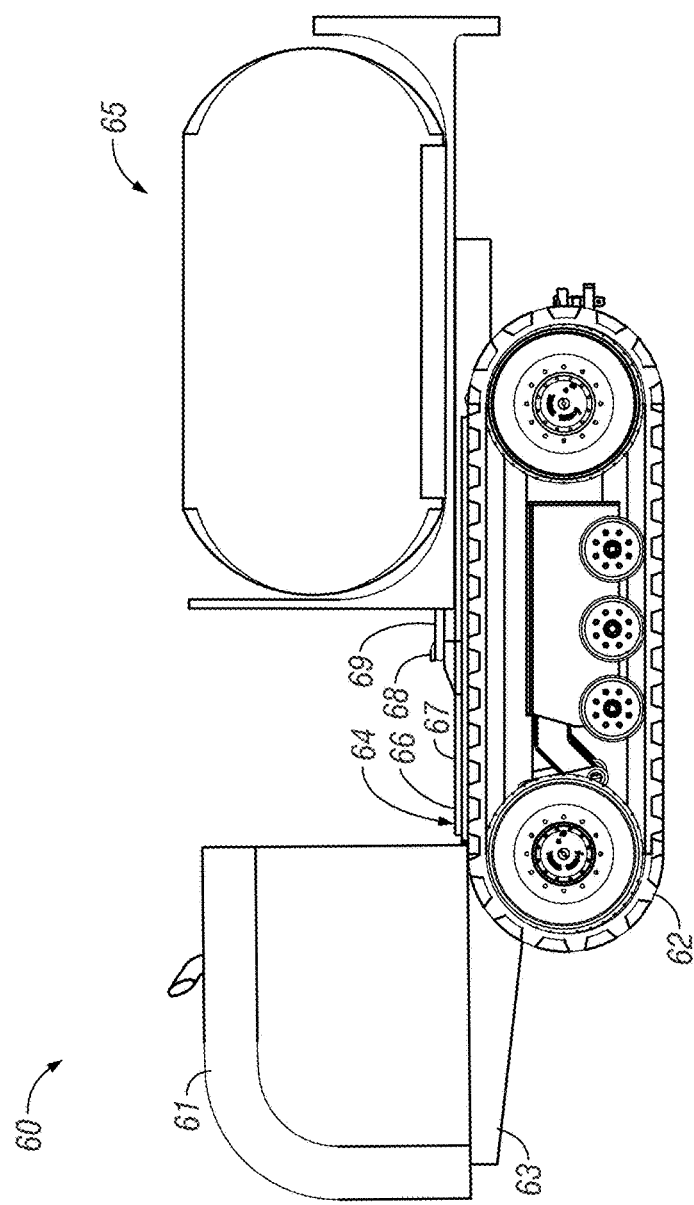

As shown in FIG. 31, once the hook 68 connects to the frame 69 of the implement 65, a cable 67 may begin to pull the hook and implement towards an upper end of the flatbed portion 66 of the attachment mechanism 64 of the frame 63. This will begin to pull the implement onto the flatbed portion 66. Once enough of the implement is pulled onto the flatbed portion 66, the flatbed portion 66 may begin to rotate in a counterclockwise manner towards the frame 63. It should be appreciated that the flatbed portion should begin rotating once enough of the mass or weight of the implement 65 is onto the flatbed portion such that rotation of the flatbed portion will fully lift the implement 65 off of the ground. This is shown generally in FIG. 32. As further shown in FIG. 32, the implement is fully off of the ground and is at least partially on the flatbed portion 66 of the frame 63. The cable 67 will continue to pull the hook 68, which is connected to the frame 69 of the implement 65, towards the housing cover 61 of the tug unit 60. This will continue until the implement 65 is fully on the flatbed portion 66 of the frame 63 of the tug unit 60.

Figure 33:
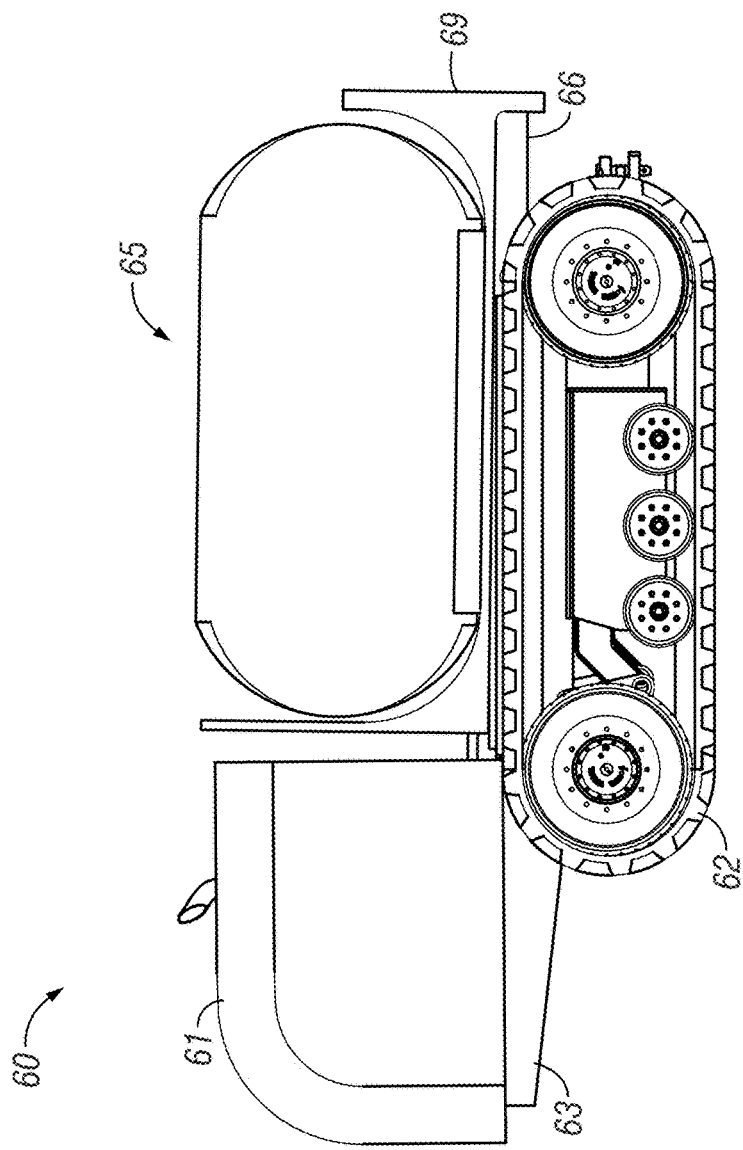

At this position, which is shown in FIG. 33, the implement is positioned on the tug unit 60. The hook 68 remains connected to the frame 69 of the implement 65 and other connections may be made to secure the implement 65 to the tug unit 66. These attachments may be locks, snaps, clasps, or other tie-downs that can securely connect the implement automatically to the tug unit 60. In addition, the tug unit may include automatic connections, such as electronic, hydraulic, pneumatic, power take-off, or the like between the tug unit 60 and the implement 65 to provide the power to operate the implement 65 while the tug unit is being used. Furthermore, once the use of the implement is completed, the removal of the implement 65 may be done in a generally reverse manner than the attaching thereof.

The tug units of the invention, when using any type of attachment mechanism, will utilize any and all of the previously mentioned components to aid in aligning, attaching, detaching, and moving the attached components. For example, modules including various sensor, radar, LIDAR, cameras, combinations, etc., may be utilized with the intelligent control of the units to aid in the connecting or disconnecting of the components. Furthermore, the sensors and/or other components of the modules will aid in determining which of a plurality of components the tug unit is to connect with. For example, some tanks may be empty, while being stored next to fuller ones. A bar code or other distinguishing mark of a tank can be received by a sensor or other component of a module, e.g., such as by "reading", to ensure that the correct and desired component is attached to the particular unit.

As has been mentioned, the autonomous tug units according to the invention can be used with generally any implement or other equipment for agriculture and other industry operations. In addition, the tug units can provide power and other operations to various implements with little to no change to the tug unit itself. Thus, the various connections, sensors, and the like of the tug units will allow the units to be used with a variety of implements and/or equipment. In addition, the tug units will be equipped such that they can receive information from the various implements attached thereto to provide and convey this information to other tug units, to master modules, to other vehicles, and to anywhere else such that the information can be utilized accordingly. As such, various examples of the tug units connected to equipment, implements, and the like, is provided. It is to be noted that in some instances, the tug unit and equipment or implement may for a single, integral component, while in others, the unit is separable from the implement, such as in one of said previously described manners.

FIGS. 34-39 indicate the use of a tug unit 70 and a grain cart 74. The grain cart 74 may be temporarily attached to the tug unit 70, or it can be permanently or otherwise integrally attached such that a particular tug unit is a dedicated grain cart unit. When it is a temporary unit, the grain cart 74 may be attached to the tug unit 70 via any of the methods previously described and shown. However, as mentioned, a grain cart may be a permanent part of a tug unit such that a particular tug unit 70 be a dedicated grain cart unit.

Figure 34:
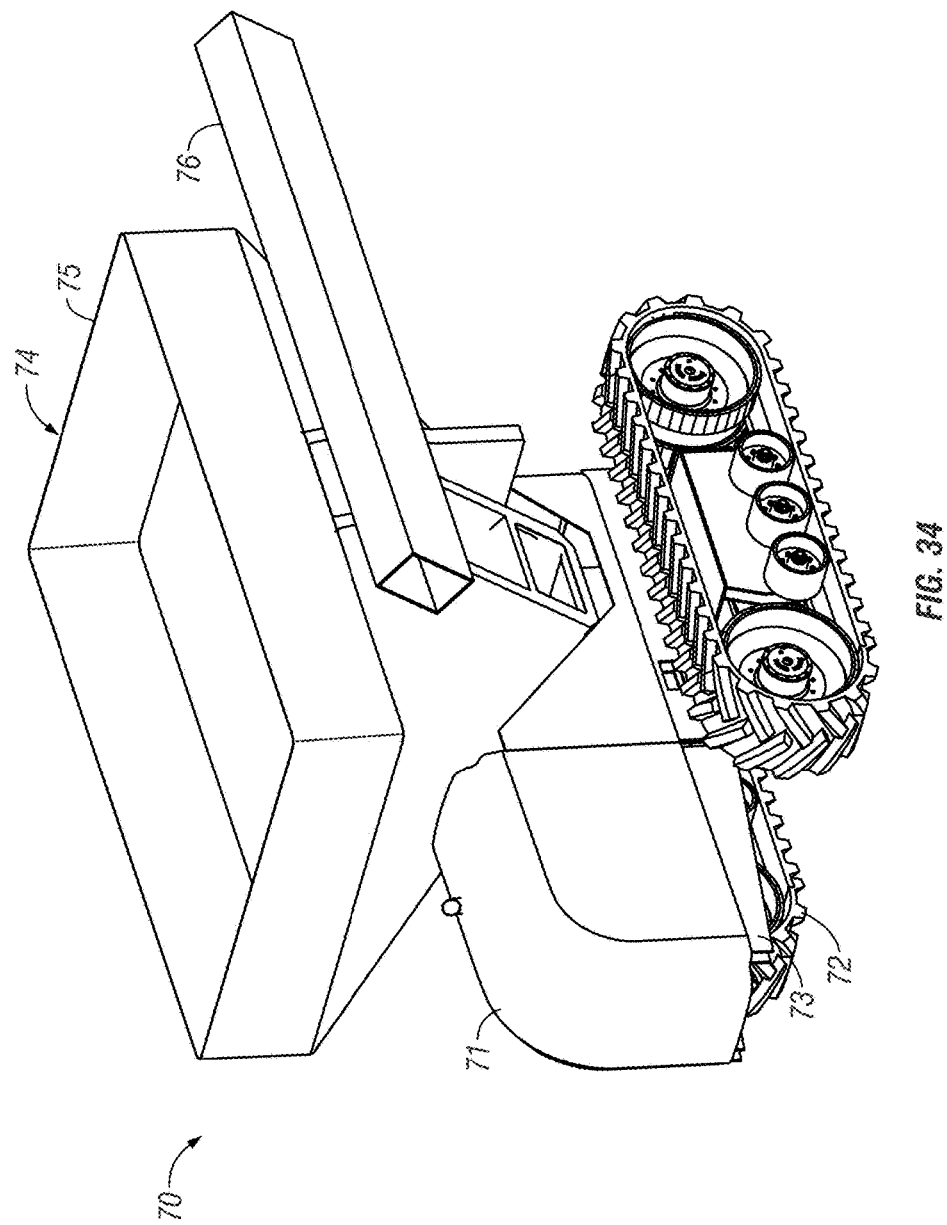
FIG. 34 is a perspective view of a tug unit with a grain cart.
Figure 35:
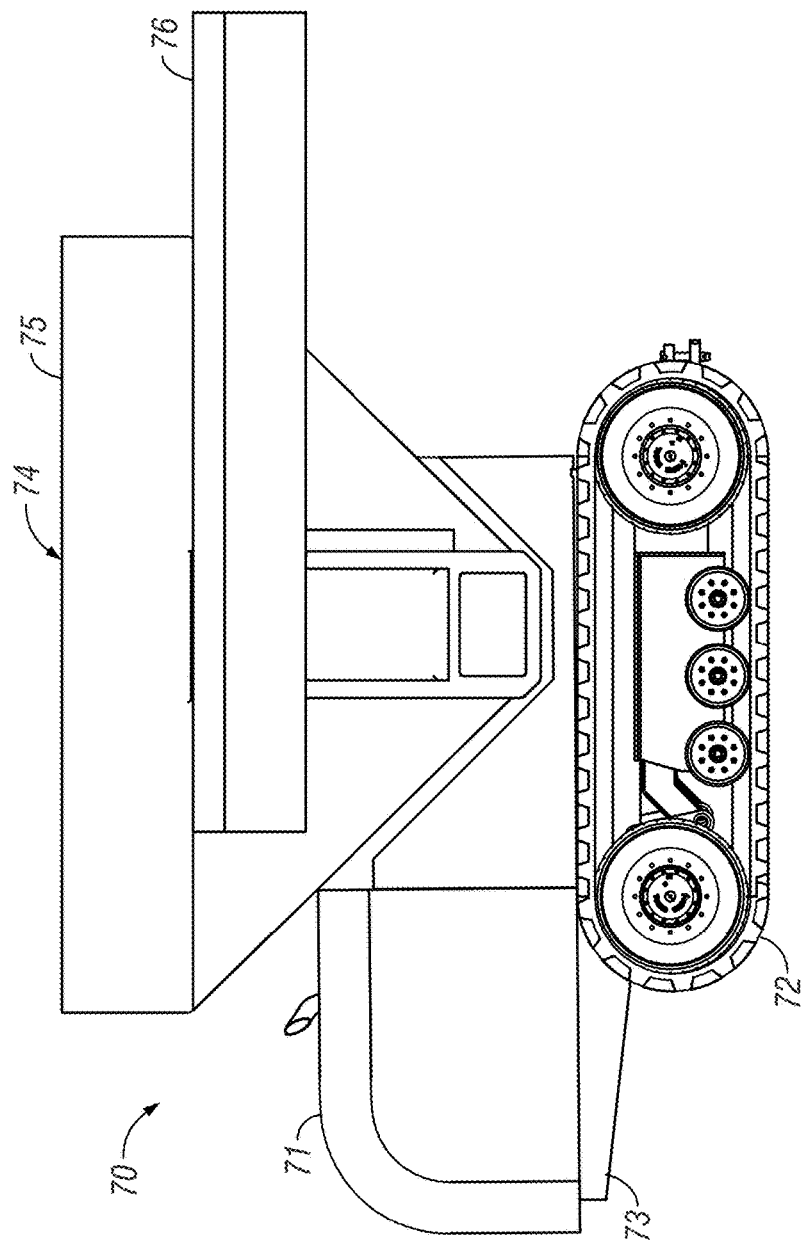
FIG. 35 is a side elevation view of the tug unit and grain cart.
Figure 36:
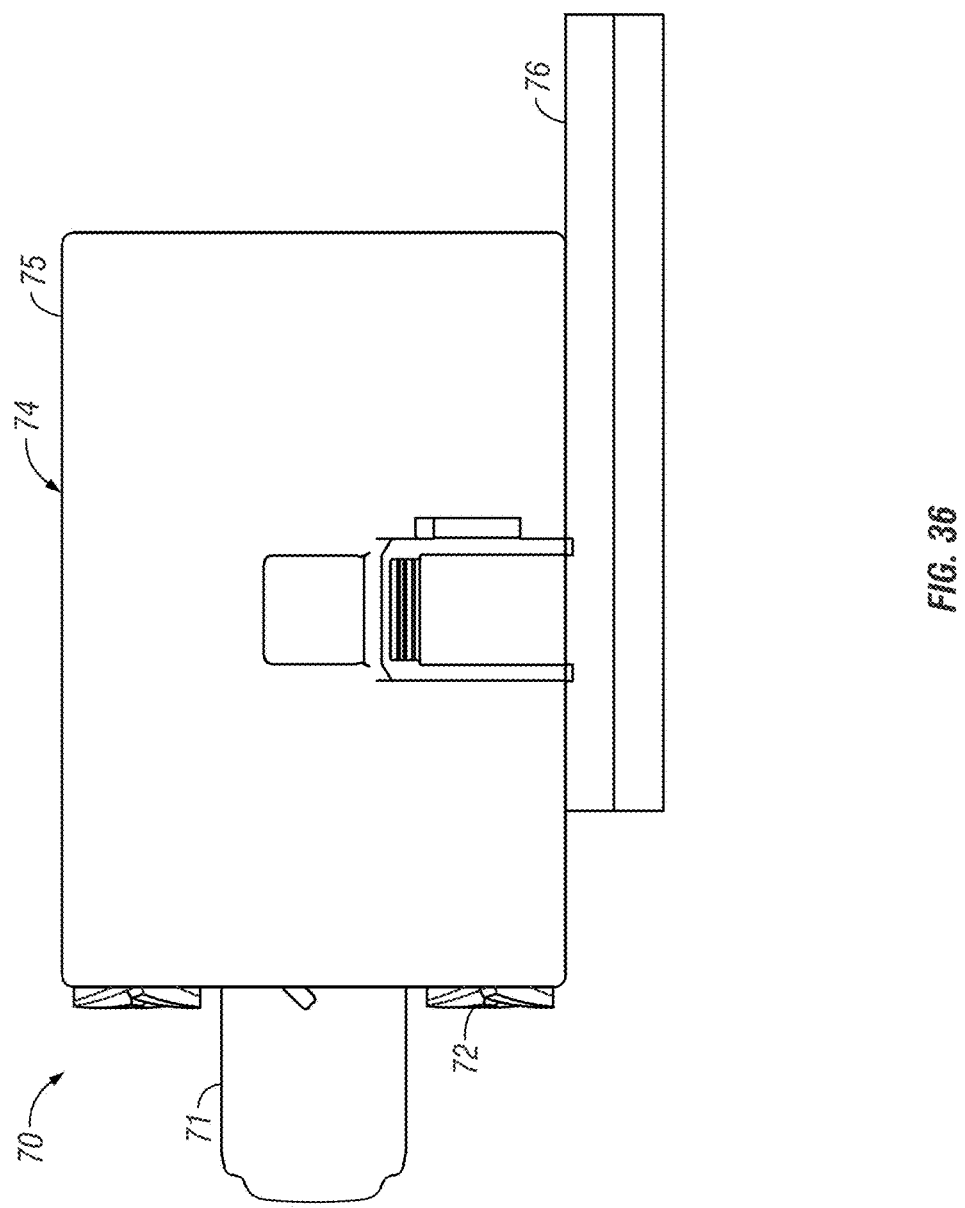
FIG. 36 is a top plan view of the tug unit and grain cart.

FIGS. 34-36 show a tug unit 70 with a grain cart 74 positioned thereon. The tug unit 70 includes a housing cover 71 for housing and protecting the internal components of the tug unit, including the power supply, drive system, intelligent control, and the like. The tug unit 70 also includes wheels or tracks 72, as has been described. Furthermore, the unit includes a frame 73. As shown in the figures, the grain cart structure 74 is positioned at least partially on the frame 73 of the tug unit 70.

The grain cart 74 may be a standard grain cart including a plurality of walls 75 defining an interior bin for storing grain or other particulate material therein. A grain cart auger 76 is shown alongside the grain cart 74. The auger 76 is shown in a horizontal manner, but may be pivotable to a generally vertical or angled manner to move grain or other material from the interior of the grain cart to another location, such as to dispense the material to a semi-trailer or other transport vehicle. In addition, it is contemplated that an internal auger, which is known generally as a floor auger, may be positioned within the grain cart to aid in moving material from the interior of the grain cart towards the vertical or output auger 76 of the grain cart 74. For example, the grain cart may take the form of a cart as disclosed in U.S. Ser. No. 12/728,042, which is hereby incorporated by reference in its entirety.

The grain cart 74 can be connected to the tug unit 70 with electrical connections, power take-off connections, hydraulic connections, or the like. These connections can aid in operating the components of the grain cart including, but not limited to, the auger, sensors, conveyors, power systems, air systems, or the like. Therefore, when the tug unit is an electrically driven unit, the components of the grain cart may also be electrically driven or powered such that an electric motor or motors can be utilized to operate the auger or augers, conveyors, power systems, air systems, or any other system of the grain cart 74. In addition, the electric components of the grain cart can operate one or more sensors of the grain cart. The grain cart can be automatically connected to the power outputs of the tug unit in order to receive the power for the components. This can also be done manually, by the use of manually connecting the outputs and inputs.

Figure 37:
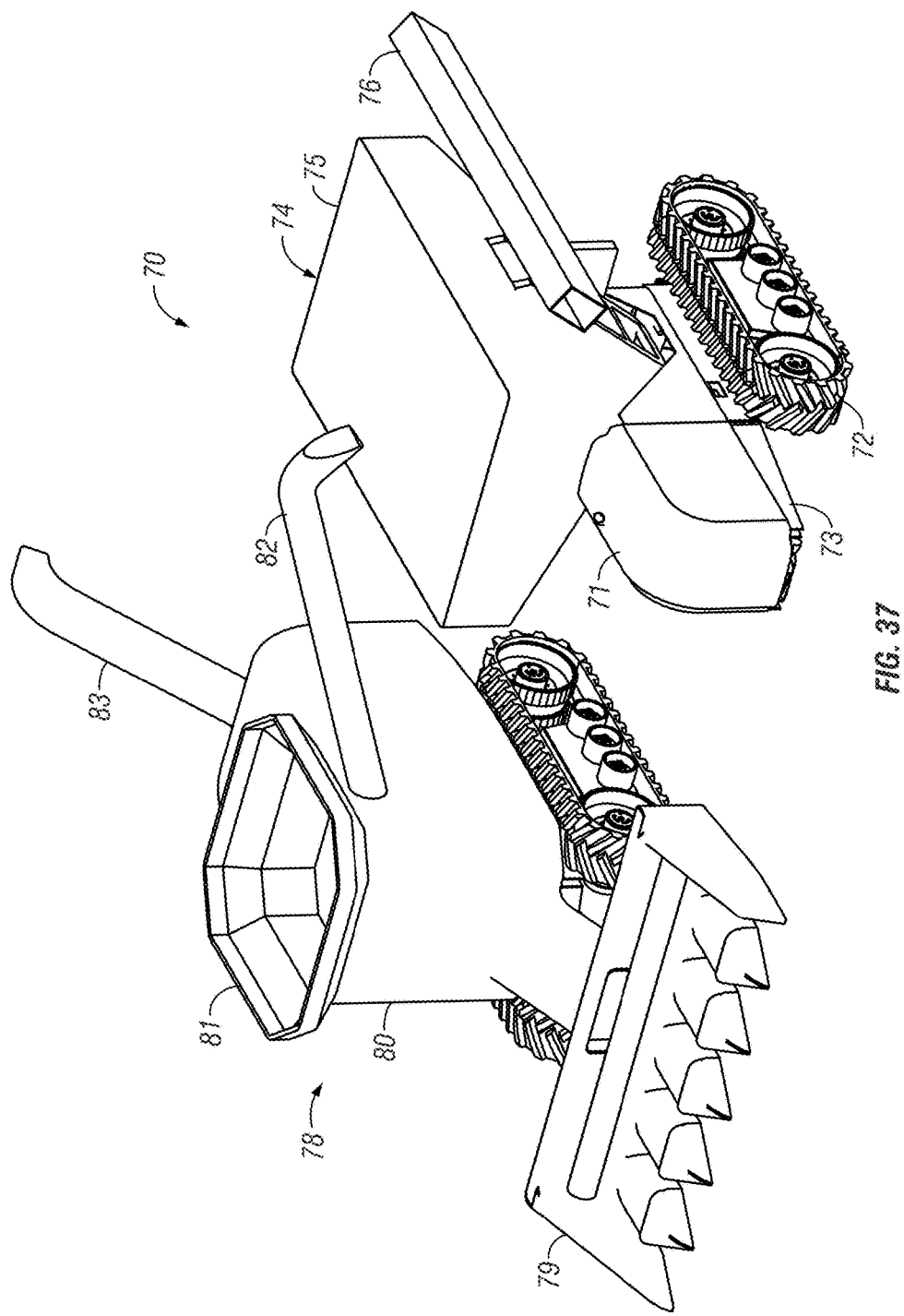
FIG. 37 is a perspective view of the tug unit and grain cart positioned from a harvesting unit.
Figure 38:
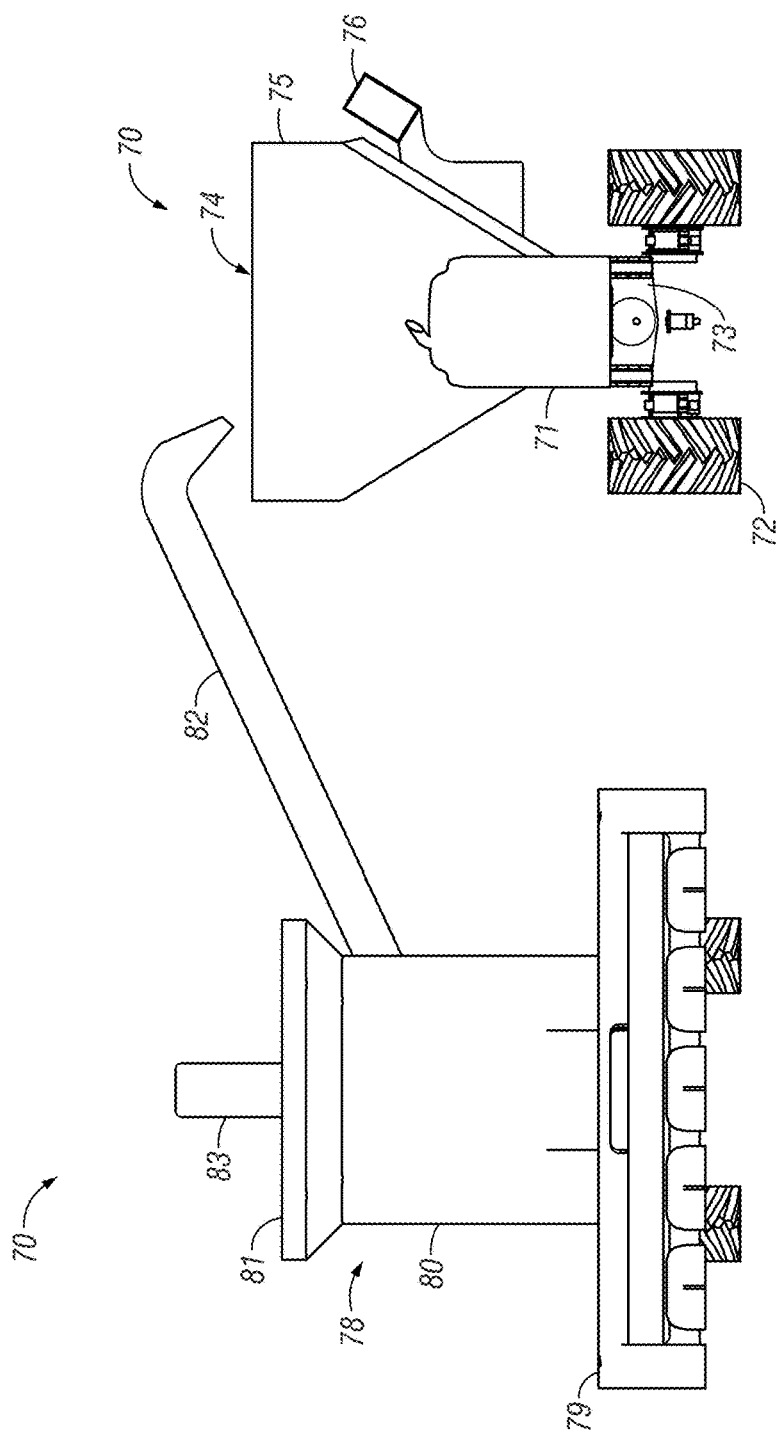
FIG. 38 is a front elevation view of the tug unit, grain cart, and harvesting unit.
Figure 39:
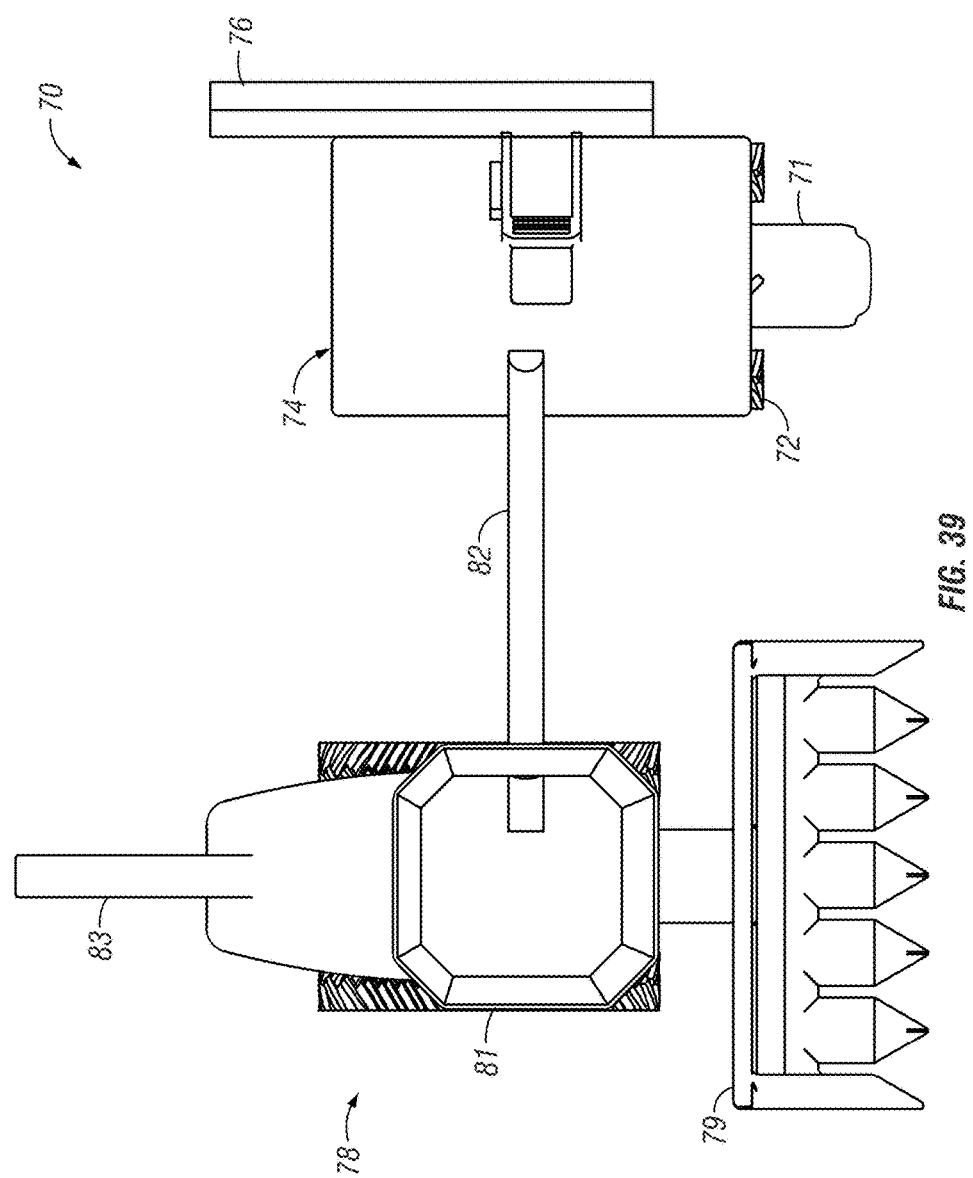
FIG. 39 is a top plan view of the tug unit, grain cart, and harvesting unit.

FIGS. 37-39 indicate an aspect of the invention wherein the tug unit 70 with a grain cart 74 is utilized in combination with a combine unit 78. The combine unit 78 may be a normal combine, or can be a self-propelled, autonomous combine unit utilizing a tug or autonomous vehicle of the invention, as will be discussed below. In either sense, the combine unit 78 shown in the figures includes a combine head 79, cab 80, and combine tank 81 for receiving and storing grain, a combine grain auger 82, and combine stover auger 83. As is known, the header 79 is used to direct crop into the internal areas of the combine wherein the grain is separated from the rest of the crop and stored in the tank 81. The grain can then be directed via the auger 82 to a storage vehicle, such as a grain cart 74. The remaining parts of the crop, which may be known as the stover, can then be passed out the stover auger 83 of the combine.

The tug unit 70 and grain cart 74 can include sensors and other location devices, such as GPS, LIDAR, vision sensors, radio frequency sensors, or the like, and which sensors are used to locate the combine 78 and to position the tug unit 70 and grain cart 74 near said combine 78 in order to be able to receive the grain from the combine within the grain cart. For example, when a combine indicates that the tank 81 is filling with grain, it may emit a signal to convey to a grain cart unit that it needs to unload grain from the combine to the grain cart. The sensors of the grain cart and tug combination can be used to locate the combine and can be used to position the grain cart 74 such that the auger head of the auger 82 is positioned generally above the grain cart 74. The grain cart can then communicate to the combine to begin to pass grain from the combine to the grain cart.

The grain cart 74 can include additional sensors as well. For example, weight sensors may be included to prevent roll over of the unit, and to determine when the grain cart is at or near full. If the sensors determine that there is too much weight on one side of the grain cart, the weight sensors can indicate to the tug unit 70 to position the grain cart such that the grain is filling the cart in a different location to prevent roll-over and to ensure that the cart is equally full. Furthermore, the weight sensor can indicate that the grain cart is full, and can communicate this to the combine so that the combine stops transporting the grain through the auger to the cart. Additional sensors may include vision sensors, moisture content sensors, and the like. All of the sensors may also indicate to the grain cart 74 when the grain cart is full or near full to indicate to the combine to stop filling the cart. The grain cart can then be traveled to another location, such as a semi-trailer or other transport vehicle in order to unload the contents of the grain cart into the trailer so that the grain cart can be used once again to receive grain from a combine. The sensors, when used with loading a trailer or grain truck, could determine the weigh distribution on the axles of the trailers or trucks, which can prevent or mitigate overloading of the trucks such that they comply with weight capacities. In addition, according to some embodiments, it is contemplated that the grain cart itself can be removed from the tug unit and positioned on a trailer for transporting the grain within the cart to another location for storage. In such a situation, the tug unit can then attach to a separate grain cart 74 for further use in the field.

As mentioned, the grain cart can include many sensors. The sensors can prevent rollover and also determine when the grain cart is filled. In addition, the sensors may include moisture content to determine the moisture content of the grain in the grain cart to provide an idea of yield. Furthermore, vision sensors, such as cameras, can be utilized to detect the location of the filling in the grain cart. For example, if the sensors detect that the grain cart is mostly being filled near the front, the unit can speed up to fill in the rear portion of the cart. If the sensors detect that one side is filling up more than the other, the sensors can communicate to the combine unit to extend or retract the grain auger 82 to adjust the positioning of the filling. Additional sensors may be used for unloading from the grain cart to an additional storage location as well.

Figure 40:
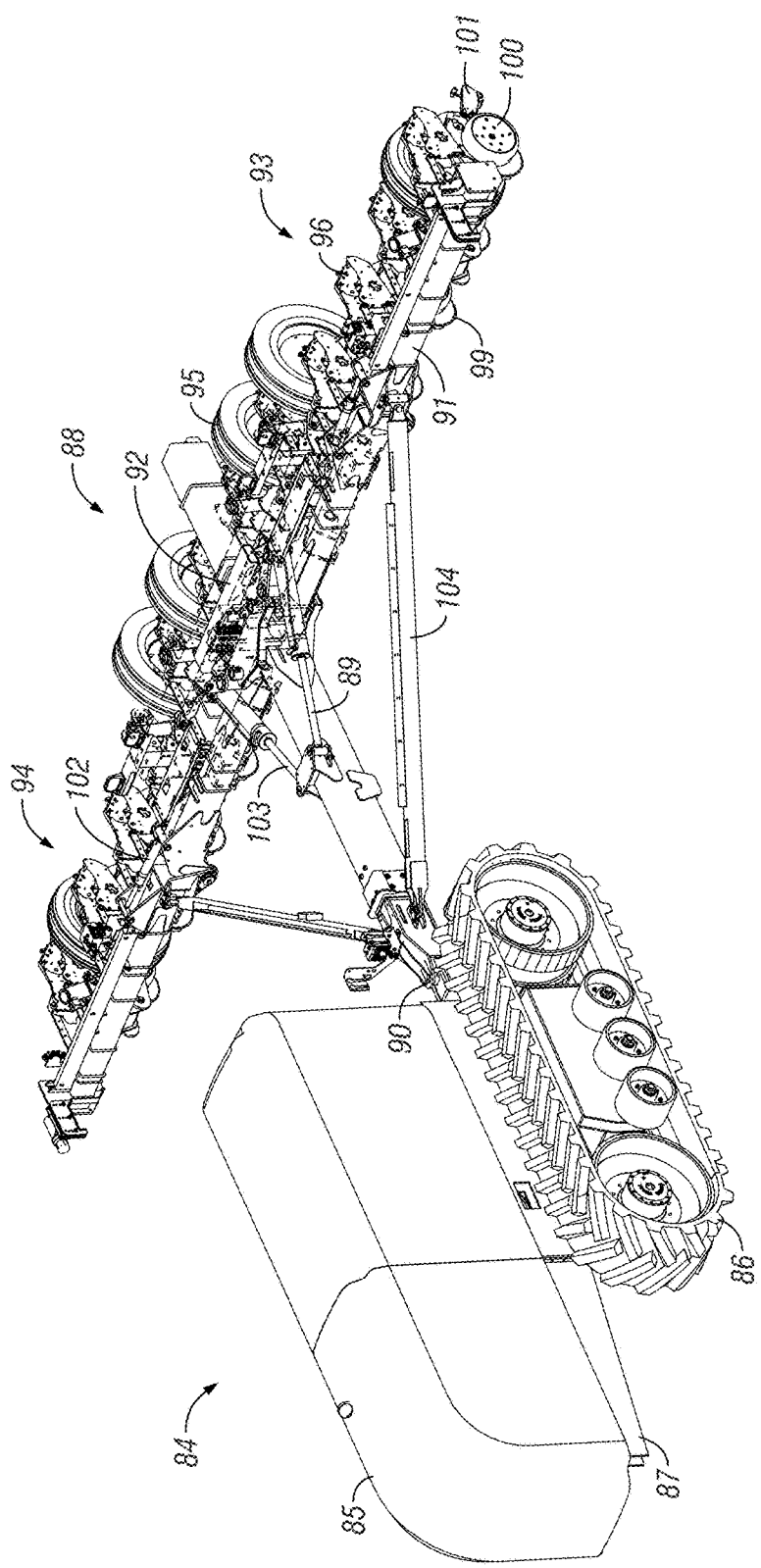
FIG. 40 is a perspective view of a tug unit with a planter.
Figure 41:
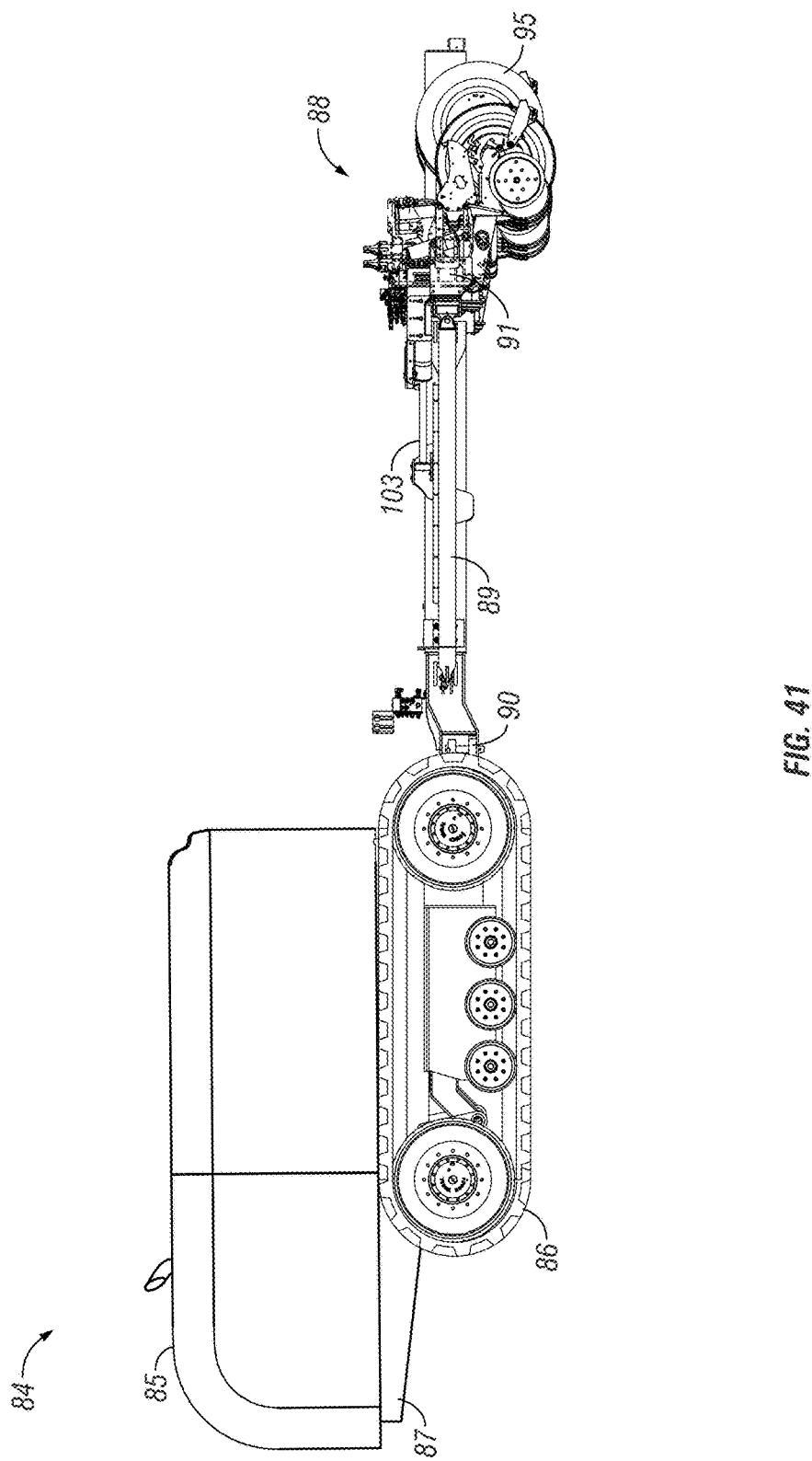
FIG. 41 is a side elevation view of the tug unit and planter.
Figure 42:
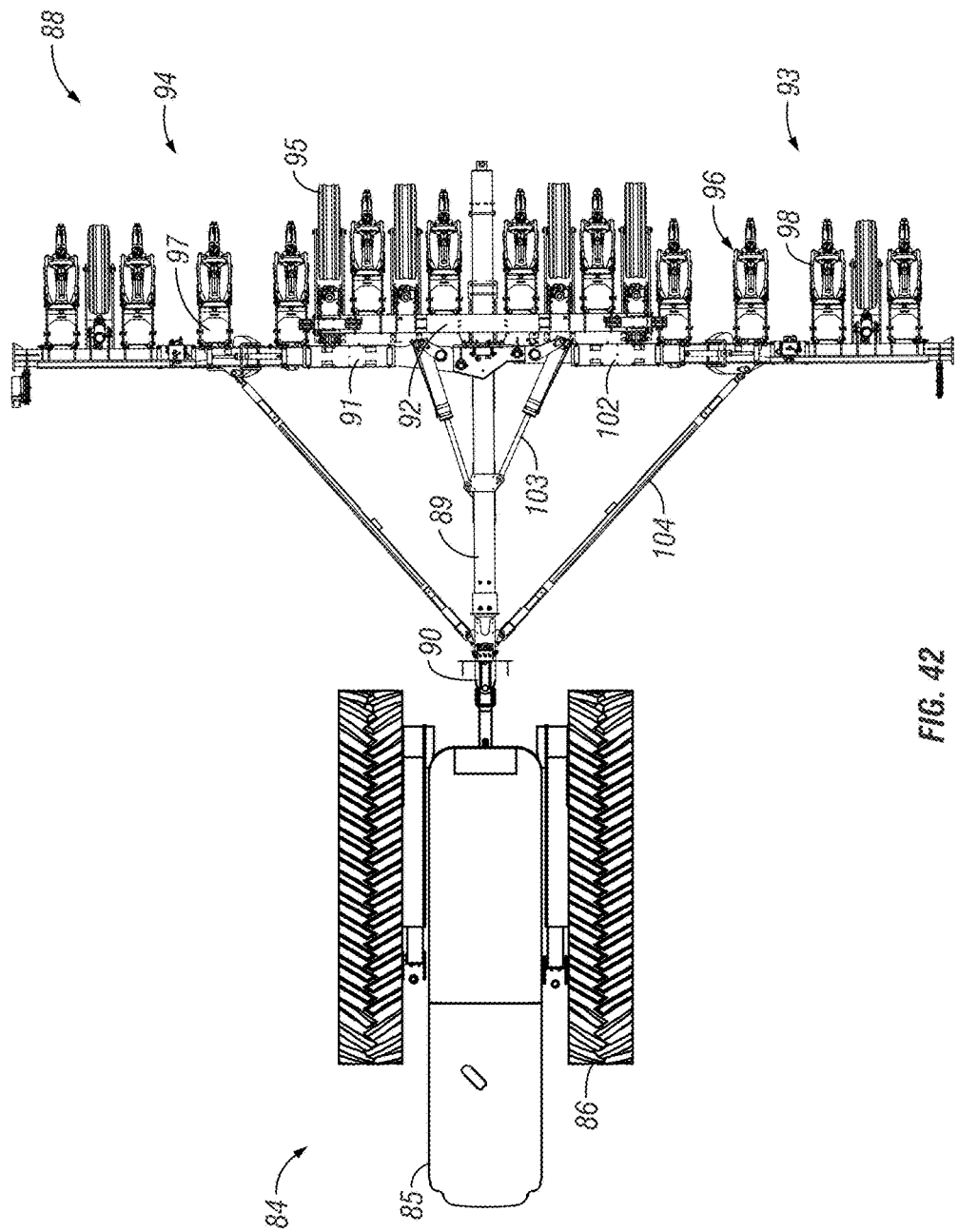
FIG. 42 is a top plan view of the tug unit and planter.

FIGS. 40-42 are views of a tug unit 84 connected to and operating a planter 88. The tug unit 84 includes similar components as above, including a housing 85, wheels or tracks 86, and a frame 87. Inside the housing are the power supply, drive system, intelligent control and other components, such as sensors, positioning systems, communication systems, and the like. The planter 88 is shown to be connected to the tug unit 84 via a connection mechanism.

The planter unit 88 includes a tongue 89 having a hitch 90 at one end and a toolbar 91 at an opposite end thereof. It should be appreciated that the hitch 90 could be a three-point hitch for mounting to a tug unit, or the planter could be permanently mounted on the tug unit 84 such that the unit is a dedicated planter unit. The tongue 89 may be a set length tongue or can be a telescoping tongue. In the configuration shown in FIGS. 40-42, the tongue 89 is a telescoping tongue such that the planter 88 is a forward folding planter. The tool bar 91 includes a center bar 92, and right and left wings 93, 94 extending from opposite sides of the center bar 92. The right and left wings 93, 94 are labeled and positioned to viewing the planter 88 from a front thereof, and are generally mirror images of each other. The planter 88 includes wheels 95 attached to the toolbar 91 for movement of the planter 88. The center bar 92 and right and left wings 93, 94 also include a plurality of row units 96 attached thereto. The row units 96 may include row unit hoppers 97, seed meters 98, opening wheels 99, gauge wheels 100, and closing wheels 101. However, it is contemplated that a planter 88 may be used that includes a bulk seed tank positioned on the toolbar 91 such that there will not be individual hoppers at each of the row units 96, and instead the bulk seed tanks will distribute seed from the bulk seed tank to each of the row units. For example, an air seed delivery system, an embodiment of which is disclosed in U.S. Pat. No. 8,448,585, which is hereby incorporated by reference in its entirety, may be utilized with the invention. Bulk seed tanks could also be placed on the tug unit to reduce compaction due to the large area of the tracks or tires or the planter. In addition, the fertilizer tanks could be placed on the tug for the same reason. The placement of the seed and/or fertilizer tanks on the tug unit could give a large capacity of seed and/or fertilizer compared to placing them on the planter frame. The planter 88 configuration is not to be limiting to the invention.

Further aspects of the planter 88 may include weight distribution cylinders 102 positioned between the central bar 92 and the right and left wings 93, 94. The weight distribution cylinders 102 can provide weight distribution between the central toolbar and the wings. This may be useful when planting in hilly locations or when using a bulk seed tank, as the bulk tank will provide more weight at a central portion of the toolbar 91. The weight distribution cylinders 102 can provide up or down movement to the wings 93, 94 to ensure that all of the row units are planting seed at the same or similar depth. Wings cylinders 103 and wing supports 104 may also be included. The wing cylinders 103 are used to fold the wings between open and closed positions. The open position may also be called a planting position, while the closed position may also be known as a transport position. Such forwarding folding wings are disclosed in U.S. patent application Ser. No. 13/787,932, which is hereby incorporated by reference in its entirety.

The planter 88 and components thereof may be connected to the tug unit 84 such that the tug unit provides power and/or other outputs to the planter 88. For example, the tug unit 84 may provide electric power, pneumatic power, hydraulic power, or some combination thereof. Furthermore, when the tug unit 84 includes modular components, such modular components or motors may be attached or otherwise positioned on the planter such that these modular components operate the weight distribution cylinders and/or closing or folding cylinders 103. The modular motors may also power the air seed delivery or other seed delivery systems of the planter 88, as well as the components of the row units, e.g., seed meter motors, seed to ground systems, air pressure sources, sensors, etc. Such components may be found in U.S. Ser. No. 13/829,726 and/or Ser. No. 14/478,222, both of which are hereby incorporated by reference in their entirety. Other aspects of the planter 88 that could be powered by the tug unit 84 include fans. Furthermore, it is contemplated that the seed meters of the planter 88 could be electrically and/or individually operated, with the electric meters being powered by the power supply of the tug unit 84.

Regardless of the type of hoppers are used, bulk fill or individual row unit, it is contemplated that the invention includes a communication system between the tug unit, planter, and/or row units and a command center. For example, when the hoppers begin to get empty, a signal may be sent to a tender unit, in which the tender unit locates the tug unit 84 and planter 88 combination to refill said hopper units. If one or more row units become damaged, the row units may be modular in that the tender or maintenance unit may be alerted to travel to a location of the unit in order to replace one or more row units. The alerts and other information may also be sent between one or more units and a command center. The command center may be a tablet, phone, master module, or manually operated tractor to indicate the status and/or location of the planter 88 and tug unit 84. Other aspects of the invention include attaching the bulk seed tanks and/or fertilizer tanks on the tug unit 84, which can take weight off the planter 88. This would reduce the amount of down force required at each of the row units as well.

Other systems of the invention include the use of a vision system on the tug unit 84 opposite the planter 88. The vision system can indicate trash flow prior to the planting in such that the system can update accordingly. The system can send to a command module or center to alert if there is a large amount of trash in a particular area of field. In addition, this can indicate why the unit was stopped if there is a large amount of trash in the field, i.e., provide status updates. Furthermore, as there is generally no concern about line of sight in front of the unit, a thrasher, disk, tiller, cutter, or other mechanism may be positioned on the front of the unit opposite the planter, such that the trash, weeds, or the like can be broken down prior to planting the seed at a particular location. In addition, a separate planter could be attached to the front or opposite end of the tug unit 84 such that the unit is capable of planting more narrowly spaced rows, e.g., twin rows, 10-inch spaced rows, 15-inch spaced rows, etc.

As will be understood, the use of the tug unit for planting will provide for any number of row units per planter 88. If one tug unit is to be utilized, a smaller number of rows can be included for a planter 88 due to the possibility of multiple units and planters in a field at the same time. The units can communicate to one another as to their location and whether the area has been planted to update such that an area is not planted more than once. The units can utilize GPS to ensure that the planted rows are in substantially straight lines and in the desired configuration, and can also utilize previous years data from sensors to attempt to plant the seeds in an almost identical location, such that the rows do not become compacted from the planter wheels. In addition, the tug units 84 will not undergo fatigue or other conditions of humans such that the planters can be operating for a longer period of time and in conditions that are more adverse. When larger planters having a greater number of rows are desired to be used, it is contemplated that multiple tug units may be connected to one another to provide additional power. Such a configuration is shown in FIG. 55, which shows a first unit 150 and second unit 155 connected. The multiple units can supplement their power output with one another to be able to tow heavier implements, machines, or the like. For example, the tug units may be combined in a linear manner such that the power of the drive systems of individual units is combined to be able to pull larger implements. Furthermore, it is contemplated that multiple units are capable of being positioned on a trailer or other implement wherein the power supplies of each of the individual tug units are combined via a single drive system of the trailer, which is then directed to the larger implement for moving through a field.

Therefore, the invention includes numerous advantages. The amount of time of planting is reduced due to the fact that the units can be operated for longer periods of time and in conditions that are more adverse. The adverse conditions may include adverse weather, adverse soil conditions, or the like. Furthermore, when automatic tendering or refilling of the units is included, the amount of time can be reduced due to the decreased downtime for the refilling of the hoppers, fuel, and/or other units. Furthermore, the use of an autonomous and self-propelled tug unit with a planter also provides the advantage of replanting. For example, vision, GPS, aerial views, or the like could determine if a location needs to be replanted due to weather or other conditions. As the location of the tug units have been controlled using some sort of location determining system, such as GPS, the exact location of previously planted rows will be known and can be stored within the intelligent control of the tug unit. Therefore, when an area needs to be replanted, the tug unit will be able to tap into this stored data to near identically align the replanted portion with the previously planted portion without damaging any of the existed planting portions of the field. In other words, the tug units will know the location of the "good" planted crops so that they are not run over or otherwise damaged. In addition, the tug units can control the planter such as to offset a row unit to put down in an exact location needed and can pick up the row units and put down as needed so as not to damage any other planted location.

Figure 43:
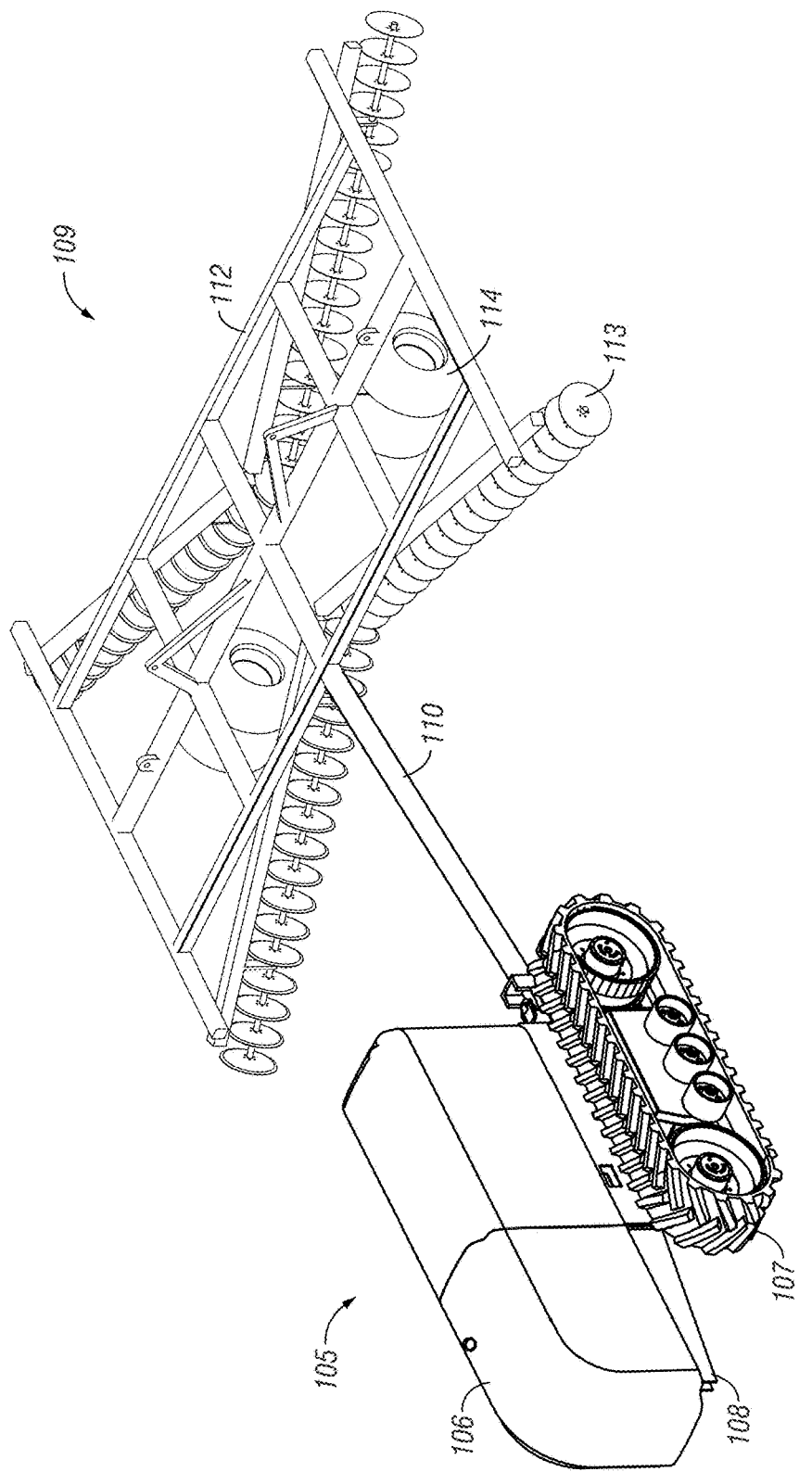
FIG. 43 is a perspective view of a tug unit and a tilling unit.
Figure 44:
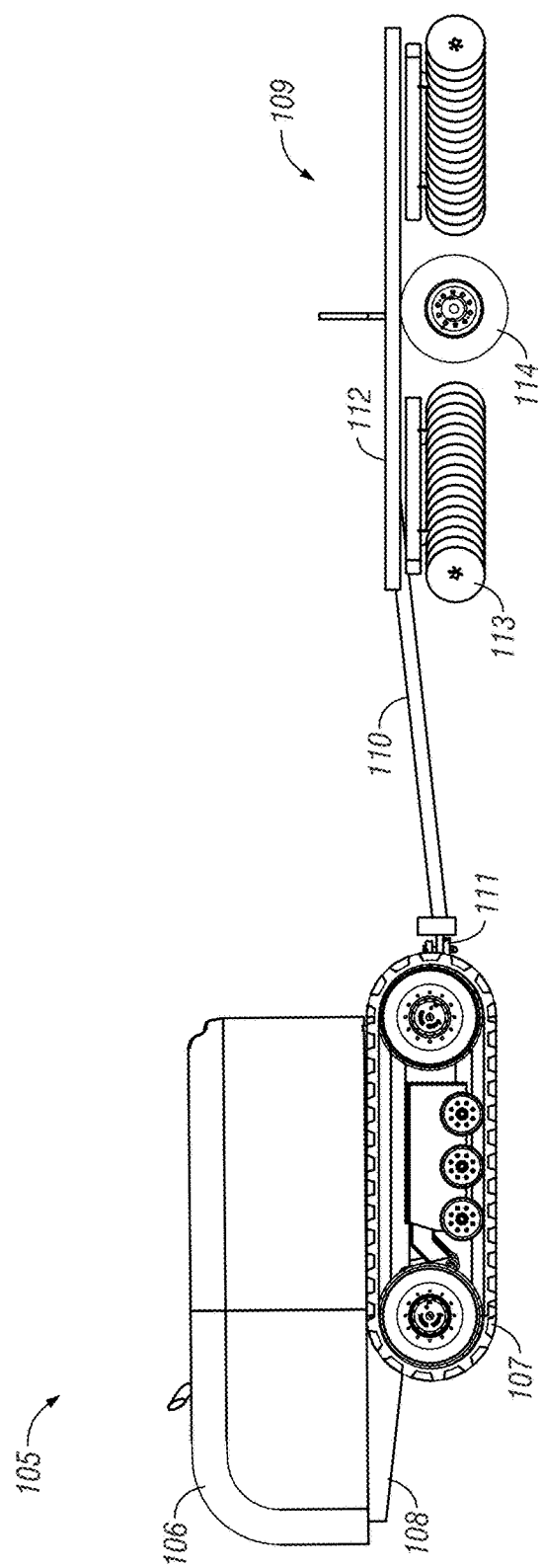
FIG. 44 is a side elevation view of the tug unit and tilling unit.
Figure 45:
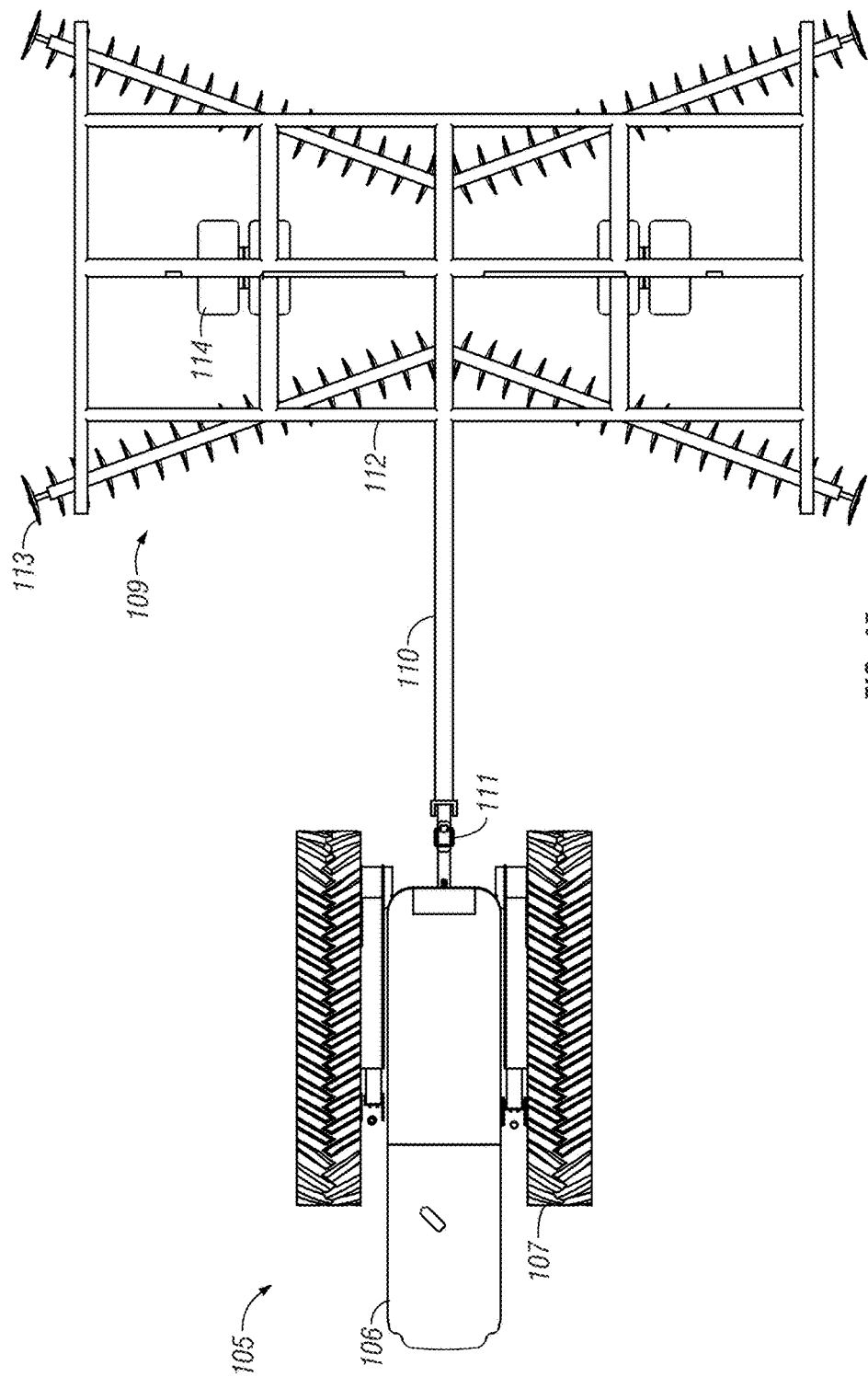
FIG. 45 is a top plan view of the tug unit and tilling unit.

FIGS. 43-45 are various views of a tug unit 105 connected to a tilling implement 109. The tug unit 105 includes a housing 106, wheels or tracks 107, and frame 108. The tilling implement 109 includes a tongue 110 having a hitch 111 at one end and a toolbar 112 on the opposite end. The hitch 111 is configured to attach to the tug unit 105 in one of the manners described. Furthermore, the tilling implement 109 may be connected to electrical, hydraulic, pneumatic, power take-off, or other components of the tilling unit. The tilling implement 109 also includes a plurality of disks 113 and wheels 114. The disks are used to break up soil and stover in a field, while the wheels 114 provide for movement of the implement.

The tilling implement 109 may also include a plurality of sensors positioned thereon and operated by the power supply of the tug unit 105. For example, the tilling or tillage attachment may include moisture and/or temperature systems that determine the soil characteristics of the field being tilled. These soil characteristics could be stored in the tug unit or could be transmitted to a system or another tug unit for later use. For example, the soil characteristics could be stored such that a particular hybrid of seed could be selected to be planted in different locations of a field based upon said soil characteristics. The soil characteristics could also be transmitted data to a system to indicate other aspects of a field. It is contemplated that a tug unit 105 and tilling implement 109 be operated, with a different tug unit and planting implement following said first unit. The tilling could be accomplished directly prior to the planting. The soil characteristics determined by the tilling implement 109 could be transmitted to the tug unit behind said tilling implement so that the second tug unit can operate the planting unit or implement according to said soil conditions received from the first tug unit and tilling implement combination. This could affect the type of seed to be planted, the amount of down force provided, or the like.

Other soil conditions that can be transmitted to a planting unit could be the amount or type of fertilizer to be applied upon the transmitted location, compaction of the soil, moisture content of the soil, obstructions in the ground, such as to tile blowouts, or the like. The implement could determine an area or areas in need of spraying in order to purge weed buildup. Trash buildup could also be determined by the tilling. For example, the trash buildup could be determined wherein the unit is stopped and the tug unit lifts the tilling implement 109 over the trash. There could also be shredding or other components positioned on the tilling implement 109 in which the tug unit 105 transmits to the tilling implement to shred or otherwise remove the trash. For example, blowers could be included on the tilling implement 109 to blow the trash out of the way. Further systems, such as vision or sensor systems could be used to determine weed buildup and characteristics, such as how dense an area is, types of weeds, and the like. This information could be conveyed to a sprayer, fertilizer, or map for preparation of spraying the field. The tilling system could also be used to keep tabs on what areas have been sprayed or what areas may have been missed, due to the buildup of weed. Furthermore, the system could include wireless communications to indicate any broken or otherwise damaged portions of the tilling implement 109.

Figure 46:
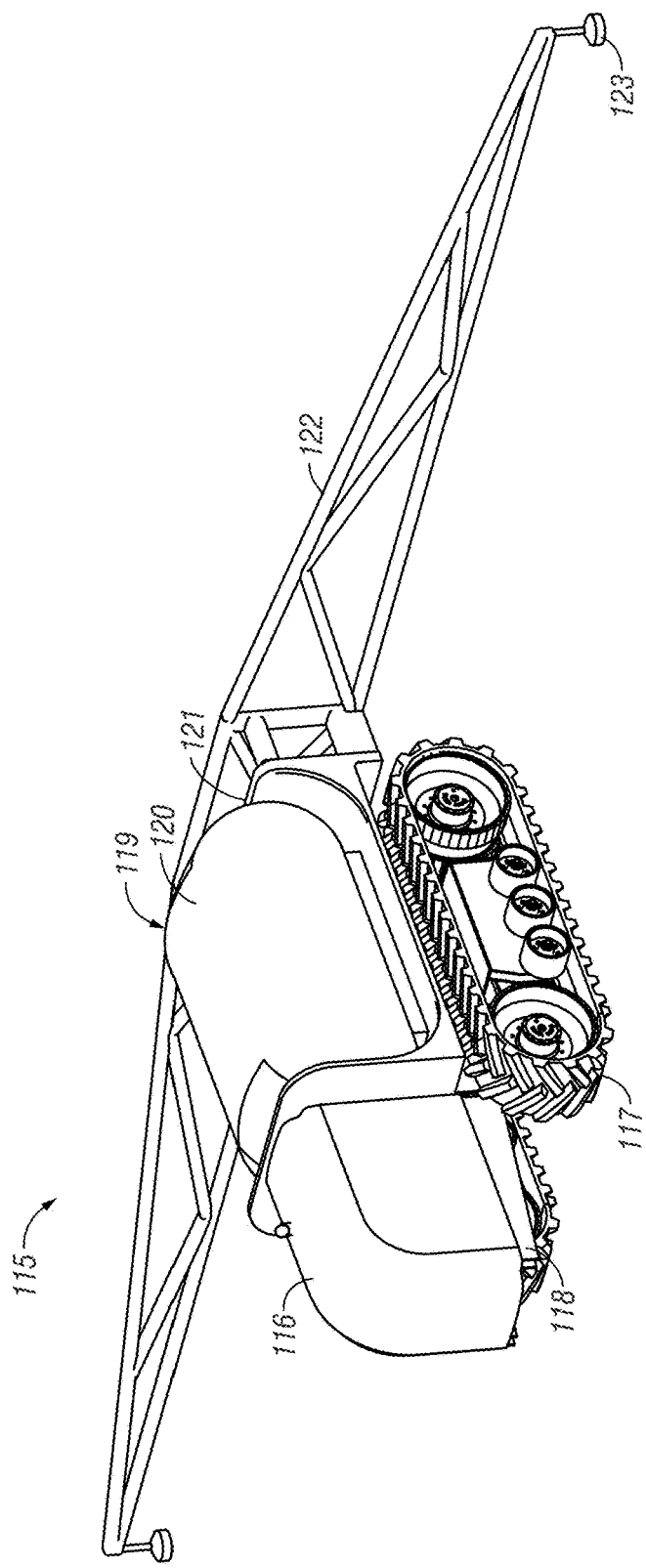
FIG. 46 is a perspective view of a tug unit and a spraying unit.
Figure 47:
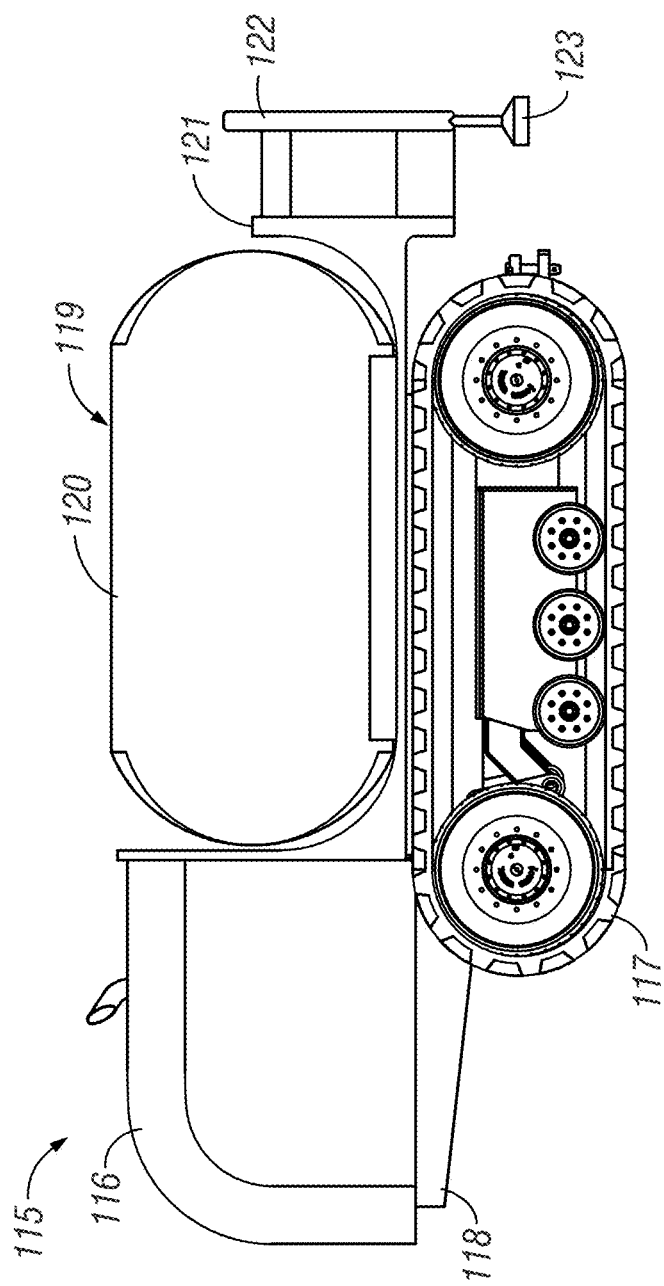
FIG. 47 is a perspective view of the tug unit and spraying unit.
Figure 48:
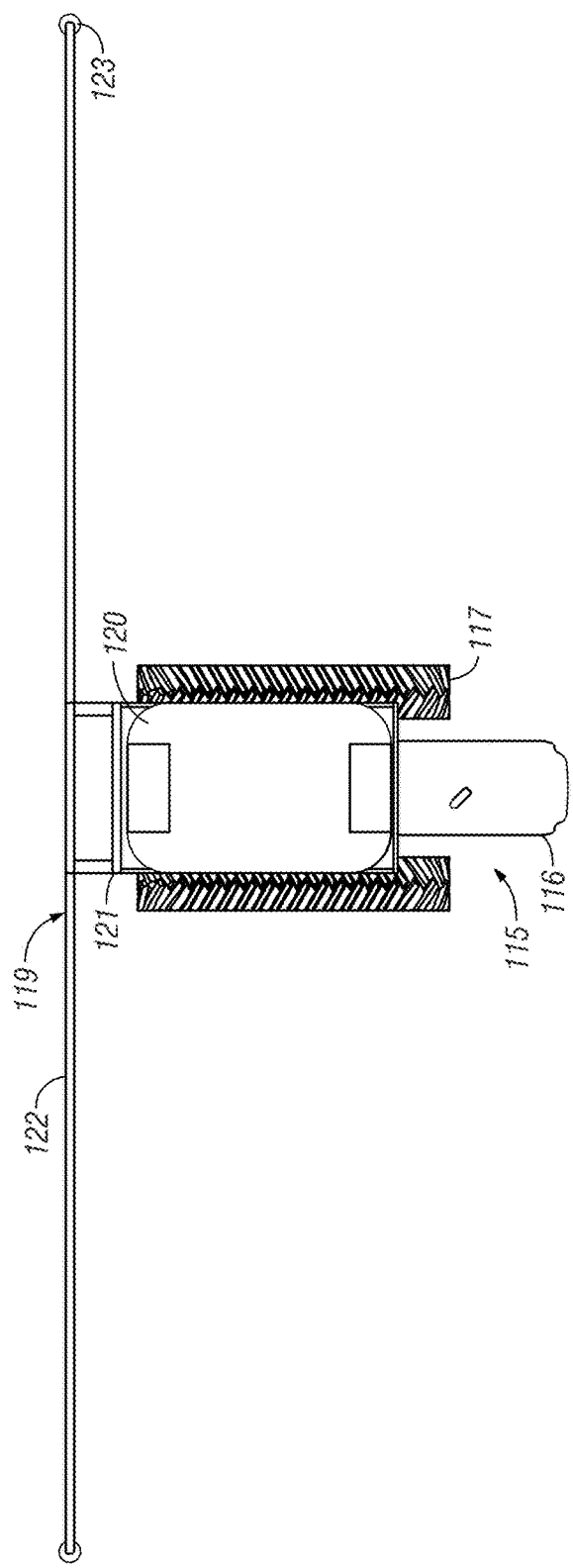
FIG. 48 is a top plan view of the tug unit and spraying unit.
Figure 49:
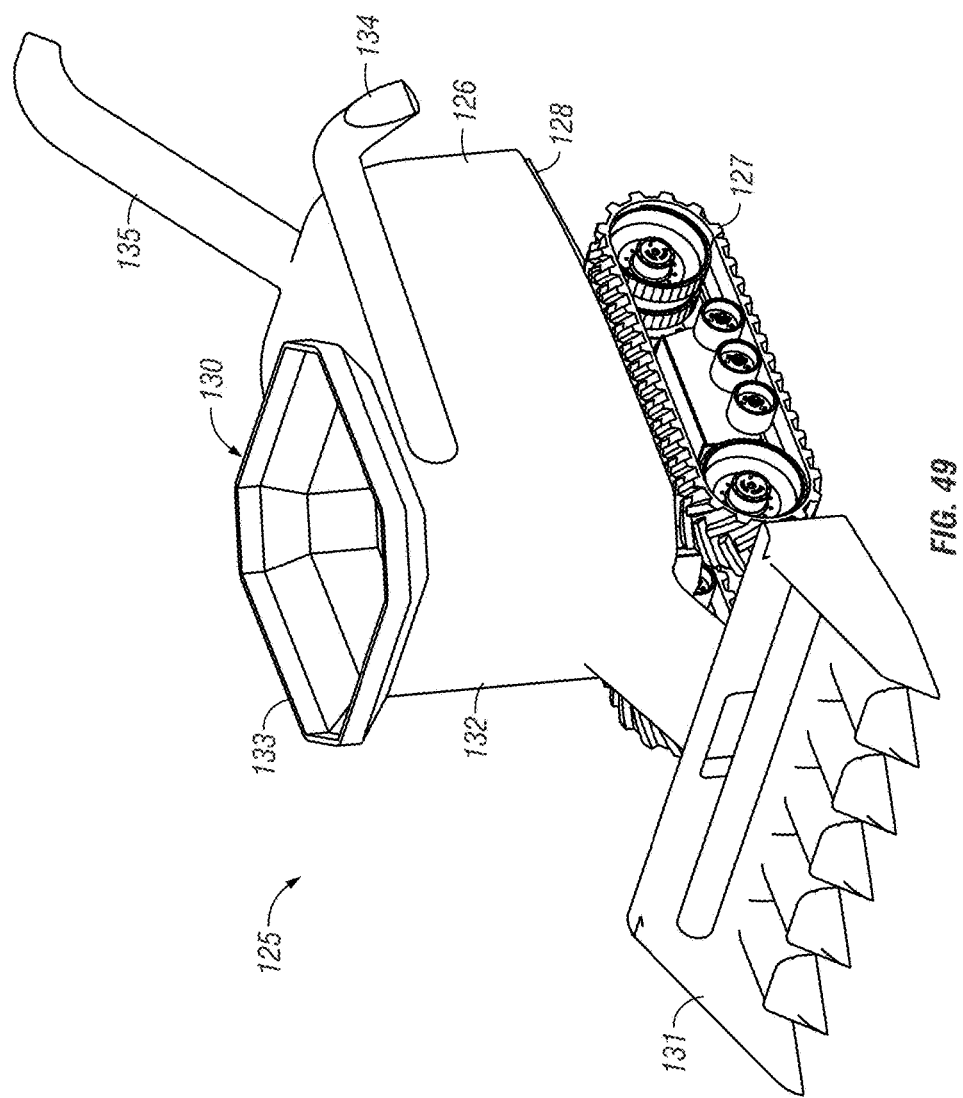
FIG. 49 is a perspective view of a harvesting unit.
Figure 50:
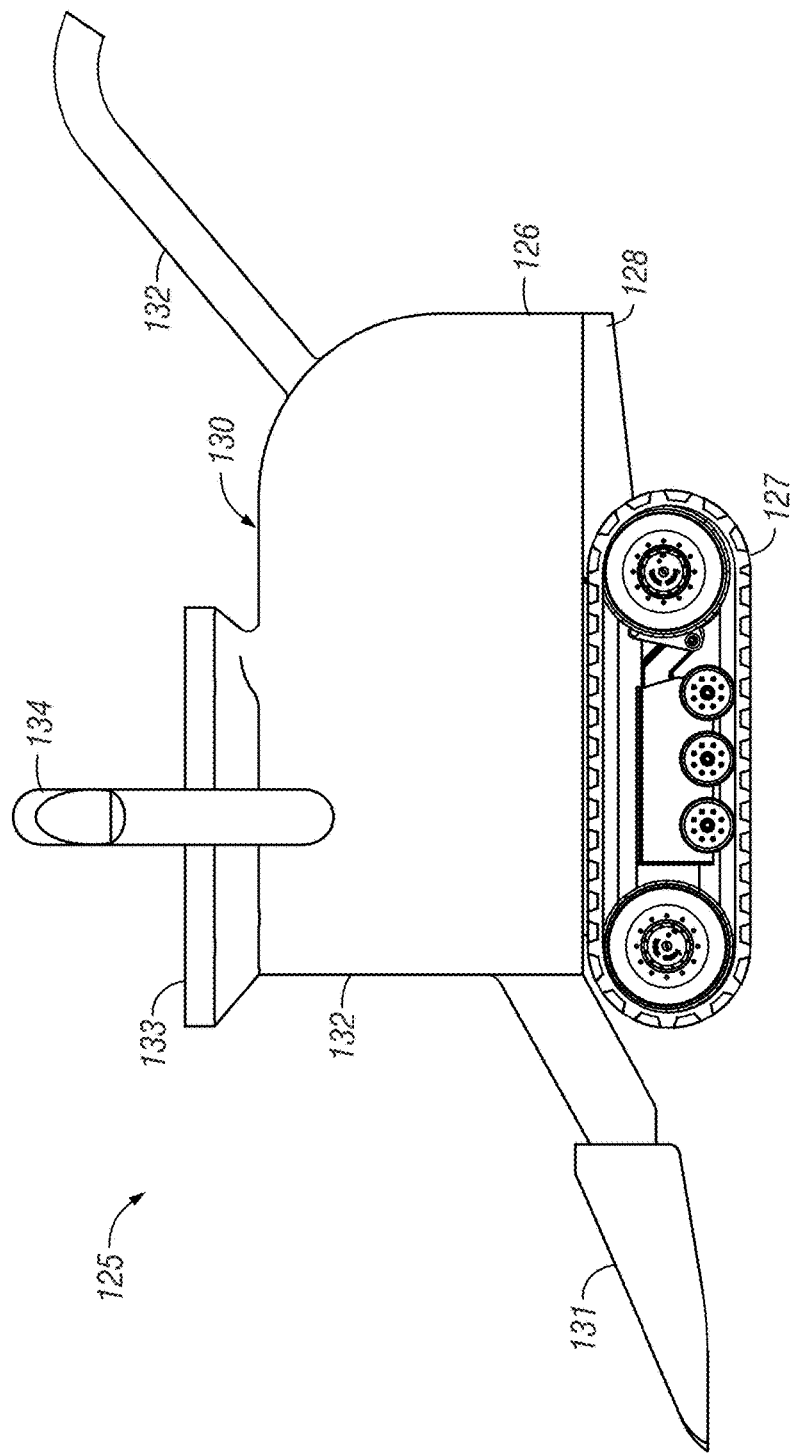
FIG. 50 is a side elevation view of the harvesting unit.
Figure 51:
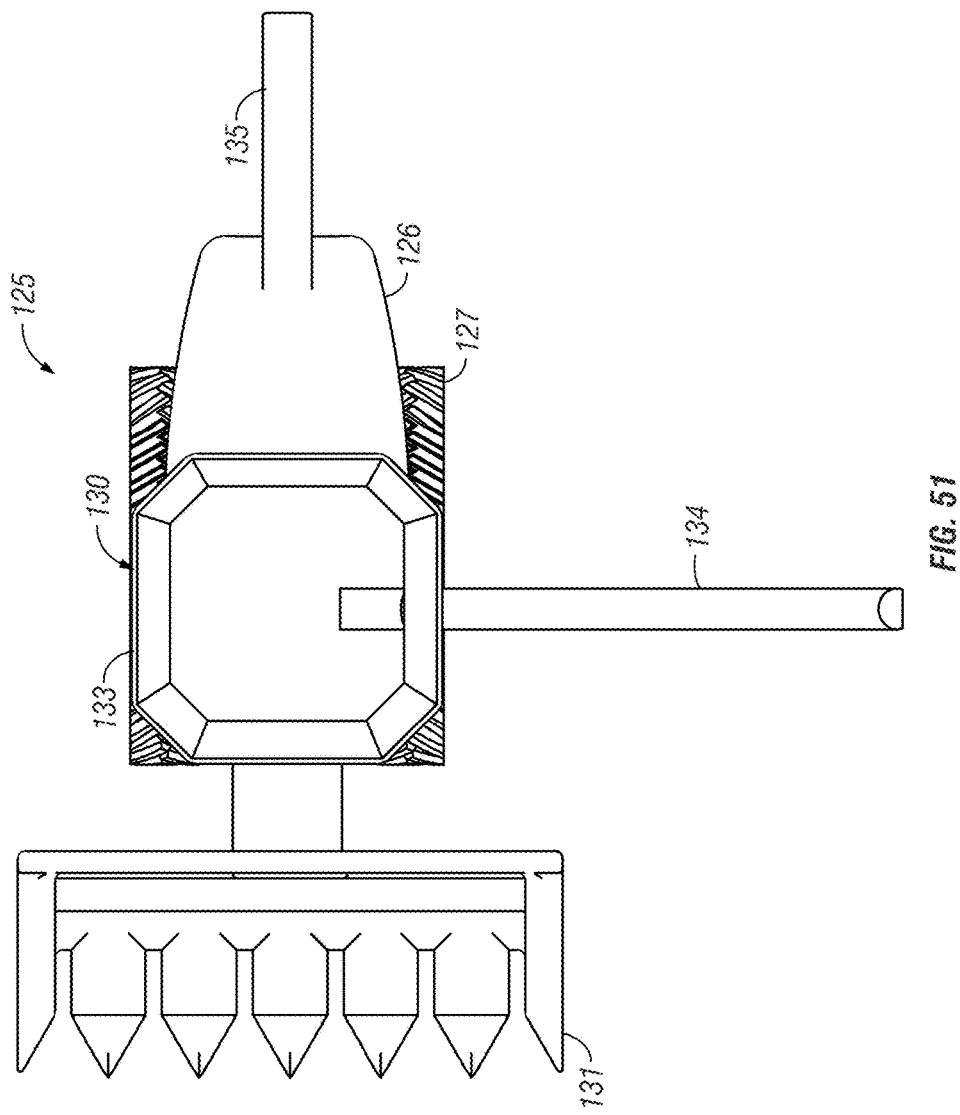
FIG. 51 is a top plan view of the harvesting unit.

FIGS. 46-48 show views of a tug unit 115 connected to a spraying implement 119. The tug unit includes such similar elements of a housing cover 116, tracks or wheels 117, and frame 118. The sprayer implement 119 includes a tank 120, tank frame 121, sprayer arms 122, and sprayer nozzles 123. The arms 122 extend generally outward from the tank and tank frame 120, 121, but are pivotable to be moved to a position alongside the tank 120. While the figures show nozzles 123 at the ends of the arms 122, it should be appreciated that multiple nozzles may be spread out along the length of the arms 122. The spraying implement 119 can be connected and operated by the tug unit 115 to provide a number of advantages. For example, when the tug unit is an electrically driven tug unit, it can provide additional electrical power to the spraying unit. Such characteristics of an electrical spraying implement 119 include varying the width of the spraying arms 122 to vary the location of the nozzles 123. The tug unit can also automatically adjust the nozzles to control the flow rate and the operation of the nozzles to spray and not spray at desired locations. Furthermore, the arms and/or tug unit 115 can include vision systems to determine areas of high weed concentration in order to determine where ideal locations for spraying may be. As indicated above, such areas of high concentration of weeds may be stored or otherwise transmitted to the tug unit 115 such that the entire field is not sprayed, and the spraying may be limited to select locations based upon known data.

Furthermore, the adjustable width of the wheels and/or tracks 117 of the tug unit 115 provides other advantages for spraying. As the system knows precise locations of where to drive, spray, etc., the tug system can store the location information for future purposes. This stored information may also include areas of high weed concentrations and location of previous plantings. The information can be used to plant generally in the same location every year. As such, this information can be transmitted to a tug unit 115 used for spraying, such that the tug unit 115 does not drive over said planting locations (rows), which will minimize compaction of the rows. Other advantages of using a tug unit/sprayer combination may include a pre-programmed map to indicate areas of high weed concentration to determine where to spray, where to shut off spray, or to provide automatic running of the sprayer. The inclusion of communication systems can allow the sprayer to communicate to a CO-OP to indicate that weeds exist. This will allow a tug unit of a CO-OP to automatically go to said precise location to spray to control the weed population. In addition, when a CO-OP operates the tug units with the sprayers, aerial views may be used to indicate field conditions. The aerial views may be obtained by drones or physical pilots and can indicate to the CO-OP areas of high weed location in fields. If high weed concentrations are determined, the tug unit and sprayer combination can be sent out to spray said locations, without damaging known planting locations.

FIGS. 49-53 are views of a harvesting or combine unit 125. The tug unit 125 may also be known as a combine unit 130. The tug unit 125 includes tracks or wheels 127 and a frame 128 onto which the components of the combine unit 130 are positioned. The combine unit 130 includes a combine header 131, cab 132, which may be optional, combine tank 133, grain auger 134, and combine stover auger 135. It is contemplated by the invention that when an electrical drive system and power supply is used for the tug unit 125, the entire combine unit 130 could be electrified. In other words, all components and operations of the combine could be electrically operated by the tug unit power supply. This would include, but is not limited to, separation of the grain and stock, as well as the operation of the grain and stover augers. Furthermore, the electrical systems could include communication data such that the combine unit 130 could communicate to additional tug units of certain situations, such as when grain is needed to be dispensed from the combine tank 133 to a storage or transport vehicle. This is shown generally in FIGS. 52 and 53. The grain and/or stover augers 134, 135 could also include sensors, e.g., vision or other sensors. The sensors could aid in aligning a grain or stover cart, and could also be used to adjust the height, length, angle, or other aspect of the auger while dispensing the grain or stover.

Figure 52:
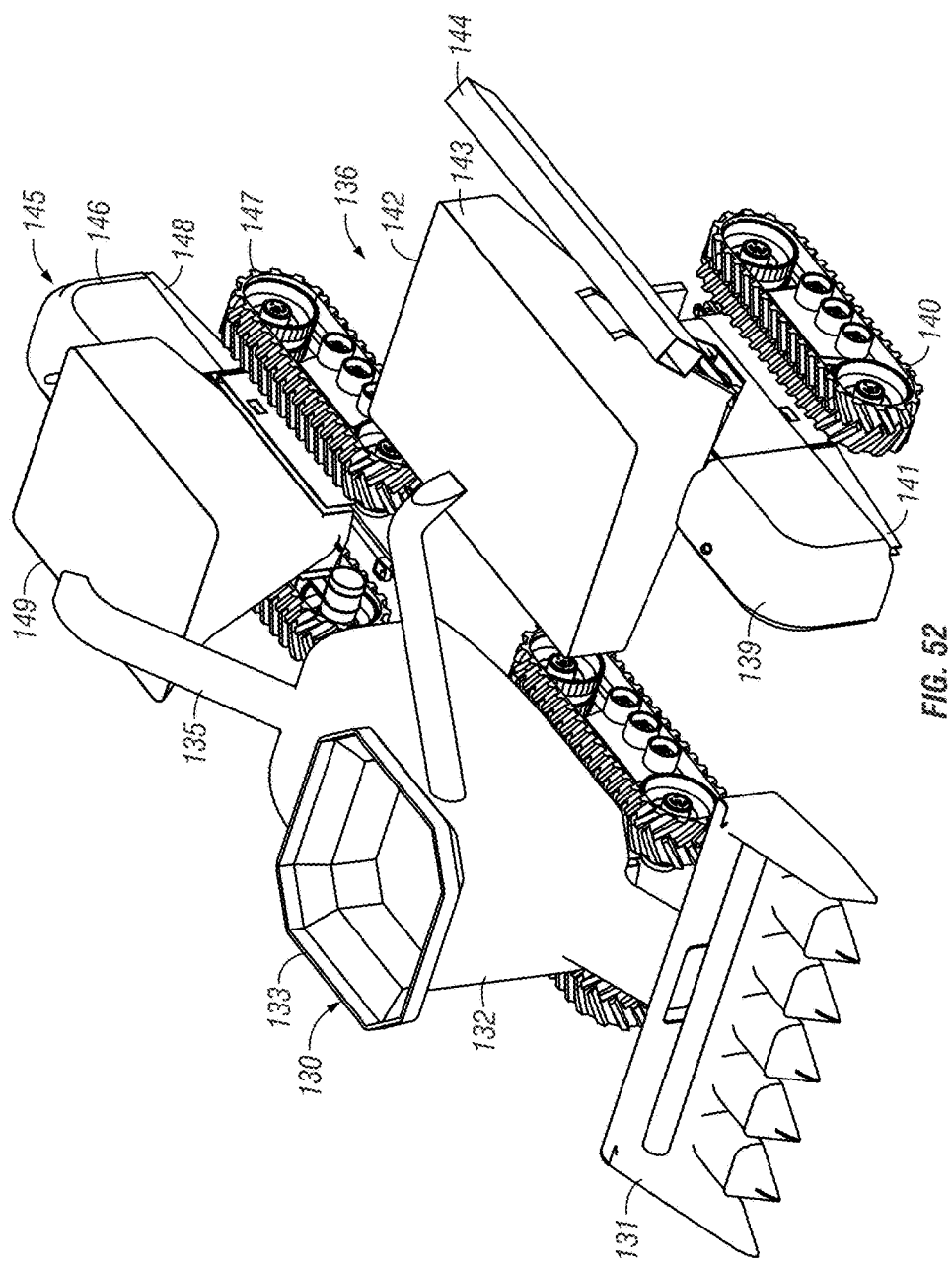
FIG. 52 is a perspective view showing a harvesting unit, grain cart unit, and a stover unit.
Figure 53:
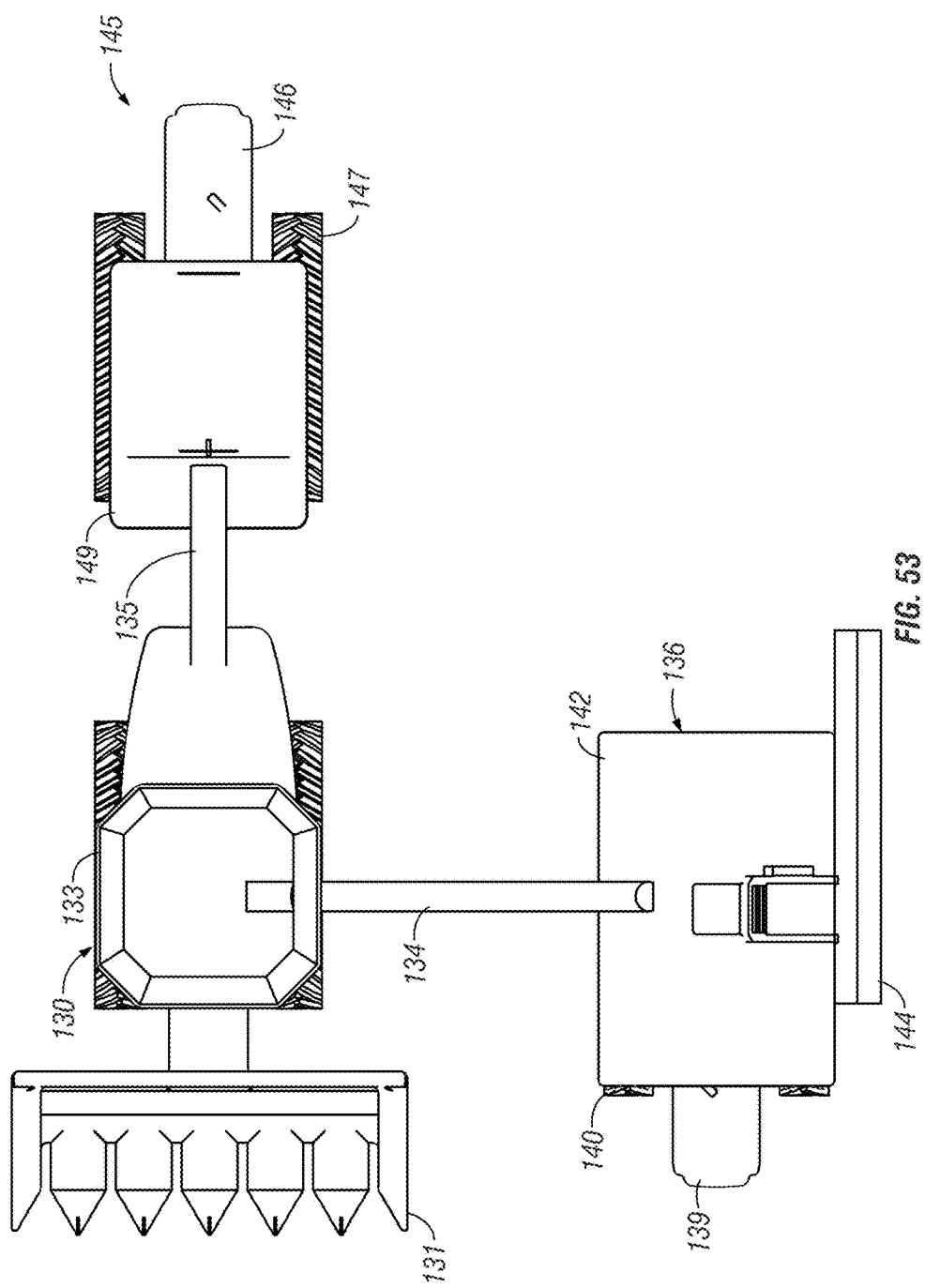
FIG. 53 is a top plan view of the harvesting unit, grain cart unit, and stover unit.

As shown in FIG. 52, a combine unit 130 is joined by a grain cart unit 136 and a stover unit 145. The grain cart unit 136 includes a housing 139, track/wheels 140, a frame 141, a grain cart 142 comprising grain cart walls 143, as well an auger 144. As mentioned previously, the grain cart unit 136 can be used to receive grain from the combine unit 130 and can be adjusted automatically to account for varying amounts of grain and location of grain dispensed therein. Furthermore, the grain cart unit 136 can include communication systems such that the combine unit 130 can automatically signal the grain cart when and where to be located to receive grain from the combine unit. The grain cart unit 136 can also include location devices and other sensors to automatically align the grain cart unit 136 adjacent the combine unit 130. The grain cart unit 136, once full, can then automatically transport to a separate location for dispensing of the grain from the cart via the auger 144 to a storage location.

Furthermore, a separate tug unit 145 may be known as a stover cart unit and can be utilized as well as the grain cart unit 136. The stover cart unit 145 includes a housing 146, tracks/wheels 147, frame 148, and stover cart 149. The stover cart unit 145 can include sensors to locate a combine unit 130, as well as a stover auger 135. The stover cart unit 145 can position itself adjacent the stover auger 135 to receive stover from the combine as it harvests crops in the field. The stover, which includes generally stalks and other refuge from the crop, can then be taken away once the stover cart unit 145 is filled. Furthermore, the stover cart unit 145 can be automatically connected to or can include a baler, such that the stover is transported from the stover cart unit to a baling unit in order to almost instantaneously begin baling the stover as the field is being harvested. This would greatly reduce the amount of time needed for harvesting as well as baling. A baling attachment could be part of the stover cart, wherein the electric power system of the tug unit powers the baling attachment in order to bale the stover and dispense bales in a field during combining.

In addition, it is contemplated that multiple grain cart units and/or stover units be used at the same time. For example, it is contemplated that multiple grain carts be located adjacent the combine. When one grain cart is filled, the next grain cart located adjacent the first grain cart can automatically be located adjacent the grain auger 134 of the combine unit 130 to begin receiving grain therefrom. Thus, it is contemplated that the multiple grain cart units be connected to one another or separate of one another. When connected, an umbilical cord type member may be connecting the two to operate the grain cart units in tandem with one another. However, when unconnected, GPS, or other sensors may be used to locate and position the grain carts adjacent one another. This would provide a situation in which there is little to no delay in aligning a new, emptier cart adjacent the combine grain auger to receive grain therefrom.

Furthermore, when a stover cart 145 is used with or during the harvesting of the combine unit 130, the stover cart may include a baling portion. The baling portion may begin baling the stover as it is collected by the stover cart 145. When a bale is removed or otherwise dispatched by the stover 145, its exact position can be located or noted and saved in the system. The exact location can then be sent to another unit or saved for a later time, during which the bale could be picked up. For example, the bales could have a geo tracker or tag put on the actual bale or on a system of the unit to indicate the location of the bale. The communication could be transmitted to a baling picker up unit to transmit the location of the bale and whether it has been picked up or not. A unit could then go out in the field and pick up bales and transport them to a truck or to another location. A vision system of a tug unit could be used to determine the best way to pick up a bale, and could include an awareness system to determine the type of bale, e.g., large square, small square, or round. When a round bale is used, for instance, a camera of a tug unit could be used to determine the orientation of the bale for lifting.

The tug units could also be used for other industries and operations not disclosed thus far. For example, tug units could be used for grass forage. The tug units could automatically attach to a mower or other grass forage implement to provide electrification of the mowing implement. This also may include silage cutting or bio-harvesting. The vision systems of a tug unit and/or mowing implement could be used to determine where to mow and what has or has not been mowed. A communication system of the machine could be used to communicate to other machines such as locations to throw silage. The communications could also be with the driver of a vehicle, and knowing the location of a transport or storage trailer for spraying purposes.

Other markets could be a specialty crop markets for use with the tug machines. For example, an autonomous and self-propelled tug machine can be used in specialty markets, such as fruit, vegetables, and nuts. In nut applications, the tug unit can attach to implements to automatically shake trees and to collect the nuts that fall from the trees. The trees could include a geo-tag to communicate the location and whether it has been shook, where the tug unit would then give notice to harvesters to pick up the nuts from the shaken tree. In fruit or orchid operations, the tug units can provide automatic pruning of fruit trees or vines or otherwise provide automatic harvesting of the fruit. The tug units could also be used to automatically follow harvesters in rows or between rows of fruit and/or vegetables in order to hold the harvested fruits and/or vegetables from the harvesters. The tug units could provide automatic platforms for human operators wherein they can rapidly and efficiently move operators to where they need to be for each operation. This could improve the efficiency of the human operator and also could provide location specific in exact locations for the different operations of the human operators. Finally, the autonomous tug units could be used for spraying insecticide, pesticide, or fertilizer applications without a driver present. This increases the safety and efficiency of the spraying. Visual recognition of existing vegetation will also be advantageous to the spraying location and the spray quantity to match needs of the vegetation.

Figure 56:
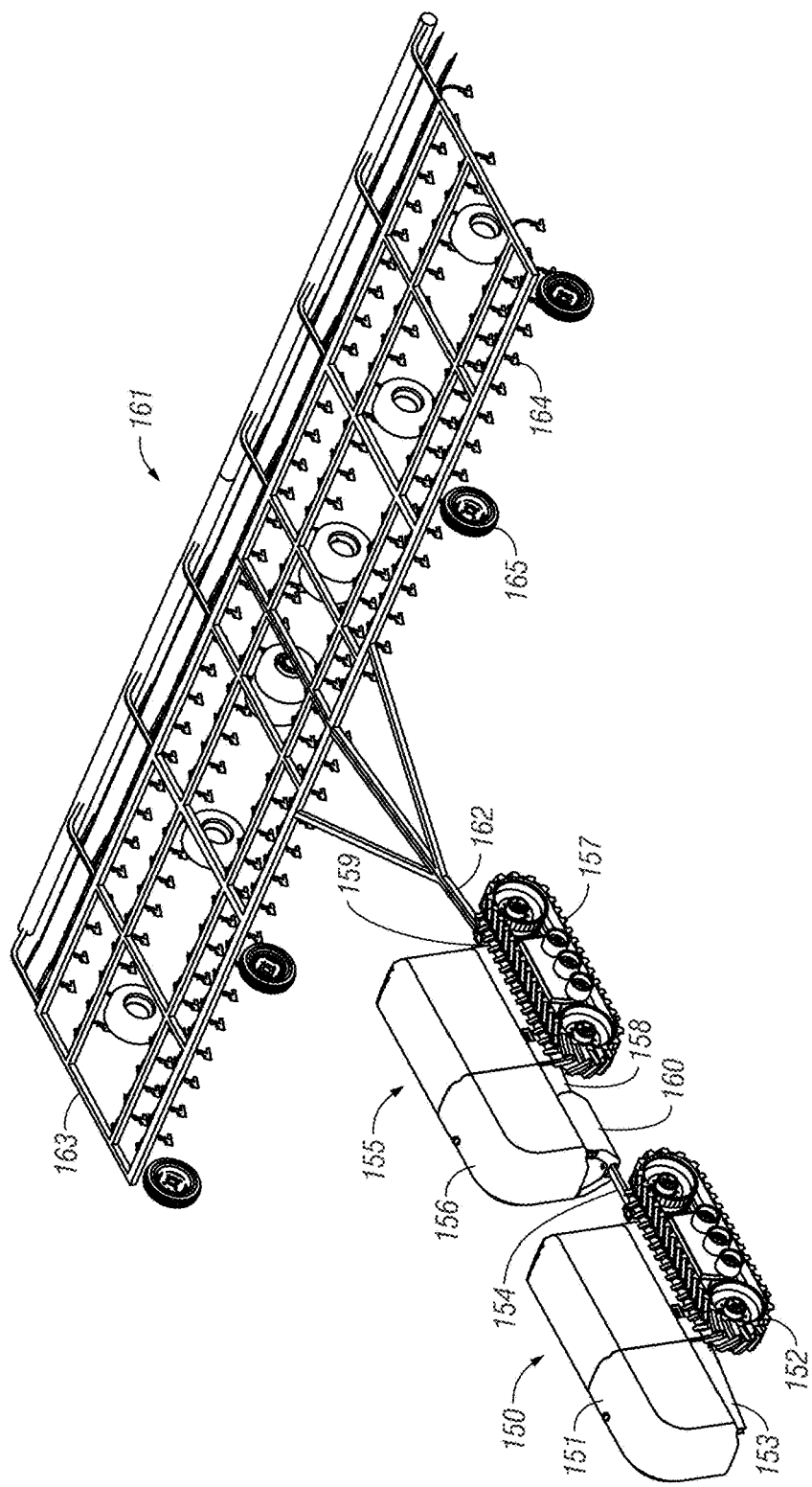
FIG. 56 is a perspective view showing multiple tug units connected to an implement.
Figure 57:
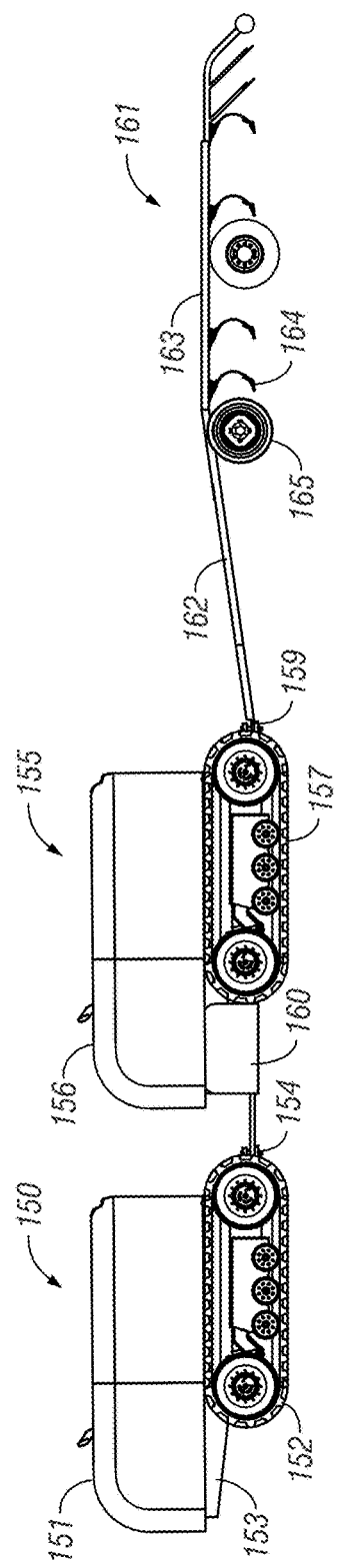
FIG. 57 is a side elevation view showing multiple tug units connected to an implement.
Figure 58:
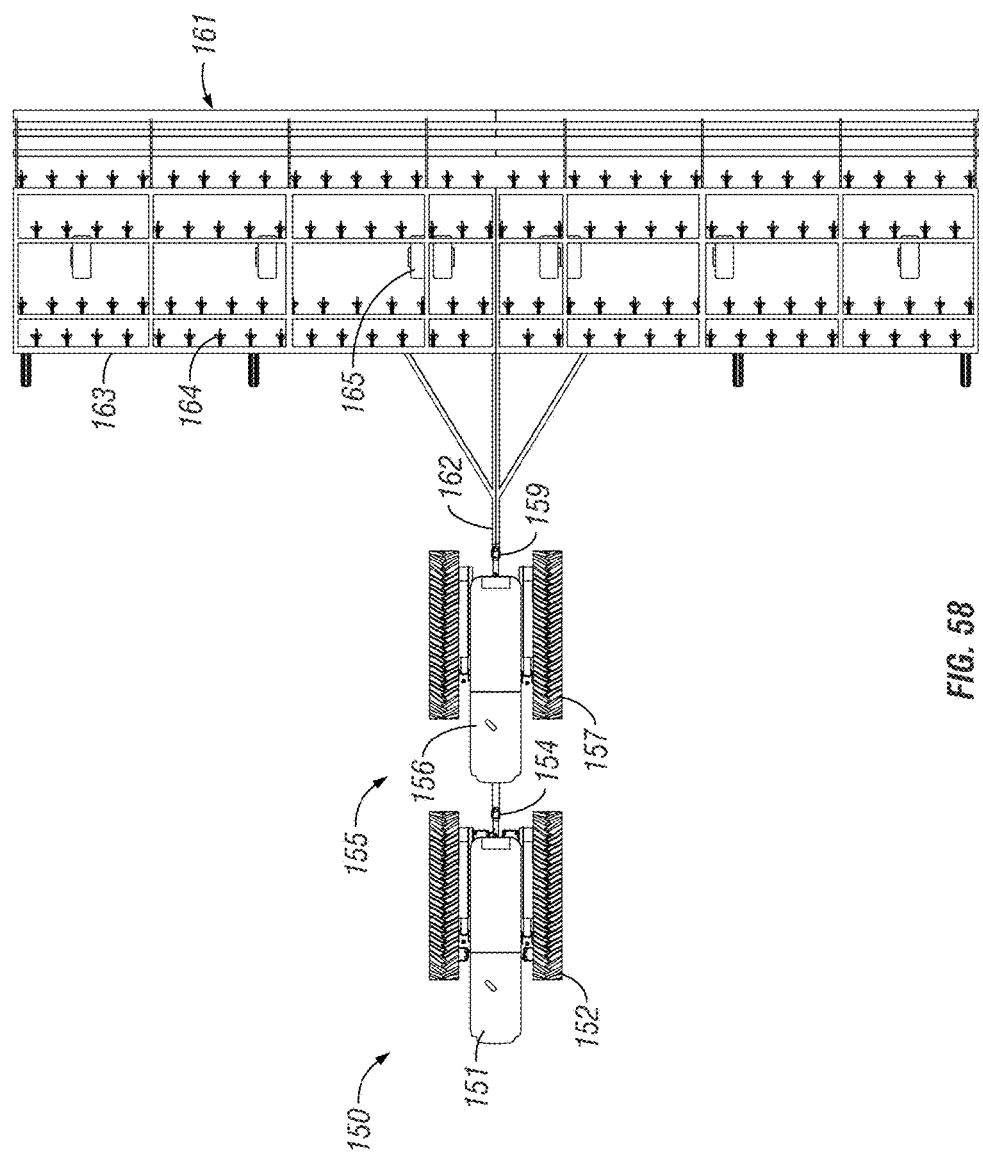
FIG. 58 is a top plan view showing multiple tug units connected to an implement.

FIGS. 54-58 are views showing multiple tug units attached to one another. The figures show a first tug unit 150 and second tug unit 155. The first tug unit 150 includes a housing cover 151, trackers/wheels 152, a frame 153, and an attachment mechanism 154. The second tug unit 155 includes a housing cover 156, tracks/wheels 157, a frame 158, an attachment mechanism 159 and a control box 160. The first tug unit 150 includes a member extending from the attachment mechanism 154 to the control box 160 of the second tug unit 155. This may be known as an umbilical cord member wherein the control box 160 receives information from the first tug unit 150 and operates accordingly. Such information may include information regarding speed, turning, stopping, delegation of power, or the like. Therefore, the first and second units 150 and 155 can operate generally in tandem with one another. In addition, the two units can multiply their power output to be able to have a greater singular output therefrom. This is shown in FIGS. 56-58, and would allow a larger implement to be used. The units 150, 155 could also be connected via a hard hitch to transmit the information and provide for the tandem tug units, as shown and described. Other types of attachment mechanisms, such as attaching units via power take-offs input/outputs are also contemplated.

In the figures, a larger implement 161, such as a planter with a greater number of row units or a tiller with more tilling tools, is being pulled by the combined first and second tug units 150, 155. The size of the implement 161 is such that one tug unit may not be able to provide enough power to pull said implement 161. The implement includes a tongue 161, frame 163, tools 164, and wheels 165. Therefore, combining the two tug units will allow the larger implement 161 to be pulled without having to adjust the implement 161, while still having the advantages of the use of the tug units. This can be advantageous when an operator has an existing implement that is larger than is capable to be pulled by a single tug unit. In addition, the tugs may be connected in other means besides the umbilical cord. However, the depiction shown in the FIGS. 56-58 indicate at least one way in which the combined power of the tug units can be utilized to pull larger implements than what is capable with a single tug unit.

Other aspects and embodiments of tug units are also provided as part of the invention. It is highly desirable that the tug units run continuously and uninterrupted for many hours and overnight without intervention and often in remote areas. It is at times not feasible or desirable (such as due to efficiency, field compaction) to carry all the heavy payload and required propulsion fuel on the vehicle for extended operations. Therefore, it may be advantageous to support the autonomous tug units with a field docking station that can autonomously supply propulsion fuel, seed, fertilizer, insecticide or anything the vehicle might needed to sustain its operations for extended periods without human intervention. The docking station can also serve as a base station for autonomous agricultural vehicles supporting their function as well as master controlling for multiple autonomous vehicles operating within the same area.

The autonomous docking station can be transportable to remote field locations by a transport vehicle, such as a semi-trailer truck. The docking station's structure can be built similarly to over-the-road trailers. Its major components are built on the structure and include a docking/towing station for single or multiple autonomous agricultural vehicles, bulk storage for fuel, powering the docking station, and supporting autonomous vehicles with fuel, seed, fertilizer, insecticide or other needs. The docking station is capable of having an independent power generation, an electronics bay, distributed sensors that monitor and control the autonomous operation of the supported autonomous vehicle as well as to support and manage docking rendezvous and field operations with individual or multiple vehicles. The docking station also has systems for bulk transfer of fuel and payloads to vehicles through standardized or non-standard umbilical or docking adapters. Furthermore, it is contemplated that the docking station house maintenance or tender tug units, which can supplement the use of the tug/implements in a field.

As has been mentioned, the invention contemplates the use of maintenance or tender tug units. These are units that can be dedicated, either temporarily or permanently, to providing support for other tug units. The maintenance units can receive a signal from another unit as to a problem. The problem may include, but is not limited to, fuel needs, grain needs, other particulate needs, repair, modular replacement, towing, assessing, or the like. For example, a tender unit could be used to refill the fuel of the power supply for the electric generator, could refill seed for planting, could replace a modular row unit, could tow a stuck unit, or could utilize sensors and other diagnostic tools in order to assess why a particular unit is not operating correctly. When the assessment has been completed, the maintenance unit could then transmit the information to a master module, make necessary repairs and save data related thereto, alert an operator as to the situation, alert a manual repair service, or even order necessary parts needed for repair.

Figure 59:
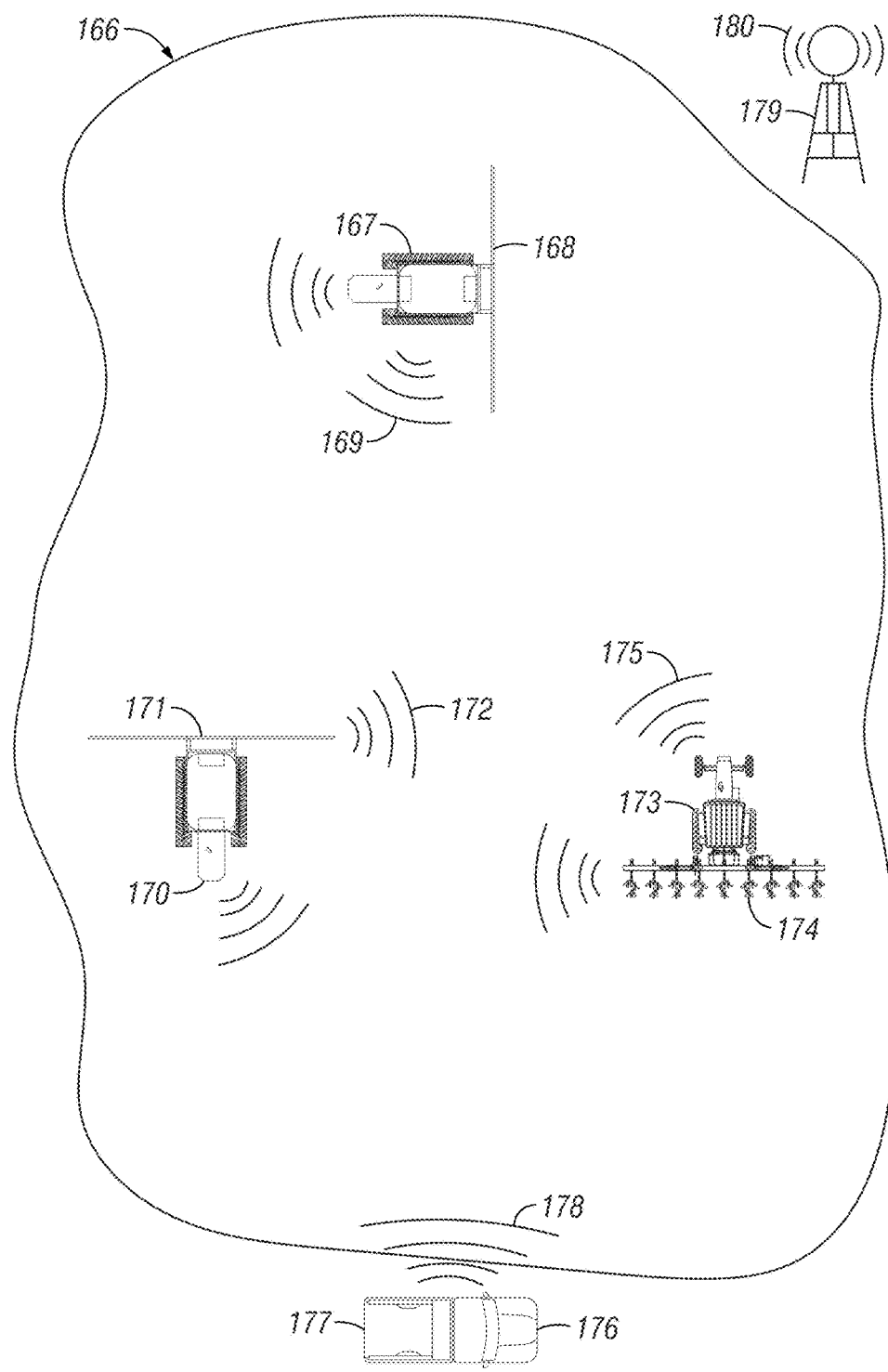
FIG. 59 is a schematic diagram showing multiple units in a field.

FIG. 59 is a schematic diagram showing multiple units in a field 166. As shown in FIG. 59, a field 166 may include a first tug unit 167 attached to a first implement 168, a second tug unit 170 attached to a second implement 171, and a tractor 173 attached to a tractor implement 174. Furthermore, there is another vehicle 176 with a vehicle implement 177 shown outside the field 166. The first and second tug units 166, 167, as well as the tractor 173 are performing an operation within the field. The use of the multiple vehicles in the field at the same time will reduce the amount of time to complete the operations.

In order to ensure that the units and tractor do not overlap one another or otherwise run into one another, the units emit signals, which can be communicated and transmitted between each other. Thus, the first tug unit 167 emits at least one signal 169, the second tug unit 170 communicates at least one signal 172, and the tractor 173 communicates at least tractor signal 175. Furthermore, the vehicle 176 transmits at least signal 178. These signals can include a vast amount of information. For example, these signals can communicate the location of the units relative to one another as well as relative to the location in the field. The signals can also communicate any alerts, warnings, status updates, or other actions that may be occurring. For example, if the first unit 167 indicates that it is low on material, it may alert to the remaining units of such. This can indicate to the vehicle 176 to locate the first unit 167 and to refill the implement 168. If one of the units is damaged, it can also communicate to each other and to the vehicle 176 as such, and appropriate action can be taken. Additionally, these signals can include general status updates of soil conditions, trash build up, weed concentration, and the like. When the units and/or tractors are combined, they can also indicate to each other as to the need to dispose of grain or stover, and include to the vehicle to pick up grain from one or more places. If the vehicle 176 is a semi or other grain storage vehicle, the units can transport the grain from the field to the vehicle implement 177.

Furthermore, the figure shows a tower 179 emitting a tower signal 180. The tower 179, which could be one of many towers around the field, can provide additional location determining aspects for a field. Therefore, the first unit 167 can emit a signal to the tower 180 that can then communicate to the vehicle 176 as to the exact location of the unit 167 in the field 166. The height and/or position of the tower may increase the efficiency of the communication between the actors in the field. The tower can also communicate to another field or to a master module located at a different location as to the status, alerts, warnings, or other data obtained by the vehicles in the field. In addition, it is contemplated that the data from the signals can be stored for future purposes. For example, as the units operate in the field, they can obtain data, such as field conditions to prepare future planting schedules and/or maps. Therefore, the invention contemplates a system including memory for data storage. The memory can be included in each of the vehicles, can be included at a master module location, or can include a combination wherein the data is stored by memory at multiple places for future use.

Figure 60:
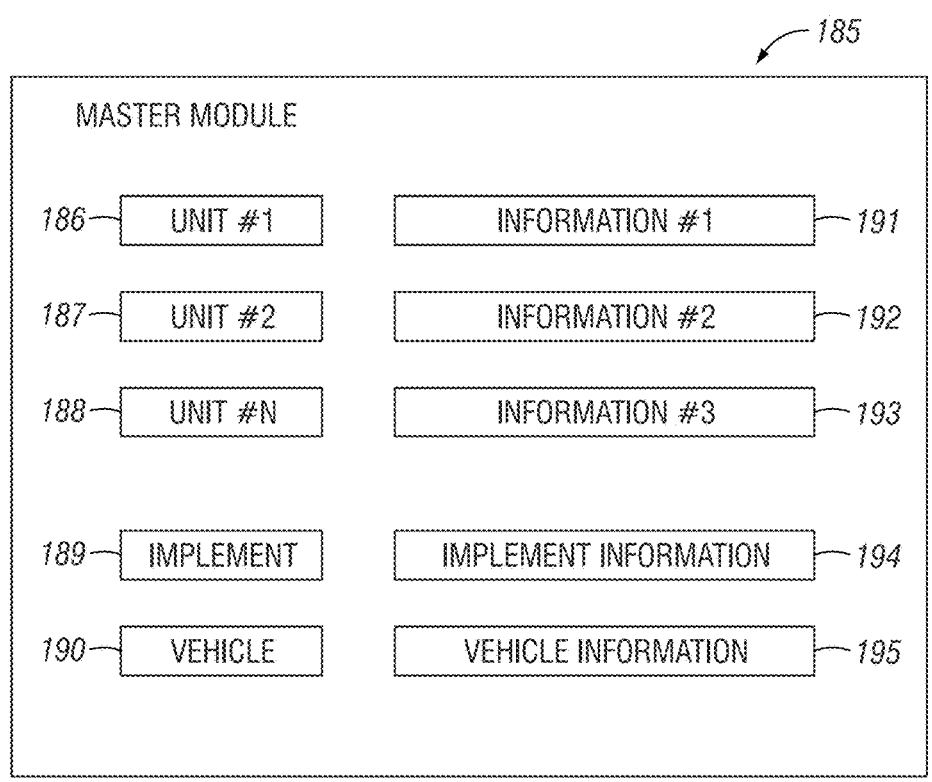
FIG. 60 is a diagram of a module for use with a system including various units.

FIG. 60 is a diagram of an example of a module 185 for use with the system including multiple vehicles and/or units, such as disclosed in FIG. 59. For example, the tractor 173 may include the module 185 as shown in FIG. 60. The module 185 can include numerous information, and is not to be limited to the information shown in FIG. 60. However, for exemplary purposes, the module 185 shown includes such information such as identifying the units. For example, in FIG. 60 the unit one identifier is shown in box 186, unit two is shown in box 187, and unit N is shown in box 188, where N is used to indicate the ultimate number of units in the field. For example, the invention contemplates that generally any number of units can be utilized at one time, and is not to be limited to the use of two units. Therefore, such as when five units are used, the number of boxes for the units will be five with the ultimate N number being five. Furthermore, implement identification for the tractor containing the master module 185 can be shown in box 189 and vehicle identification can be shown in box 190. Information for each of the units can be shown in boxes 191-195. Such information may include, but is not limited to, the status of the unit and/or implements connected thereto, location of the units, alerts or warnings associated with the units, field conditions, seed conditions, or the like. Such information may include the rate of planting, the amount of down force provided for each implement, the soil conditions, seed conditions, amount of remaining material, type of spraying, amount of spraying, moisture content, or generally any other type of information that may be useful for any of the agricultural based operations, as disclosed. In addition, the information boxes may include warnings or alerts that can flash or otherwise provide notice to the master module. For example, when an implement or unit is damaged, the information can alert to what exactly is damaged. When an implement is running low on material, the information can be disclosed on the screen of the master module 185. An operator can then select to send a repair or tender unit to refill the implement. In addition, the unit can be a closed looped situation in which the low or empty implement can automatically be repaired or filled by a tender unit. Thus, the amount and type of information disclosed in the master module is generally limitless. Furthermore, the module 185 or the system in general may include memory for storing data. The data could be recalled by the master module, such as in a future planting or harvesting year to indicate choices or other information.

Additional aspects include the use of a manual drive remote. The manual drive remote will allow for the operation of any aspect of the tug and/or tug and implement combination. For example, it will do all of the operating functions in either a wired or wireless manner. When wireless, Wi-Fi, Bluetooth, or otherwise wireless technologies could be used to operate the remote. Furthermore, the manual drive remote can be used when a cab is used with the tug unit, as well as when no cab is used.

Furthermore safety elements can be included, such as redundant and independent safety systems that prevent the tug units from inadvertently moving. These can include, but are not limited to, vehicle-mounted emergency stop buttons, safety handheld remotes, autonomous lockout, as well as other lockout mechanisms. For example, a battery-powered, safety handheld remote transmitter is provided with each tug unit. The safety handheld remote includes an emergency stop button that allows the user to perform an emergency stop remotely over a limited distance, as long as the remote is within communication range of the tractor. The safety handheld remote emergency stop button halts only the unit controlled by the remote. A Run/Pause switch that switches the units between autonomous and manual (non-autonomous) operation is also included.

Other advantages of the invention will be readily apparent. For example, the addition of large fuel and/or seed tanks may allow the multiple units to be operated for longer periods of time. It is even contemplated that the units could operate around the clock, in order to continue operations to be able to be sure to finish the operations in a period of time. Other types of engines could be utilized to operate the drive system or to provide power to the electrical power supply. Coal, turbine, solar, or fuel cell engines could be included as part of the units. Other sensors, such as lights, infrared, and the like could also be used.

Therefore, a system, method, and apparatus of autonomous farm based operations have been disclosed. The invention contemplates numerous various, options, alternatives, and is not to be limited to the specific embodiments shown and described herein. For example, as mentioned, the systems are not to be limited to agriculture based operations, and can include generally any operations in which autonomous units may be utilized. Those skilled in the art will appreciate that, while the invention has here forth been disclosed, various other changes may also be included within the skill of the invention.

What is claimed is:

1. A method of transporting a plurality of autonomous vehicles from a first location to a second location, the method comprising:
   providing a master unit;
   connecting one or more autonomous vehicles to the master unit such that the master unit is configured to continuously communicate information to the vehicles;
   wherein the one or more autonomous vehicles include information obtaining devices electrically connected to an intelligent control and an implement capable of performing one of a plurality of agricultural based operations selected from the group consisting of a. planting; b. tilling; c. baling; d. harvesting; e. spraying; f. transporting; and g. cultivating;
   transporting the master unit in a leading path between the first location and the second location;
   generating a following path for the one or more autonomous vehicles based on information related to the leading path of the master unit;
   continuously communicating the following path to the one or more autonomous vehicles such that the autonomous vehicles travel in the following path of the leading path based upon said communicated information; and
   automatically adjusting, based upon one or more regulations along the path, a physical aspect of the one or more autonomous vehicles during transport to comply with the one or more regulations, said physical aspect comprising a width of the vehicle or a height of the vehicle.

2. The method of claim 1 wherein the step of operating the master unit comprises manually driving the master unit.

3. The method of claim 1 wherein the step of operating the master unit comprises allowing the master unit to operate autonomously by providing the second location and allowing the autonomous master unit to configure a leading path to the second location while also obtaining information related to the travel along the leading path for communicating to the additional autonomous vehicles.

4. The method of claim 1 further comprising determining the leading path based upon geographical information related to the first location and the second location prior to operating the master unit in said leading path.

5. The method of claim 4 further comprising obtaining information by the master unit and following autonomous vehicles along the leading and following paths as the vehicles travel towards the second location.

6. The method of claim 1 wherein the leading path comprises a shortest distance between the first location and the second location.

7. The method of claim 6 further comprising adjusting an aspect of the transport of one or more of the autonomous vehicles based upon the obtained information.

8. The method of claim 7 wherein the aspect of the transport comprises one or more of:
   a. the speed of the vehicles;
   b. the path of the vehicles;
   c. the distance between adjacent vehicles; or
   d. the weight of the vehicles.

9. The method of claim 1 wherein the following path is different than the leading path.

10. The method of claim 1 wherein the step of connecting the one or more autonomous vehicles to the master unit comprises wirelessly connecting the vehicles such that the information is transmitted wirelessly directly between the one or more autonomous vehicles and the master unit.

11. A system for controlling the transport of a plurality of autonomous vehicles from a first location to a second location, comprising:
   a master unit comprising one or more information obtaining devices configured to obtain field information related to a leading path traveled by the master unit and electrically connected to an intelligent control;
   one or more follower units comprising information obtaining devices and configured to travel on a following path determined by the field information related to the leading path, said one or more follower units also comprising an implement for performing at least one agricultural operation selected from the group consisting of a. planting; b. tilling; c. baling; d. harvesting; e. spraying; f. transporting; and g. cultivating;
   a communication network connecting the master unit to the one or more follower units;
   said communication network configured to continuously transmit information between the master unit and one or more follower units and including the obtained information of the information obtaining devices of the master unit and one or more follower units; and
   said master unit and one or more follower units configured to automatically adjust a physical characteristic of said units during the leading and following paths to comply with one or more regulations or laws associated with the paths; wherein said physical characteristic comprises a width of the units or a height of the units.

12. The system of claim 11 wherein the communication network comprises one or more cables connecting the master unit and one or more follower units.

13. The system of claim 11 wherein the master unit and the one or more follower units comprise wireless communication devices and the communication network comprises the transmittance and communication between the master unit and one or more follower units wirelessly.

14. The system of claim 11 wherein the master and follower units are all autonomous vehicles.

15. The system of claim 11 wherein the master unit is a manually operated vehicle and the follower units are autonomous vehicles.

16. The system of claim 11 wherein the information obtaining devices of both the master and follower units comprise one or more of:
   a. vision sensors,
   b. radar sensors,
   c. LIDAR sensors,
   d. heat sensors,
   e. moisture content sensors,
   f. radio frequency sensors,
   g. short-range radio,
   h. long-range radio,
   i. antennas;
   j. GPS;
   k. LIDAR; or
   l. radar.

17. The system of claim 11 wherein the communication network transmits information related to the transport of the master unit and one or more follower units from the first location towards the second location, and wherein the obtained information dictates the path between the first and second locations.

18. A method of operating a plurality of autonomous vehicles, the method comprising:
   providing a plurality of autonomous vehicles comprising information obtaining devices, an intelligent control electrically connected to the information obtaining devices, communication devices, and including an implement for performing at least one agricultural operation selected from the group consisting of a. planting; b. tilling; c. baling; d. harvesting; e. spraying; f. transporting; and g. cultivating;
   transmitting communication signals between the plurality of autonomous vehicles to communicate the location of the vehicles relative to one another;
   obtaining information at each of the vehicles related to its current path and the agricultural operation being performed, wherein the current path of one of the plurality of autonomous vehicles is based on field-related information obtained by a separate one of the plurality of autonomous vehicles;
   communicating the obtained information to the other vehicles;
   obtaining and communicating other information suggesting a change in the travel of one or more of the other vehicles on an as needed basis; and
   automatically adjusting a physical characteristic of one or more of the plurality of vehicles based upon the obtained information, wherein the physical characteristic comprises width or height.

19. The method of claim 18 further comprising providing one or more towers for communicating with the autonomous vehicles to provide information related to location and the agricultural operation being performed.

20. The method of claim 18 further comprising adjusting the current path of a subset of the plurality of autonomous vehicles is based on field-related information obtained by the separate one of the plurality of autonomous vehicles.

* * * * *